United States Patent
Kohn et al.

(10) Patent No.: US 11,407,327 B1
(45) Date of Patent: Aug. 9, 2022

(54) CONTROLLING ONGOING USAGE OF A BATTERY CELL HAVING ONE OR MORE INTERNAL SUPERCAPACITORS AND AN INTERNAL BATTERY

(71) Applicant: Veritone Alpha, Inc., Costa Mesa, CA (US)

(72) Inventors: Wolf Kohn, Seattle, WA (US); Yanfang Shen, Bellevue, WA (US); Jordan Makansi, Seattle, WA (US)

(73) Assignee: Veritone Alpha, Inc., Costa Mesa, CA (US)

( * ) Notice: Subject to any disclaimer, the term of this patent is extended or adjusted under 35 U.S.C. 154(b) by 386 days.

(21) Appl. No.: 16/656,571

(22) Filed: Oct. 17, 2019

(51) Int. Cl.
*B60L 58/10* (2019.01)
*B60L 15/20* (2006.01)
(Continued)

(52) U.S. Cl.
CPC .............. *B60L 58/10* (2019.02); *B60L 15/20* (2013.01); *G05B 17/02* (2013.01); *H02J 7/0027* (2013.01);
(Continued)

(58) Field of Classification Search
None
See application file for complete search history.

(56) References Cited

U.S. PATENT DOCUMENTS 5,724,239 A 3/1998 Kaneko
5,727,128 A 3/1998 Morrison
(Continued)

FOREIGN PATENT DOCUMENTS

JP 2008-546370 A 12/2008
JP 2015-025685 A 2/2015
(Continued)

OTHER PUBLICATIONS

Hyndman, "Forecasting: Principles & Practice", Workshop at University of Western Australia (robjhyndman.com/uwa), 138 pages, Sep. 23-25, 2014.
(Continued)

*Primary Examiner* — Jared Fureman
*Assistant Examiner* — Aqeel H Bukhari
(74) *Attorney, Agent, or Firm* — VLP Law Group LLP; James A. D. White

(57) ABSTRACT

Techniques are described for implementing automated control systems that each control or otherwise manipulate, for a target system having one or more battery cells each having internal components that include one or more internal supercapacitor components in parallel with at least one battery component, usage operations for one of the internal components of one of the battery cells, with the usage operations for the internal components of a particular battery cell being synchronized or otherwise coordinated to protect the battery component(s) of the battery cell while satisfying other criteria (e.g., to increase battery cell life and/or reduce power dissipation). In at least some situations, the target system is an electric vehicle, and the automated control systems control the electric vehicle's battery cells to provide electrical power to the motor during acceleration and constant speed driving, and to store electrical power in the battery cells during braking or other deceleration.

26 Claims, 20 Drawing Sheets

(51) Int. Cl.
　　　*G05B 17/02*　　(2006.01)
　　　*H02J 7/00*　　(2006.01)
　　　*H02J 7/34*　　(2006.01)
(52) U.S. Cl.
　　　CPC ....... *B60L 2240/42* (2013.01); *B60L 2240/54* (2013.01); *H02J 7/345* (2013.01)

(56) References Cited

U.S. PATENT DOCUMENTS

| | | |
|---|---|---|
| 5,755,378 A | 5/1998 | Dage |
| 5,963,447 A | 10/1999 | Kohn et al. |
| 6,088,689 A | 7/2000 | Kohn et al. |
| 6,694,044 B1 | 2/2004 | Pavlovic et al. |
| 7,072,723 B2 | 7/2006 | Kohn et al. |
| 7,216,004 B2 | 5/2007 | Kohn et al. |
| 7,574,383 B1 | 8/2009 | Parasnis et al. |
| 8,261,283 B2 | 9/2012 | Tsafrir et al. |
| 8,429,106 B2 | 4/2013 | Downs et al. |
| 8,606,788 B2 | 12/2013 | Chen et al. |
| 8,949,772 B1 | 2/2015 | Talby et al. |
| 9,946,517 B2 | 4/2018 | Talby et al. |
| 2002/0049899 A1 | 4/2002 | Kenworthy |
| 2003/0069868 A1 | 4/2003 | Vos |
| 2003/0234812 A1 | 12/2003 | Drucker et al. |
| 2004/0260666 A1 | 12/2004 | Pestotnik et al. |
| 2005/0102044 A1 | 5/2005 | Kohn et al. |
| 2005/0273413 A1 | 12/2005 | Vaudrie |
| 2006/0218074 A1 | 9/2006 | Kohn |
| 2006/0229769 A1 | 10/2006 | Grichnik et al. |
| 2008/0167756 A1 | 7/2008 | Golden et al. |
| 2009/0113049 A1 | 4/2009 | Nasle |
| 2011/0035071 A1 | 2/2011 | Sun |
| 2011/0178622 A1 | 7/2011 | Tuszynski |
| 2011/0298626 A1 | 12/2011 | Fechalos et al. |
| 2012/0072181 A1 | 3/2012 | Imani |
| 2012/0143356 A1 | 6/2012 | Berg-Sonne |
| 2012/0187906 A1* | 7/2012 | Martienssen ......... H01G 9/038 320/109 |
| 2012/0274281 A1 | 11/2012 | Kim |
| 2012/0283887 A1 | 11/2012 | Goldsmith et al. |
| 2013/0080530 A1 | 3/2013 | Frees et al. |
| 2013/0099576 A1 | 4/2013 | Chuah et al. |
| 2013/0119916 A1 | 5/2013 | Wang et al. |
| 2013/0253942 A1 | 9/2013 | Liu et al. |
| 2013/0274936 A1 | 10/2013 | Donahue et al. |
| 2014/0114517 A1 | 4/2014 | Tani et al. |
| 2014/0217976 A1 | 8/2014 | McGrath |
| 2014/0250377 A1 | 9/2014 | Bisca et al. |
| 2014/0277600 A1 | 9/2014 | Kolinsky et al. |
| 2015/0032394 A1 | 1/2015 | Kimura et al. |
| 2015/0058078 A1 | 2/2015 | Ehrenberg et al. |
| 2015/0184550 A1 | 7/2015 | Wichmann |
| 2015/0253749 A1 | 9/2015 | Kniazev et al. |
| 2015/0279182 A1 | 10/2015 | Kanaujia et al. |
| 2015/0370228 A1 | 12/2015 | Kohn et al. |
| 2015/0370232 A1 | 12/2015 | Kohn et al. |
| 2016/0004228 A1 | 1/2016 | Kohn |
| 2016/0018806 A1 | 1/2016 | Kohn et al. |
| 2016/0125435 A1 | 5/2016 | Kohn et al. |
| 2016/0216708 A1 | 7/2016 | Krivoshein et al. |
| 2017/0271984 A1 | 9/2017 | Kohn et al. |
| 2017/0315517 A1 | 11/2017 | da Silva et al. |
| 2017/0315523 A1 | 11/2017 | Cross et al. |
| 2018/0009330 A1* | 1/2018 | Ricci ............... G07C 9/00563 |
| 2018/0034311 A1 | 2/2018 | Zhang |
| 2019/0184805 A1 | 6/2019 | Yan |

FOREIGN PATENT DOCUMENTS

| | | |
|---|---|---|
| JP | 2016-105672 A | 6/2016 |
| WO | 2014030349 | 2/2014 |
| WO | 2014089959 A1 | 6/2014 |
| WO | 2016025080 A1 | 2/2016 |

OTHER PUBLICATIONS

Leng et al., "Effect of Temperature on the Aging Rate of Li Ion Battery Operating Above Room Temperature," Scientific Reports 5:12967, Aug. 2015, 12 pages.

Shim et al., "Past, present, and future of decision support technology", Decision Support Systems 33 (2002), 16 pages (pp. 111-126).

Liserre et al., "Future Energy Systems", IEEE Industrial Electronics Magazine, Mar. 2010, 20 pages (pp. 18-37).

Sarkis, "A strategic decision framework for green supply chain management", Journal of Cleaner Production 11 (2003) 13 pages (pp. 397-409).

Chong et al., "Sensor Networks: Evolution, Opportunities, and Challenges", Proceedings of the IEEE, vol. 91, No. 8, Aug. 2003, 10 pages (pp. 1247-1256).

Ge et al., "Hybrid Systems: Chattering Approximation to Relaxed Controls," Lecture Notes in Computer Science vol. 1066: Hybrid Systems 111, 1996, 25 pages (pp. 76-100).

Kohn et al., "Multiple Agent Hybrid Control: Carrier Manifolds and Chattering Approximations to Optimal Control," 33rd Conference on Decision and Control Lake Buena Vista, FL, Dec. 1994, 7 pages (pp. 4221-4227).

Kohn et al., "A Hybrid Systems Approach to Computer-Aided Control Engineering," IEEE Control Systems 15(2), 1995, 30 pages.

Kohn et al., "Hybrid Systems as Finsler Manifolds: Finite State Control as Approximation to Connections," Lecture Notes in Computer Science vol. 999: Hybrid Systems II, 1995, 28 pages (pp. 294-321).

Kohn et al., "Viability in Hybrid Systems," Theoretical Computer Science 138, 1995, 28 pages (pp. 141-168).

Kohn et al., "Digital to Hybrid Program Transformations," IEEE International Symposium on Intelligent Control, Dearborn, MI, Sep. 15-18, 1996, 6 pages (pp. 342-347).

Kohn et al., "Hybrid Dynamic Programming," Lecture Notes in Computer Science vol. 1201: Hybrid and Real-Time Systems, 1997, 7 pages.

Kohn et al., "Implementing Sensor Fusion Using a Cost-Based Approach," American Control Conference, Albuquerque, NM, Jun. 1997, 5 pages (pp. 2244-2248).

Kohn et al., "Control Synthesis in Hybrid Systems with Finsler Dynamics," Houston Journal of Mathematics 28(2), 2002, 23 pages (pp. 353-375).

Kohn et al., "A Micro-Grid Distributed Intelligent Control and Management System," IEEE Transactions on Smart Grid 6(6), Nov. 2015, 11 pages (pp. 2964-2974).

Uddin, K., "The effects of high frequency current ripple on electric vehicle battery performance," Applied Energy 178 (2016), 13 pages (pp. 142-154).

Schutter, B. De "Minimal state-space realization in linear system theory: an overview", Journal of Computational and Applied Mathematics, 121 (2000), 24 pages (331-354).

\* cited by examiner

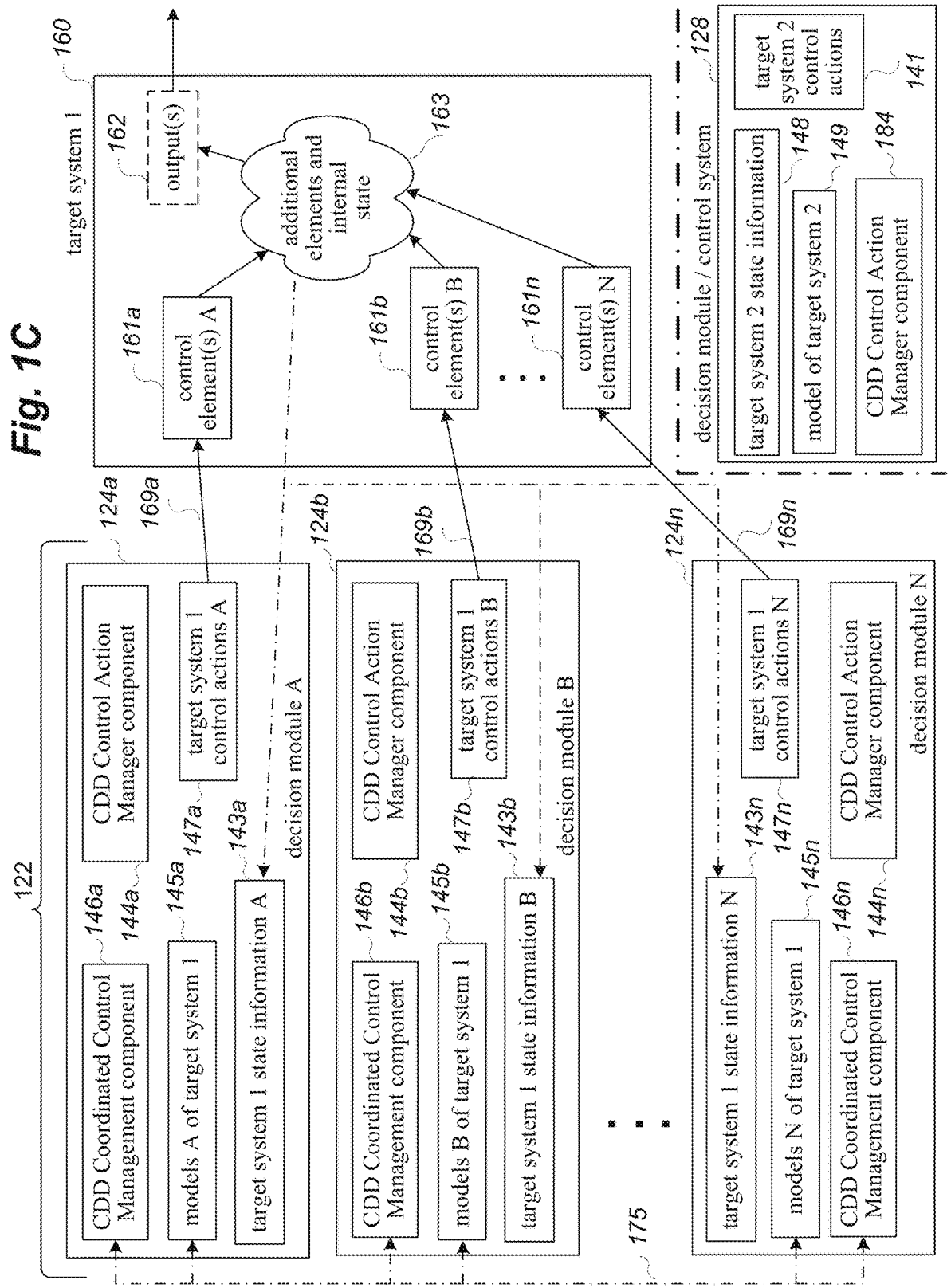

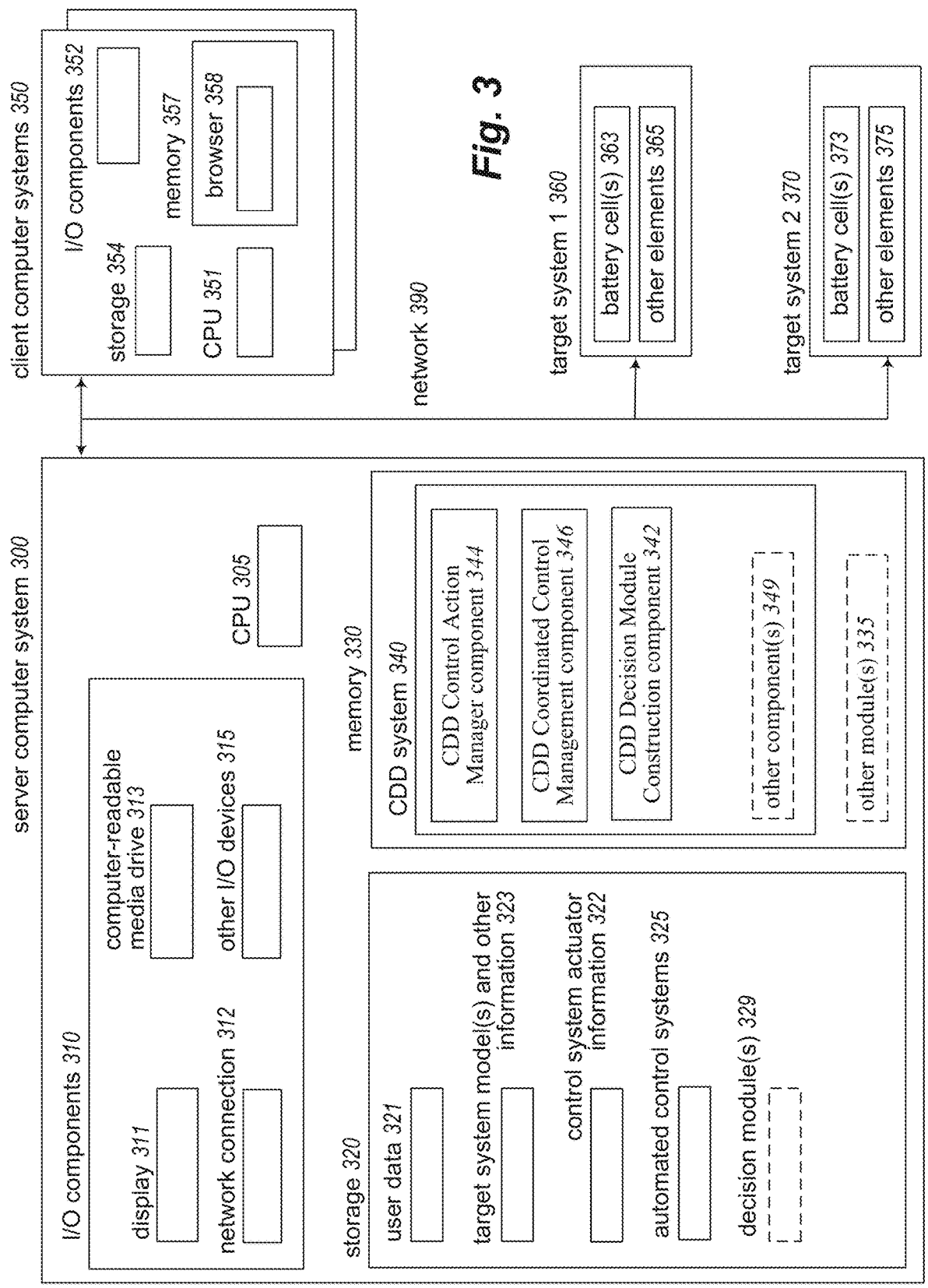

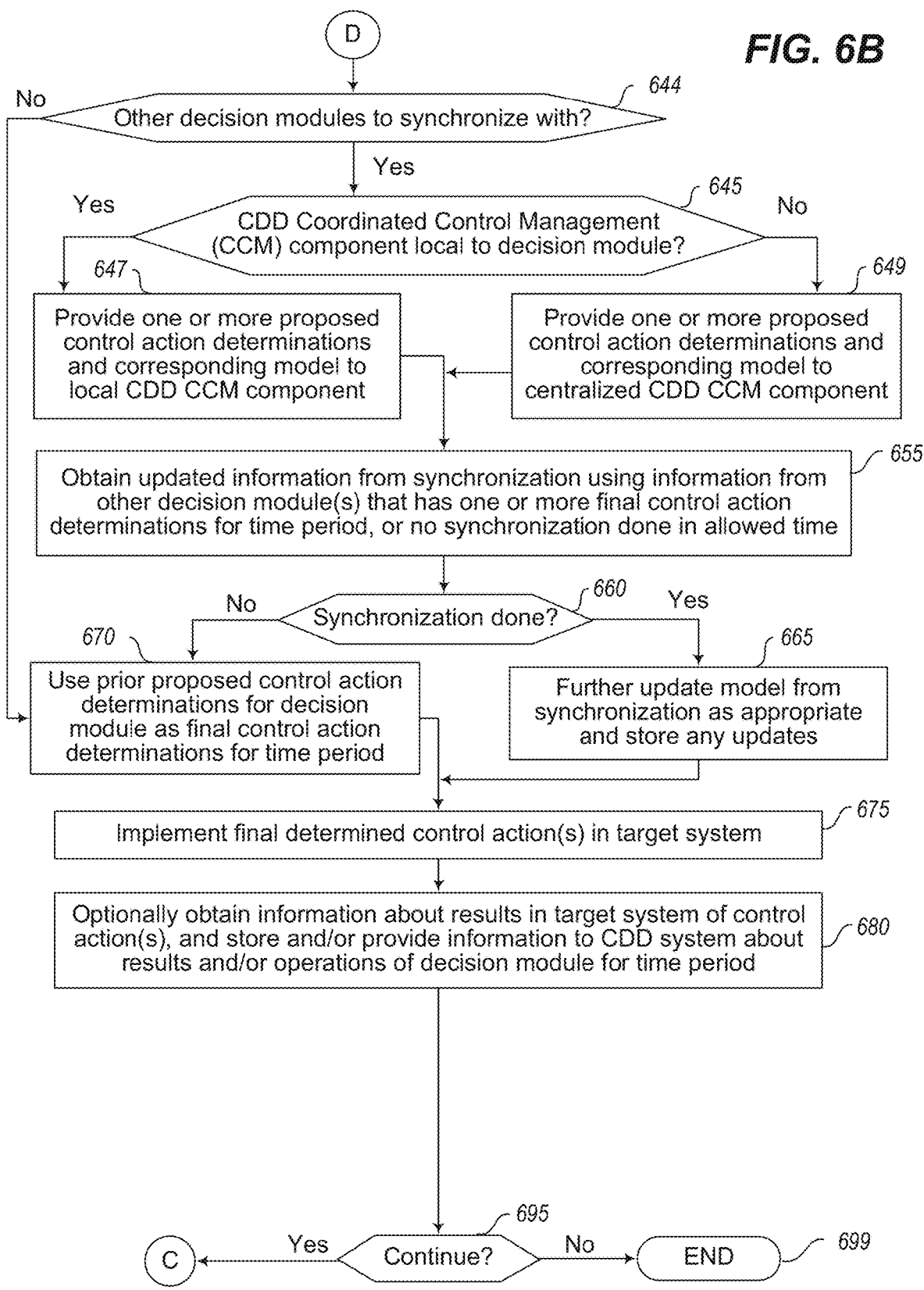

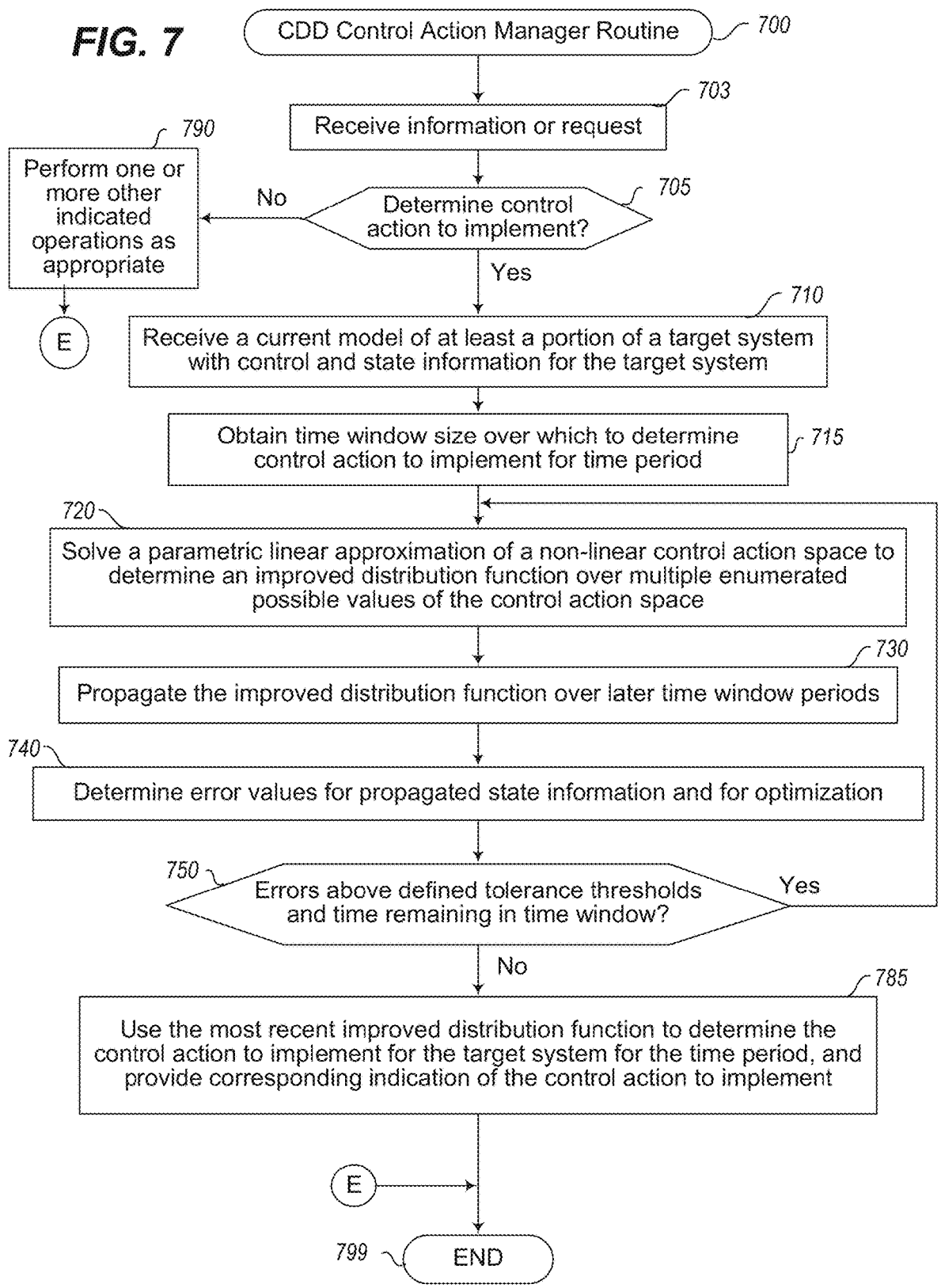

continued …

CONTROLLING ONGOING USAGE OF A BATTERY CELL HAVING ONE OR MORE INTERNAL SUPERCAPACITORS AND AN INTERNAL BATTERY

TECHNICAL FIELD

The following disclosure relates generally to techniques for using automated control systems to control usage of individual battery cells that each has one or more internal supercapacitor components in parallel with a battery component, such as in a system of multiple interconnected battery cells.

BACKGROUND

Attempts have been made to implement control systems for various types of physical systems having inputs or other control elements that the control system can manipulate in an attempt to provide desired output or other behavior of the physical systems—one example of such automated control is to manage operations of a battery that is discharging electrical power to support a load and/or is charging using electrical power from a source, while uncertainty exists about an internal temperature and/or chemical state of the battery, and potentially with ongoing changes in load, source and/or internal state of the battery. Such control systems have used various types of architectures and underlying computing technologies to attempt to implement such functionality.

However, various difficulties exist with existing control systems for battery systems, including with respect to managing uncertainty in a current state of a system being controlled and in how different types of inputs will affect operation of the control systems.

BRIEF DESCRIPTION OF THE DRAWINGS

FIG. 1C is a network diagram illustrating an example environment in which a system for performing cooperative distributed control of target systems may be implemented.

FIG. 3 is a block diagram illustrating example computing systems suitable for executing an embodiment of a system for performing cooperative distributed control of target systems in configured manners, including one or more components to automatically and repeatedly determine and implement control actions for one or more target systems.

FIGS. 6A-6B illustrate a flow diagram of an example embodiment of a Decision Module routine.

FIG. 7 illustrates a flow diagram of an example embodiment of a CDD Control Action Manager routine.

DETAILED DESCRIPTION

Figure 1A:
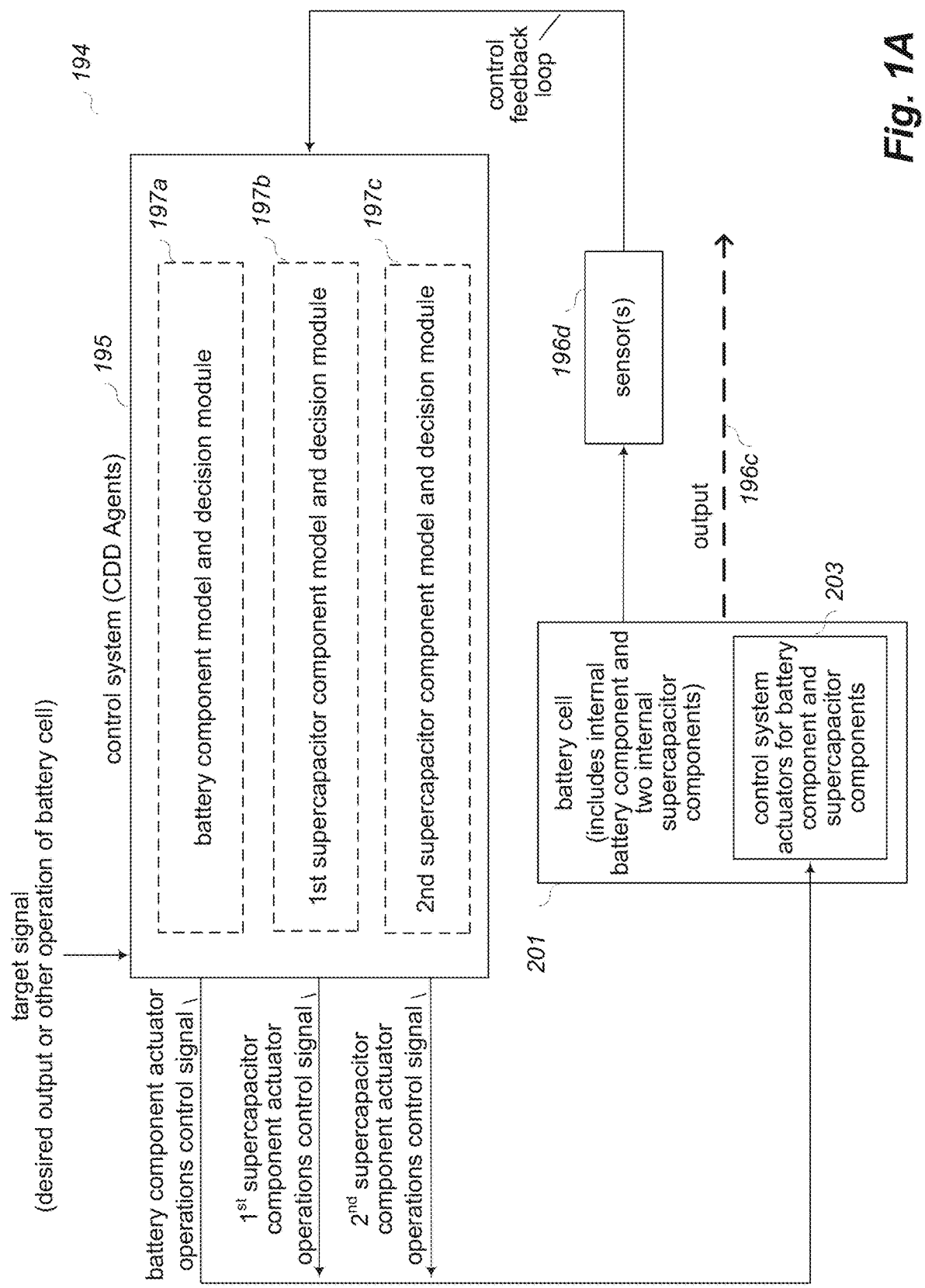
FIG. 1A includes a diagram illustrating use of an automated control system to automatically and repeatedly determine control decisions for operations of a battery cell in a target system to improve ongoing operation of the battery cell, such as for internal components in the battery cell that include a battery and one or more supercapacitors.

Techniques are described for implementing an automated control system that controls or otherwise manipulates, for a target physical system having one or more battery cells each having internal components that include one or more internal supercapacitor components in parallel with at least one battery component, usage operations for the internal components of the battery cells, with each internal supercapacitor and battery component of a battery cell being individually controlled, and with those individual usage operation control determinations for the battery cell's internal components being synchronized or otherwise coordinated with each other to protect the battery component(s) of the battery cell while satisfying constraints and/or goals for operation of the battery cell (e.g., to increase battery cell life and/or reduce power dissipation while performing other battery cell power use activities). In at least some embodiments, the internal supercapacitor and battery components of a battery cell each has a separate 'impedance actuator' in series with the internal component that the automated control system manipulates to control that internal component's operation, such as by determining and implementing one of multiple possible impedance levels of the impedance actuator for a given time period (and thus controlling an amount of electrical current flowing to or from that internal component), and with the determined impedance levels for use with the various internal components of a battery cell being coordinated to protect the battery component(s) while providing a desired overall power output for the battery cell from its various internal components and/or while controlling internal distribution of an overall power input to the battery cell among its various internal components. In embodiments in which a target system has a plurality of interconnected battery cells of the described type, AC (alternating current) output from each of multiple battery cells may similarly be synchronized or otherwise coordinated, such as to synchronize phase of low frequency AC output between the multiple battery cells and/or with a load of the target system.

In at least some embodiments, the target system is an electric vehicle with a plurality of battery cells, and the automated control system for the internal components of the battery cells in use by the electric vehicle perform automated operations to control the battery cells' operations to provide electrical power to the motor of the electric vehicle during acceleration and constant speed driving (e.g., primarily or wholly from supercapacitor components while accelerating, and primarily or wholly from battery components for constant speed driving), and to store electrical power in the battery cells during braking or other deceleration (e.g., primarily or wholly in the supercapacitor components, at least initially to buffer subsequent slower electrical flow from the supercapacitor components to the battery components), including determining in at least some embodiments whether and how much power to supply for each of a series of time periods, and implementing the determined power amounts via modifying settings of impedance actuator elements associated with the internal components of the battery cells. The repeated automated modifications to the operations of the internal supercapacitor and battery components of the battery cells of the target system by the corresponding automated control system may, in at least some such embodiments, include using parametric linear approximation to determine a control action for each such battery cell internal component using one of multiple enumerated possible values of an available control space (also referred to herein as multiple enumerated possible control values, such as one of multiple impedance levels that an impedance actuator supports) that best satisfies one or more defined goals at a given time in light of current state information (e.g., current output from the battery cell, voltage from the battery cell, battery cell temperature, etc.), and then modifying the impedance actuators associated with the internal supercapacitor and battery components of a battery cell to currently implement those determined values and corresponding control actions and thereby affect an amount of power supplied to and/or from the battery cell(s). Additional details are described below related to performing such described techniques for repeatedly performing automated modifications to the automated control systems' ongoing operations to improve functionality of target systems and their battery cells, and some or all of the described techniques are performed in at least some embodiments by automated control systems produced by one or more CDD (Collaborative Distributed Decision) systems.

In at least some embodiments, the repeated determining and implementing of one of multiple possible control actions using one of multiple enumerated possible control values that best satisfies one or more defined goals at a given time based on current state information, such as to determine and implement a particular impedance level for an impedance actuator associated with a particular internal supercapacitor or battery component, is performed using parametric linear approximation during an available iteration time window before the control value and corresponding control action is to be implemented—furthermore, by gathering further state information after such a control action is implemented and by using it while determining a next control action using one of the control values (e.g., by updating a model of a battery cell or of one of the internal components of a battery cell to reflect the further state information and the control value and associated control action that were implemented), the ongoing usage is continually improved via feedback received from the ongoing battery cell usage. In particular, given a time period in which a control action is to be determined that uses one of multiple enumerated control values, a time window (e.g., less than the time period) may be selected in which to determine the control action for that time period, and an iterative approach using parametric linear approximation for a non-linear control space is implemented during that time window. Such an iterative approach using parametric linear approximation during the time window may include determining a distribution function over the multiple enumerated control values of the non-linear control space that measures the distributions of the control values at a current time, and then performing repeated iterations that each includes (a) solving a linear approximation of the non-linear control space to determine an improved distribution function over the multiple enumerated control values with respect to the one or more defined goals and (b) propagating the improved distribution function over later time periods to determine corresponding results (e.g., by using a current model of the battery cell or of one of the internal components of the battery cell to predict future effects of particular further control actions). After some or all such iterations, one or more error values are determined (e.g., for the propagated state information and/or for a degree of optimization from the propagating), and a determination is made if the error value(s) are sufficiently low to proceed (e.g., are below defined error tolerance thresholds)—in some embodiments, the iterating stops once the error value(s) are below the thresholds (even if time remains for one or more further iterations) while in other embodiments the iterations continue until the end of the time window, with the most recent improved distribution function after the last iteration used to determine a 'best' control value to implement as part of a corresponding control action for the time period (e.g., a control value and associated control action that satisfies the one or more defined goals better than the other possible control values and associated control actions). Such automated modifications to one or more impedance actuator elements to repeatedly implement a determined control action using a determined control value based on current state information and a current model further allows the system to dynamically adapt to various changes that may occur in the target system over time (e.g., to changing performance over time of an internal battery component of a battery cell and/or of an internal supercapacitor component of a battery cell due to changes in battery cell charge level and/or internal battery cell chemistry).

In addition, the described techniques may in at least some embodiments generate and use a model of a target system that is under control by encoding the dynamics of the target system (e.g., from sensory data and actions of the target system) in a function of the state of the target system referred to as a data Hamiltonian model, including in at least some embodiments and situations to update the model as additional information becomes available (e.g., as additional state information is obtained, to indicate further control actions that are performed, etc.)—in particular, some characteristics of the target system under control may not be completely known (e.g., internal state of the battery cell), with the data Hamiltonian encoding the currently known information. Such a model for the target system may be a combination of individual sub-models of the same type for the individual internal supercapacitor and battery components of each battery cell, which are similarly created and updated, as discussed further below. Such a data Hamiltonian may be implemented as a function that captures the flow and interdependence of a data domain, and may have three types of variables (e.g., state variables, flow variables, and decision or control variables) and one or more associated goals (e.g., to maximize battery cell life while satisfying as many requests for power from the battery cell as possible), with behavior of the data Hamiltonian controlled at least in part by binary and other rules that specify control actions to perform in light of current state information (e.g., absolute rules that characterize the unchanging physics of a physical target system being controlled and have binary true/false values; hard rules that characterize the desired behavior and goals and have binary true/false values; soft rules that characterize empirical knowledge of system operation, such as heuristic strategies, economic dispatch, and response to anomalies and learning strategies, and have variable, probabilistic truth values in a range [0,1], as well as associated confidence values; etc.). The automated control system(s) for a target system may use the model(s) and current state information as part of determining the control actions to currently perform, such as for individual internal supercapacitor and battery components within battery cells and in a manner to satisfy defined constraints and other goals of the control system in light of its current state, while attempting to satisfy the requested output or other desired operation of the target system if possible. Additional details are included below regarding the generation and use of such models.

The described techniques involving the use of battery cells with internal supercapacitor components in parallel with internal battery components, and the automated control of the operations of those battery cell internal components by an automated control system in the described manner, may provide a variety of benefits and advantages. In particular, many traditional control system approaches involving battery cells have been ineffective for controlling complex systems in which internal state information cannot be determined, while the use of the described techniques overcome such problems based at least in part by repeatedly improving the operation of the control system via feedback from ongoing operations and in some embodiments the iterative determination of an improved distribution function over multiple enumerated possible control values to use. Such traditional control system approaches typically involve the system designers beginning with requirements for battery cell system behavior, using the requirements to develop a static model of the system, and attempting to optimize the run-time battery cell system operations in light of defined criteria. Conversely, in at least some embodiments, the described techniques do not need to use such criteria, nor to develop such a resulting static model, nor to do such optimization—instead, an idealized behavior of a battery cell system is expressed and used to create an idealized behavioral model (e.g., expressed as an idealized data Hamiltonian system model), and run-time operations repeatedly improve the functionality of the control system (e.g., continuously) by the iterative determination of improved distribution functions over multiple enumerated possible control values to use. In addition, use of the described battery cells and associated automated control techniques provide benefits that include, as non-exclusive examples, the following: improving the quality of a system with a plurality of battery cells by individually controlling the quality of each battery cell; generating AC power from each battery cell (and thus avoiding the need of an inverter in at least some embodiments); controlling and combining the power delivery from the multiple internal supercapacitor and battery components of a battery cell by coordinating individual component usage determinations for the multiple internal supercapacitor and battery components of the battery cell; reducing thermal dissipation by separately and accurately controlling the chemical reaction and ion flow within each battery cell; avoiding misbehavior of an overall battery system with a plurality of battery cells due to eliminating or otherwise reducing misbehavior of individual battery cells; etc.

FIG. 1A illustrates an example diagram 194 showing how a control system 195 may be used to improve functionality of a target system using an electrical device 201—the electrical device in this example is a battery cell that includes one or more internal supercapacitor components and at least one internal battery component, as discussed in greater detail elsewhere herein (including with respect to the examples of FIGS. 2A-2I), although in other situations the electrical device may have other forms that include at least some such internal components (e.g., a solar panel, wind turbine, inverter, fuel cell, solid waste generator, motor, computing device, other active loads, etc.).

In this example, the control system 195 operates to control the internal supercapacitor and battery components of the battery cell with respect to their DC (direct current) operation, as part of individually controlling the overall battery cell and its resulting AC output, including in situations in which the battery cell 201 is one of a plurality of interconnected battery cells (not shown) that are used by the target system. As illustrated in greater detail with respect to FIG. 2A, the electrical power of the battery cell may be transferred from internal DC operations to AC output via a Solid State Transformer (SST), and the AC output of the battery cell may further be phase synchronized with the AC output of other battery cells used by the target system via active control. The control system 195 operates in this example on the internal DC components of each battery cell of the target system to generate a control law individually for that battery cell that maximizes resonant power transfer to the AC output side, responds to desired behavior, controls power factor in the AC side, synchronizes the output of each battery cell to a reference phase for the overall battery system, and regulates voltage output for each battery cell in the AC side, as discussed further below.

In particular, the control system 195 performs a control loop in this example to control ongoing operation of the battery cell 201 of the target system, such as to drive the battery cell to a desired dynamic behavior. The control system may include or be implemented as one or more CDD decision modules (also referred to as CDD agents, and as discussed in greater detail below with respect to FIGS. 1B-1C, as well as elsewhere herein), and include a model (not shown) of the target system that is generated based in part on data obtained from actual operation of the target system over time (such as to identify some or all inputs supplied to the target system; resulting outputs from the target system, such as sensor data measured regarding operations of the target system from sensors 196d, etc.)—the model of the target system may, in at least some embodiments, be a combination of corresponding sub-models for the internal supercapacitor and battery components of each of the one or more battery cells in the overall battery system for the target system, each having an associated control system decision module, as illustrated for elements 197a-c. Each such model/sub-model is a representation of the corresponding device or other element and of its operations, and may be constructed in the form of a total data Hamiltonian function $H_T$, as discussed in greater detail below. As part of the operation of the control system 195, it receives a target signal that represents a request for a desired output or other desired operation of the battery cell 201 of the target system (e.g., for a local load, such as for an electric motor of an electric vehicle; for an electrical grid that supports various loads in various locations, etc.), and uses information from its models 197a-197c of the internal supercapacitor and battery components of the battery cell 201 to determine an operations control signal for each such internal component (e.g., a signal indicating an impedance level to implement for an impedance actuator associated with the respective internal component at a given point in time, or more generally a signal of a determined control action for the respective internal component, such as an amount of energy to supply from that internal component or to provide to that internal component) to send to the battery cell, with those control signals and their associated determined control actions for the internal components of the battery cell being determined to satisfy defined constraints and other goals of the control system in light of their current state while attempting to satisfy the desired output or other desired operation of the target signal if possible. The battery cell receives the control signals, and optionally performs a corresponding output 196c as appropriate (e.g., an amount of AC electrical power output), with that output and/or other characteristics of the battery cell being measured at least in part by the one or more sensors 196d (e.g., a suite of multiple passive sensors, such as with respect to voltage, current, external battery cell temperature, etc.). The sensors 196d may further supply their measured readings back to the control system 195 as part of a control feedback loop, such as to update corresponding state information in the models of the internal components, thus enabling the models to be updated in a continuous or substantially continuous manner to reflect that feedback and/or newly generated to reflect that feedback (e.g., to newly generate some or all of the models for a battery cell's internal components if a charge level of an internal battery component of the battery cell changes by at least a defined percentage or other defined amount), and with the control system 195 continuing to control operation of the battery cell 201 for a next target signal (e.g., in a continuous or substantially continuous manner).

The control system 195 of FIG. 1A may further, in some embodiments, include one or more internal components (e.g., a control state manager component, not shown) that repeatedly (e.g., continuously) improve functionality of the control system by performing parametric linear approximation during an available time window to determine the control action(s) for the control system 195 to implement in light of current state information and one or more defined goals, such as by determining control values to use to set attributes or other state information of one or more control system impedance actuators within the battery cell that regulate operation of the internal supercapacitor and battery components of the battery cell (e.g., to affect how and whether operations of the control system impedance actuator(s) are performed). In the example of FIG. 1A, the control system determines and provides control actions for control system impedance actuators 203 via the operations control signals to modify activities of the control system impedance actuator(s) to dynamically regulate the behavior of the internal supercapacitor and battery components of the battery cell, although in other embodiments the control system actuator(s) may operate in other manners (e.g., provide a defined type of regulation until corresponding attributes are modified by the control system). As previously noted, the control actions determined for the control system impedance actuator(s) 203 may include, for example, changing a level of impedance (or resistance) provided by the impedance actuators for a defined amount of time, although in other embodiments and situations may change other attributes (e.g., the amount of time that an impedance level is used). Thus, in some embodiments, the control system receives feedback from the sensors 196d corresponding to current operation of the battery cell 201 (as regulated by the control system actuator(s) 203), uses the feedback as part of performing repeated iterations involving performing a linear approximation of a non-linear control space to determine an improved distribution function over multiple enumerated possible control values with respect to the one or more defined goals and involving propagating the improved distribution function over later time periods, and uses the final improved distribution function after the iterations to determine a control value for current use in making one or more modifications or other adjustments to the control system actuator(s) to improve functionality. Additional details are included below.

With respect to such an overall system model of a target system that includes one or more such battery cells, such as based on individual sub-models of the internal supercapacitor and battery components of the battery cell(s), the automated operations of an automated control system for the target system may include generating such model(s) by receiving information about inputs to, outputs from, control signal instructions provided to and other attributes related to the one or more battery cells and/or their internal components (e.g., electrical current and/or voltage being output for use, electrical current and/or voltage being input for storage, temperature readings external to the one or more battery cells as part of their surrounding environment, etc.), and using such information as part of modeling current operational characteristics of the one or more battery cells and/or their internal components—given such modeled information, the control system that controls the one or more battery cells and their internal components may then use such information to make decisions on current and/or future control actions in a manner that reflects actual behavior of the target system.

Figure 1B:
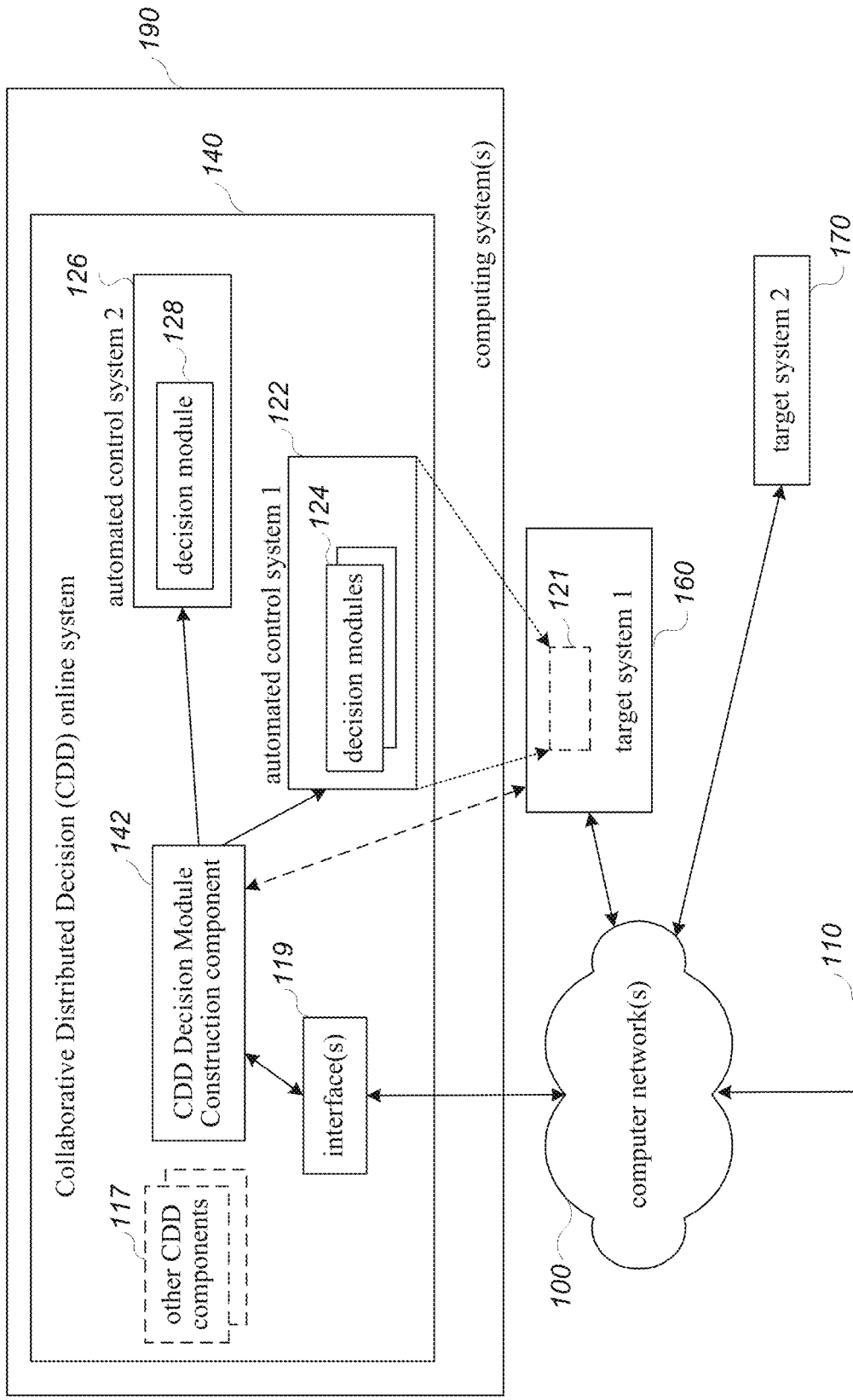
FIG. 1B is a network diagram illustrating an example environment in which a system for performing cooperative distributed control of target systems may be configured and initiated.

However, before further discussion of control of internal supercapacitor and battery components of battery cells by an automated control system, a more general description of the control of target systems using such representations and other models is provided with respect to FIGS. 1B-1C.

FIG. 1B is a network diagram illustrating an example environment in which a system for performing cooperative distributed control of one or more target systems may be configured and initiated. In particular, an embodiment of a CDD system 140 is executing on one or more computing systems 190, including in the illustrated embodiment to operate in an online manner and provide a graphical user interface (GUI) (not shown) and/or other interfaces 119 to enable one or more remote users of client computing devices 110 to interact over one or more intervening computer networks 100 with the CDD system 140 to configure and create one or more decision modules to include as part of one or more automated control systems to use with one or more target systems to be controlled. While not illustrated in FIG. 1B, the CDD system 140 may include and use one or more specific components of the CDD system in the created control system(s) (e.g., control state manager components), as discussed further herein, such as to include one or more such components in one or both of the automated control systems 1 and 2.

Target system 1 160 and target system 2 170 are example target systems illustrated in this example, although it will be appreciated that only one target system or numerous target systems may be available in particular embodiments and situations, and that each such target system may include a variety of mechanical, electronic, chemical, biological, and/or other types of components to implement operations of the target system in a manner specific to the target system. In this example, the one or more users (not shown) may interact with the CDD system 140 to generate an example automated control system 122 for target system 1, with the automated control system including multiple decision modules (or "agents") 124 in this example that will cooperatively interact to control portions of the target system 1 160 when later deployed and implemented. The interactions of the users with the CDD system 140 to create the automated control system 122 may involve a variety of interactions over time, including in some cases independent actions of different groups of users. In addition, as part of the process of creating and/or training or testing automated control system 122, it may perform one or more interactions with the target system 1 as illustrated, such as to obtain partial initial state information, although some or all training activities may in at least some embodiments include simulating effects of control actions in the target system 1 without actually implementing those control actions at that time. In some embodiments and situations, such initial user interactions may be used to generate an initial rule-based overall system model of a target system that is based at least in part on binary rules.

After the automated control system 122 is created, the automated control system may be deployed and implemented to begin performing operations involving controlling the target system 1 160, such as by optionally executing the automated control system 122 on the one or more computing systems 190 of the CDD system 140, so as to interact over the computer networks 100 with the target system 1. In other embodiments and situations, the automated control system 122 may instead be deployed by executing one or more local copies of some or all of the automated control system 122 (e.g., one or more of the multiple decision modules 124) in a manner local to the target system 1, as illustrated with respect to a deployed copy 121 of some or all of automated control system 1, such as on one or more computing systems (not shown) that are part of or otherwise associated with the target system 1. Each such decision module may, for example, perform activities similar to those of control system 195 of FIG. 1A, such as with respect to a respective battery cell (or other electrical device) being controlled by that decision module (e.g., for a particular internal supercapacitor or battery component of a particular battery cell). In addition, in embodiments and situations in which initial user interactions are used to generate an initial rule-based system model of a target system using binary rules, the initially deployed automated control system 122 may be based on such an initial rule-based system model, and data from the operation of the target system under control of that initially deployed automated control system 122 may be gathered and used to include information about current characteristics of the target system in a revised updated model of the target system, and/or the functionality of the control system may be improved over time using functionality of one or more CDD components as discussed elsewhere herein.

In a similar manner to that discussed with respect to automated control system 122, one or more users (whether the same users, overlapping users, or completely unrelated users to those that were involved in creating the automated control system 122) may similarly interact over the computer network 100 with the CDD system 140 to create a separate automated control system 126 for use in controlling some or all of the target system 2 170. In this example, the automated control system 126 for target system 2 includes only a single decision module (or "agent") 128 that will perform all of the control actions for the automated control system 126. The automated control system 126 may similarly be deployed and implemented for target system 2 in a manner similar to that discussed with respect to automated control system 122, such as to execute on the one or more computing systems 190 and/or on one or more local computing systems (not shown) that are part of or otherwise associated with the target system 2, although a deployed copy of automated control system 2 is not illustrated in this example. It will be further appreciated that the automated control systems 122 and/or 126 may further include other components and/or functionality that are separate from the particular decision modules 124 and 128, respectively, although such other components and/or functionality are not illustrated in FIG. 1B.

The network 100 may, for example, be a publicly accessible network of linked networks, possibly operated by various distinct parties, such as the Internet, with the CDD system 140 available to any users or only certain users over the network 100. In other embodiments, the network 100 may be a private network, such as, for example, a corporate or university network that is wholly or partially inaccessible to non-privileged users. In still other embodiments, the network 100 may include one or more private networks with access to and/or from the Internet. Thus, while the CDD system 140 in the illustrated embodiment is implemented in an online manner to support various users over the one or more computer networks 100, in other embodiments a copy of the CDD system 140 may instead be implemented in other manners, such as to support a single user or a group of related users (e.g., a company or other organization, such as if the one or more computer networks 100 are instead an internal computer network of the company or other organization, and with such a copy of the CDD system optionally not being available to other users external to the company or other organizations). In addition, the CDD system 140, each of its components (including component 142 and other components 117, such as one or more CDD Control Action Manager components and/or one or more CDD Coordinated Control Management components), each of the decision modules, and/or each of the automated control systems may include software instructions that execute on one or more computing systems (not shown) by one or more processors (not shown), such as to configure those processors and computing systems to operate as specialized machines with respect to performing their programmed functionality.

As noted above, various types of data may be obtained and used as part of modeling operational characteristics of a target system in a general overall model, or of a battery cell and its internal components in one or more sub-models specific to that battery cell and/or to those internal components, including information about prior input data to the target system/battery cell/battery cell's internal component and resulting behavior of the target system/battery cell/battery cell's internal component. In some embodiments and situations, such data may include data that is gathered in an automated manner from one or more types of hardware sensors, and in some embodiments and situations, such data may include information about actions of human users or otherwise information about such humans. The term "sensor" and "sensor data" as used herein generally refers to such data regardless of source or type, including data from hardware sensors, unless otherwise indicated with respect to a particular situation. In addition, the improvements to control system functionality that are performed by one or more CDD components in some embodiments may, in at least some such embodiments, be performed to complete or repair or otherwise address conflicts in state information for one or more parts of the target system, such as from lack of sufficient internal state structure information or other information, and to enable learning of or other improvements to results of performing control actions.

FIG. 1C is a network diagram illustrating an example environment in which a system may be implemented for performing cooperative distributed control of multiple controlled elements within a target system, and in particular continues the example discussed with respect to FIG. 1B. In the example environment of FIG. 1C, target system 1 160 is again illustrated, with the automated control system 122

(whether an initial or revised version) now being deployed and implemented to use in actively controlling the target system 1 160. In the example of FIG. 1C, the decision modules 124 are represented as individual decision modules 124a, 124b, etc., to 124n, and may be executing locally to the target system 1 160 and/or in a remote manner over one or more intervening computer networks (not shown). In the illustrated example, each of the decision modules 124 includes a local copy of a CDD Control Action Manager component 144, such as with component 144a supporting its local decision module 124a, component 144b supporting its local decision module 124b, and component 144n supporting its local decision module 124n. Similarly, the actions of the various decision modules 124 are coordinated in a peer-to-peer manner in the illustrated embodiment, such as via use of so-called 'mean field' coordination techniques that use pairwise coordination between a particular decision module's local current model and an intermediate shared model for that decision module that is based on information about the current state of one or more other decision modules (e.g., by using a Pareto game technique to determine a Pareto equilibrium if possible that is represented in a consensus shared model, such as by having a consensus shared distribution function), as discussed in greater detail elsewhere herein, although in other embodiments other types of synchronization or coordination techniques may be used. Each of the decision modules 124 includes a copy of a CDD Coordinated Control Management component 146 to perform such synchronization/coordination with other decision modules, with component 146a supporting its local decision module 124a, component 146b supporting its local decision module 124b, and component 146n supporting its local decision module 124n. One or more of the decision modules 124 may further include a local copy of one or more other CDD components, although such other CDD components are not illustrated in this example.

As the decision modules 124 and automated control system 122 execute, various interactions 175 between the decision modules 124 are performed, such as to share information about current models and other state of the decision modules to enable cooperation and coordination between various decision modules via the use of mean field techniques, such as for a particular decision module to operate in a partially synchronized consensus manner with respect to one or more other decision modules (and in some situations in a fully synchronized manner in which the consensus actions of all of the decision modules 124 converge). During operation of the decision modules 124 and automated control system 122, various state information 143 may be obtained by the automated control system 122 from the target system 160, such as initial state information and/or changing state information over time (e.g., from passive and/or active sensors, not shown), and including outputs or other results in the target system 1 from control actions performed by the decision modules 124.

The target system 1 in this example includes various control elements 161 that the automated control system 122 may manipulate (e.g., various impedance actuators for internal supercapacitor or battery components of corresponding battery cells, not shown), and in this example each decision module 124 may have a separate group of one or more control elements 161 that it manipulates (such that decision module A 124a performs interactions 169a to perform control actions A 147a on control elements A 161a, decision module B 124b performs interactions 169b to perform control actions B 147b on control elements B 161b, and decision module N 124n performs interactions 169n to perform control actions N 147n on control elements N 161n). Such control actions affect the internal state 163 of other elements of the target system 1, including optionally to cause or influence one or more outputs 162. As operation of the target system 1 is ongoing, at least some of the internal state information 163 is provided to some or all of the decision modules to influence their ongoing control actions, with each of the decision modules 124a-124n possibly having a distinct set of state information 143a-143n, respectively, in this example.

As discussed in greater detail elsewhere, each decision module 124 may use such state information 143x (e.g., one of 143a-143n) and a local sub-model 145x (e.g., one of 145a-145n) of an overall system model for the target system to determine particular control actions 147x (e.g., one of 147a-147n) to next perform, such as for each of multiple time periods, although in other embodiments and situations, a particular automated control system may perform interactions with a particular target system for only one time period or only for a subset of the time periods during which the target system is operating. For example, the local CDD Control Action Manager component 144 for a decision module 124 may determine a near-optimal local control action using parametric linear approximation to select one of multiple enumerated control values in a manner based on that decision module's local model 145, and with the local CDD Coordinated Control Management component 146 determining a synchronized or otherwise coordinated consensus set of control actions that reflect other of the decision modules 124, including to update the decision module's local sub-model 145 as appropriate based on such local and/or synchronized control actions that are determined. Thus, during execution of the automated control system 122, the automated control system performs various interactions with the target system 160, including to request state information, and to provide instructions to modify values of or otherwise manipulate control elements 161 of the target system 160. For example, for each of multiple time periods, decision module 124a may perform one or more interactions 169a with one or more control elements 161a of the target system, while decision module 124b may similarly perform one or more interactions 169b with one or more separate control elements B 161b, and decision module 124n may perform one or more interactions 169n with one or more control elements N 161n of the target system 160. In other embodiments and situations, at least some control elements may not perform control actions during each time period. One or more other components may further perform other activities during such control of the target system 160, although such other activities are not illustrated in the example of FIG. 1C.

In addition, while example target system 2 170 of FIG. 1B is not illustrated in FIG. 1C, further details are illustrated for decision module 128 of automated control system 126 for reference purposes, although such a decision module 128 would not typically be implemented together with the decision modules 124 controlling separate target system 1 unless the two target systems were associated (interacting with each other or otherwise have coordinated activities). In particular, the deployed copy of automated control system 126 includes only the single executing decision module 128 in this example, although in other embodiments the automated control system 126 may include other components and functionality. In addition, since only a single decision module 128 is implemented for the automated control system 126, the decision module 128 includes a local CDD Control Action Manager component 184, and may optionally further include one or more other local CDD components (not shown), but does not in the illustrated embodiment include any local CDD Coordinated Control Management component (since there are no other decision modules with which to interact in order to synchronize or otherwise coordinate).

While not illustrated in FIGS. 1B and 1C, the distributed nature of operations of automated control systems such as those of control system 122 allow partially decoupled operations of the various decision modules, include to allow modifications to the group of decision modules 124 to be modified over time while the automated control system 122 is in use (e.g., to add new decision modules 124 and/or to remove existing decision modules 124). In a similar manner, changes may be made to particular decision modules 124 and/or 128, such as to change rules or other restrictions specific to a particular decision module over time and/or to change goals specific to a particular decision module over time, with a new corresponding model being generated and deployed within such a decision module, including in some embodiments and situations while the corresponding automated control system continues to control operations of a corresponding target system. In addition, improvements to functionality of particular decision modules may reflect operations of one or more CDD components (e.g., a control action state manager component) to improve and use distribution functions corresponding to one or more control system impedance actuators that regulate one or more respective control elements of the target system at one or more times. In addition, while each automated control system is described as controlling a single target system in the examples of FIGS. 1B and 1C, in other embodiments and situations, other configurations may be used, such as for a single automated control system to control multiple target systems simultaneously and/or serially (e.g., multiple inter-related target systems, multiple target systems of the same type, etc.), and/or for multiple automated control systems to operate together to control a single target system, such as by each operating independently to control different portions of that target control system. It will be appreciated that other configurations may similarly be used in other embodiments and situations.

For illustrative purposes, some embodiments are described below in which specific types of data are gathered and used in particular manners to perform specific types of control actions for specific types of target systems, including via use of particular types of techniques to determine particular control actions to perform. However, it will be understood that such described techniques may be used in other manners in other embodiments, including with other types of target systems, and that the invention is thus not limited to the exemplary details provided.

As noted above, in at least some embodiments, a model of a target system to be controlled and/or an element of a target system (e.g., an individual internal supercapacitor or battery component of a battery cell) is encoded as a data Hamiltonian model that is a function of three types of variables (state variables, momentum variables and control variables), and is composed of three additive elements (the physical model, the constrained model and the learned model). The physical and constrained models are determined respectively by the physical principles characterizing the system and operational requirements. For example, the three types of variables used in the function for the data Hamiltonian model for a battery cell may include a vector defining the state of the battery cell, a vector defining the momentum of the battery cell, and a vector of action variables that control the battery cell, and the additive elements that compose the data Hamiltonian model may include at least Hamiltonians $H_0$ and $H_C$, where $H_0$ is the physical Hamiltonian of the battery cell, $H_C$ is the constrained Hamiltonian representing the known operational and requirement constraints, and the total Hamiltonian model is in the form $H_T = H_0 + H_C$, where $H_0$ and $H_C$ are determined from stored operational rules and historical data of the battery cell. The total Hamiltonian model $H_T$ has the same properties of the Hamiltonian of classic mechanics, but adapted to electrical devices. In addition to the total Hamiltonian model $H_T$ that characterizes the dynamic target system, a control system implemented by the described techniques may in some embodiments use a specified desired behavior Hamiltonian $H_D$, which reflects the desired behavior of the system under control, and affects the dynamics of the control signal produced by the control system. The total Hamiltonian model $H_T$ encodes the evolution of the battery cell system under control, with the evolution represented in the form of the extended Hamilton Jacobi equations, as follows:

$$\frac{dq(t)}{dt} = \frac{\partial H_T}{\partial p(t)}$$

$$\frac{dp(t)}{dt} = -\frac{\partial H_T}{\partial q(t)}$$

$$\frac{du(t)}{dt} = -\Gamma * \frac{\partial}{\partial u}\left(\frac{d(H_T - H_D)^2}{dt}\right)$$

where q(t) is the state vector of the battery cell being learned, p(t) is their momentum, and u(t) is the control action vector. The first two equations are classic evolution equations of the dynamics of the dynamic target system, and the last equation describes control of the battery cell on the DC side to satisfy constraints and approximate the desired behavior represented by $H_D$. The parameter is an empirical parameter to enhance stability of the control system.

Turning now to FIGS. 2A-2I, these figures illustrate examples of an automated control system performing techniques to improve functionality of individual battery cells in a target system with multiple inter-connected battery cells (e.g., as part of an electric vehicle target system) based on control decisions make for individual battery cells and their internal components, where each battery cell has one or more internal supercapacitor components in parallel with at least one internal battery cell component, and the automated control system coordinates control decisions for each of those internal components in a battery cell based on its internal state and associated information (e.g., to determine particular control actions to perform by selecting from multiple enumerated possible control values to modify control system actuators that control DC power from the battery cell components, so as to control how much electrical current flows from and/or to each of the battery cell components). In such embodiments in which a target system has one or more battery cells that each has one or more internal supercapacitor components and at least one internal battery component, the corresponding automated control system may include a plurality of decision modules that each separately controls one of the internal components of one of the battery cells, and that synchronizes or coordinates its operations with those of other decision modules in the manners described further below.

Figure 2A:
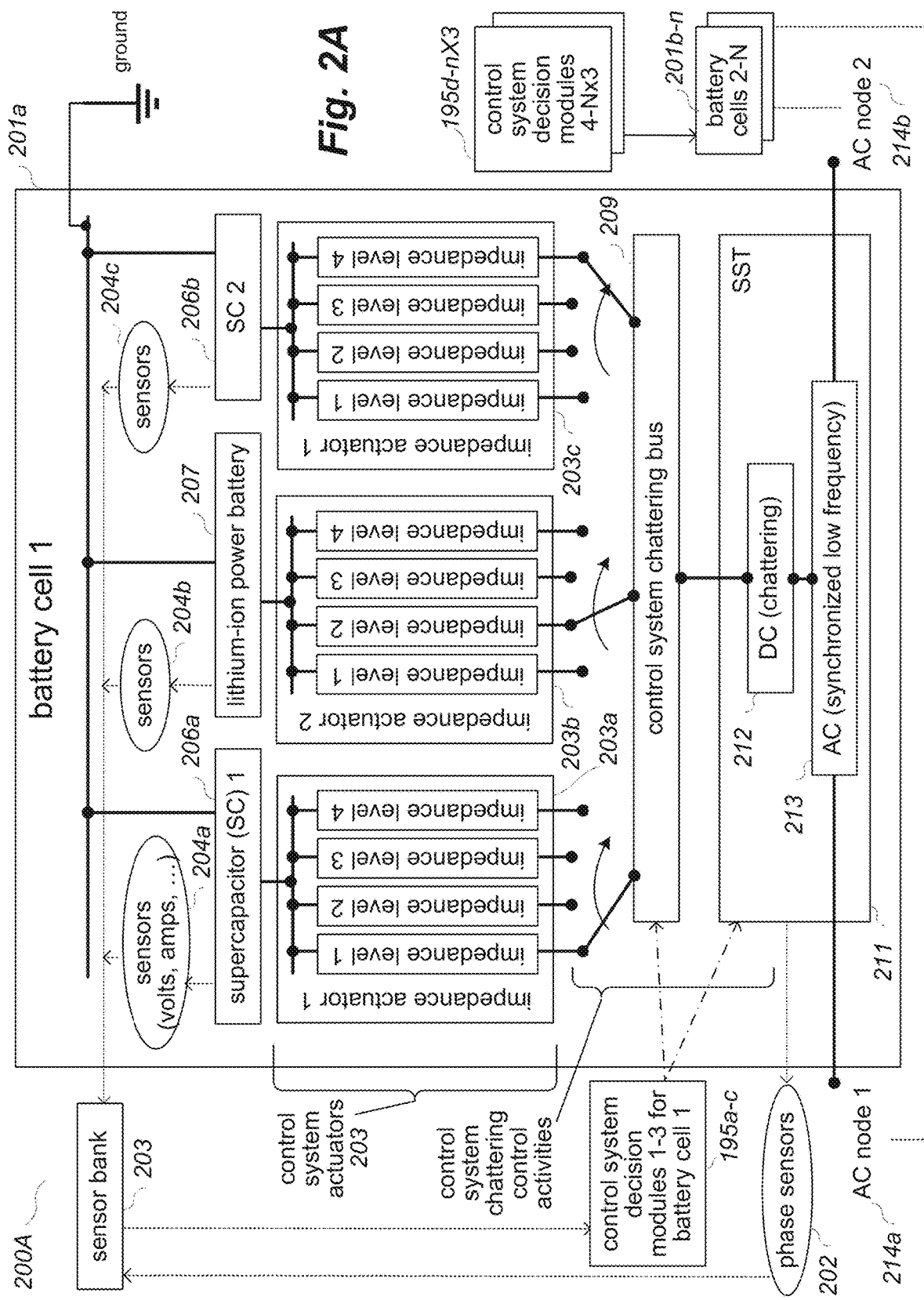
FIGS. 2A-2I illustrate examples of performing techniques to automatically and repeatedly determine control decisions for usage of individual battery cells in a target system with multiple interconnected battery cells, by determining and implementing control actions that modify actuators for each battery cell affecting operations of internal components of the battery cell.

In particular, FIG. 2A has similarities to FIG. 1A, but further illustrates information 200A about the use of an example embodiment 195 of the control system that has multiple decision modules used to control multiple associated internal supercapacitor and battery components of a plurality of N battery cells, with additional details shown for an example embodiment of a lithium ion battery cell 201a (battery cell 1) that is one of N inter-connected battery cells 201, and has three internal components 206a-c being controlled by three associated decision modules 195a-c of the control system 195—additional battery cells 2-N (respectively 201b-201n) and having internal components being respectively controlled by associated control system decision modules 4-N×3 (respectively 195d-195n×3) are illustrated, but their details are not shown in this example. For example, in at least some embodiments involving a physical target system that includes battery cells used to store and provide electrical power, the automated operations to control the target system may include using characteristics of each battery cell's state to perform automated control of AC (alternating current) power that is output from the battery cell via restricting corresponding DC (direct current) power available from the battery cell before the DC power is transformed to AC output—in some such embodiments, such control may include using a DC-to-AC transformer and/or amplifier (e.g., part of a solid-state transformer (SST) 211, or other field-effect transistor, or FET, amplifier) connected to the battery cell to control an amount of electrical current and/or voltage being output from the battery cell (e.g., in a real-time manner and to optimize long-term operation of the battery cell). Such a DC-to-AC transformer/amplifier may, for example, be part of a flyback converter that steps down voltage while stepping up current from its input (supply) to its output (load) and/or that steps up voltage while stepping down current from its input (supply) to its output (load), as discussed further with respect to FIG. 2D. In addition, in some embodiments and situations, other inter-connected battery cells 201b-n may be controlled in a similar manner by using multiple other control system decision modules 195d-n×3 that are each associated with one of those battery cells' internal components, and with the overall control of the battery system of multiple battery cells being coordinated in a distributed manner using mean field techniques (e.g., in a manner similar to that discussed in FIG. 1C, 2B, 2F and elsewhere herein), such as based on pairwise interactions between the multiple associated control system decision modules for the multiple battery cells' internal components with an intermediate shared model. A system that includes battery cells to be controlled may further include additional components in some embodiments and situations, such as one or more electrical loads to receive power output from the battery cells, and/or one or more electrical sources to supply power to the battery cells, with additional details illustrated in FIGS. 2F-2I and elsewhere herein for example embodiments in which the target system is an electric vehicle—another non-exclusive example of such a type of system that is not illustrated in FIGS. 2A-2I is a micro-grid with one or more home or business electrical power systems that may optionally include electrical generation sources (e.g., solar panels, wind turbines, etc.) as well as electrical load from the house or business.

As part of controlling use of lithium ion battery cell 201a in FIG. 2A, various illustrated components interact to control operations of the battery cell according to one or more defined goals in light of defined constraints, rules and other information, as discussed elsewhere herein. In some embodiments, the automated activities to control the battery cell may be performed in a real-time manner and/or to optimize long-term operation of the battery cell (e.g., the life of the battery cell), while satisfying as many external requests for power (e.g., for a load to which the battery cell can supply power) as is possible (e.g., at least a defined percentage or quantity of such requests)—for example, the control system decision modules 195a-c may attempt to fully or partially satisfy a request for power (not shown) for battery cell 1 in a real-time manner if the request can be satisfied in a way that also satisfies other constraints on the battery cell performance given the current state of the battery cell and the defined goal(s), such as to enable the battery cell to operate in a desired non-saturation range or level (e.g., with respect to an internal temperature of the battery cell and/or internal chemistry of the battery cell). Accordingly, various sensor information may be gathered for each of the internal battery and supercapacitor components (e.g., high-frequency voltage and current, external temperature, internal temperature, etc., such as by sensors 204a-c) and for the SST 211 (e.g., AC power phase, such as by sensor(s) 202), and supplied to the control system decision modules 195a-c via sensor bank 203 for use in the automated control decisions by the control system decision modules 195a-c.

In addition, the control commands sent from the control system decision modules 195a-c for actuators 203a-c for battery cell 201a may have various forms in various embodiments, such as particular impedance levels for the actuators 203 to implement, or more generally to specify an amount of power to be generated as output of the battery cell, and/or for the battery cell to receive electrical power from one or more sources (not shown) to be stored for later use (e.g., at different time periods, or otherwise at different times). In particular, in the illustrated embodiment, each of the internal supercapacitor component 1 206a, internal lithium-ion battery component 207 and internal supercapacitor component 2 206b has a separate associated impedance actuator with four possible impedance levels, with those associated impedance actuators being impedance actuator 1 203a, impedance actuator 2 203b and impedance actuator 3 203c, respectively—furthermore, the control system decision modules 195a-c each provides corresponding control instructions (optionally via the DC (chattering) component 212 of the SST 211) that the control system chattering bus 209 uses to implement one or more particular impedance levels for one of the impedance actuators 203. In particular, the DC (chattering) component 212 determines, for each impedance actuator 203a-203c and each time period of control, a time-division multiple sequence of frequencies of the multiple impedance levels to use during the time period, as discussed further below, although in other embodiments the impedance levels may be determined and/or implemented in other manners. Similarly, in other embodiments, other quantities of possible impedance levels may be used within some or all impedance actuators (whether more or less than four), and different impedance actuators within a battery cell and/or between battery cells may have different quantities of possible impedance levels. While not illustrated in FIG. 2A, the control system decision modules 195a-c may further include dynamically generated models for the battery component and the supercapacitor components, such as in a manner similar to that illustrated in FIG. 1A.

In the example of FIG. 2A, the internal lithium-ion battery component 207 is placed in parallel with two internal supercapacitor components 206a-b (e.g., lithium-ion supercapacitors), although in other embodiments only a single supercapacitor or more than two supercapacitors may be included, and in some cases supercapacitors with different characteristics (e.g., supercapacitors of different types) may be used together in a single battery cell. The impedance actuators 203a-c are each associated with and in series with a respective one of the components 207, 206a-b, and are each controlled by a respective one of the control system decision modules 195a-c during each of a series of time periods, to adjust an amount of current being provided to or from each of the associated components 207, 206a-b during those time periods (such that the impedance is decreased for a component when more power is desired, and is increased when less power is desired)—in at least some embodiments, the impedance is implemented electronically with switches that do not increase dissipation. The impedance actuators 203a-c are each controlled in this example during a particular control time period using a generated time-division multiplex sequence of frequencies for connecting the four impedance levels in series to the corresponding battery or supercapacitor component. Each impedance actuator is independently controlled by one of the decision modules 195a-c, and the DC output power of the battery cell at a given time is the sum of the output of each of the three components 207, 206a-b in the battery cell, with such DC output being further coordinated (e.g., in real-time) via an internal mean field for the battery cell, as discussed further with respect to FIG. 2B. The SST component 211 of that battery cell further uses similar mean field coordination techniques for phase synchronization with other nearest neighbor battery cells on the AC output side of the battery cell (e.g., by the AC (synchronized low frequency) component 213 of the SST 211), such as to synchronize the AC output of battery cell 1 with that of nearest neighbor AC nodes 1 and 2 (respectively 214a-b) of other battery cells 2-N, as is also discussed further below.

As discussed elsewhere, the control system decision modules 195a-c may determine one or more control actions to implement for the internal components 206a-b, 207 at a given time period in light of current state information and one or more defined goals during an available time window (e.g., as included in a current total Hamiltonian model of the battery cell, and/or in separate current total Hamiltonian models of each of the internal components 207, 206a-b)—such control actions may, for example, correspond to one or more of whether to supply or receive power, how much power to supply, etc., and in some embodiments particular impedance levels to implement for the battery cell actuators 203 to produce those effects. In particular, the control system decision modules 195a-c may receive feedback from the sensors 203 corresponding to current operation of the battery cell 201a as regulated by the actuators 203, and a control state manager component (not shown) of the automated control system may use the feedback as part of performing repeated iterations involving solving a linear approximation of a non-linear control space to determine an improved distribution function over a control space that include multiple enumerated impedance level control values with respect to the one or more defined goals and involving propagating the improved distribution function over later time periods via use of the model(s) for the battery cell, with the final improved distribution function after the iterations used to determine a particular impedance level control values for use in the impedance actuators to improve battery cell functionality.

In this manner, the architecture of each of the battery cells in this example embodiment combines a large charge capacity of the battery component with short charge capacity of the supercapacitors, with the supercapacitors and battery being controlled in a manner to protect the battery component from overshoot transients during load variations, such as to control the impedance levels of the battery to restrict electrical current flow to or from the battery component at certain times while using the impedance levels of the supercapacitor component(s) to handle the overflow in electrical current supply or demand. As supercapacitors respond to variations with much shorter time constants than a typical lithium-ion battery component, the combination of the battery component and one or more supercapacitor components in the battery cell architecture allows for more efficient transfer of power without large heat excursions.

In the example of FIG. 2A, the control system decision modules 195a-c implement a feedback control law for each of the impedance actuators 203a-c that depends on sensory data, such as sensors 204a-c to provide at least a high frequency voltmeter and ammeter (e.g., that respond in the 100 KHz range) for each of the internal components 207, 206a-b, and one or more sensors 202 to provide at least a phase meter and a voltmeter (e.g., that respond in the 100 Hz range) for the AC output of the SST 211. The sensor data is provided to the sensor bank 203 for the battery cell 201a, and used to tune or otherwise generate a dynamic model (not shown) of each internal component 207, 206a-b, as discussed in greater detail below. The SST 211 may be, for example, a switched transformer that converts a high-frequency chattering signal on the DC side to a low-frequency AC power signal on the AC side, such as with a switch signal on the DC side that is implemented with a MOSFET (metal-oxide-semiconductor field-effect transistor) controllable switch that responds to the chattering switch between impedance levels, and with a switch on the AC side that is tuned to the AC frequency of the load. During charging operations, the SST operates in reverse from the AC side to the DC side. The charging and discharging of the battery cell is controlled in a manner to maintain the power flow of the battery cell at a range depending on a level of current charge, but ensuring that the rate of power flow is consistent with optimal health of the battery cell.

In addition, in some embodiments the control system may be implemented as multiple separate sub-components (e.g., with one or more local controller sub-components implemented in whole or in part in hardware and/or firmware that is attached to the battery cell or otherwise at a location of the battery cell, and with other remote sub-components or other portions of the control system (agent) implemented in part by software instructions executing on one or more computing systems remote from the battery cell location and optionally communicating with the local controller module(s) over one or more intervening computer networks), while in other embodiments the control system decision modules may be implemented as a single component (whether at the location of the battery cell or remote from it). While not illustrated with respect to FIG. 2A, the quantity N of the battery cells in the target system's battery system may correspond to tens, hundreds, thousands, millions, etc. of battery cells that are interconnected and each have associated decision modules/control agents that control actions of that battery cell's internal supercapacitor and battery components in a similar manner, and with the various battery cells acting together in a coordinated manner via AC phase synchronization to supply aggregate power to a load (e.g., an electric vehicle, a power grid of utility system, etc.). In such embodiments, the entity with the load may send synchronization and monitoring signals for use by battery cells, and the multiple decision modules/control agents associated with the various battery cells may interact to exchange information and maintain at least partial coordination between the operations of the battery cells.

Some further aspects of performing automated operations to control such a target system with one or more battery cells and/or other types of electrical devices as part of target systems are included in U.S. patent application Ser. No. 15/096,091, filed Apr. 11, 2016 and entitled "Using Battery DC Characteristics To Control Power Output;" and in U.S. patent application Ser. No. 15/410,647, filed Jan. 19, 2017 and entitled "Using Sensor Data To Assist In Controlling A Target System By Modeling The Functionality Of The Target System," which claims the priority benefit of U.S. Provisional Patent Application No. 62/336,418, filed May 13, 2016 and entitled "Using Sensor Data To Assist In Controlling A Target System By Modeling The Functionality Of The Target System;" in U.S. patent application Ser. No. 16/103,788, filed Aug. 14, 2018 and entitled "Using Battery State Excitation To Control Battery Operations"; and in U.S. Patent Application No. 62/796,581, filed Jan. 24, 2019 and entitled "Using Battery State Excitation To Model And Control Battery Operations"; in U.S. patent application Ser. No. 16/103,788, filed Aug. 14, 2018 and entitled "Using Battery State Excitation To Control Battery Operations"; in U.S. Patent Application No. 62/796,521, filed Jan. 24, 2019 and entitled "Model Realization Algorithm"; and in U.S. Patent Application No. 62/796,581, filed Jan. 24, 2019 and entitled "Using Battery State Excitation To Model And Control Battery Operations"; each of which is hereby incorporated by reference in its entirety.

In at least some embodiments, initial modeling of a state of a target system is performed using one or more data Hamiltonian functions, and a control state manager component may be provided that uses one or more types of sensor data to improve functionality of the control system during its operation. A CDD system controlling such a target system may, in at least some embodiments and situations, implement multiple CDD decision modules (also referred to at times herein as CDI, or Collaborative Distributed Inferencing, control agents, such that a particular embodiment of the CDD system with one or more such CDI control agents may be referred to as a CDI system) to distribute the control and management through an agent-based network with synchronization via mean field Hamiltonian techniques, such as with each decision module/agent characterized by a data Hamiltonian that defines the dynamics and interaction of one or more corresponding components in the target system, and with each such data Hamiltonian of a decision module/agent being dynamically computed from sensory data and actions. Such a data Hamiltonian (for a single target system decision module/agent) and/or mean field Hamiltonian (for multiple coordinated target system decision modules/agents) can be thought of as a mathematical function that helps navigate a query through huge bodies of information by defining a spectrum of possible outcomes, including to model history, current situation and possible options. Non-exclusive example embodiments using such techniques are further described herein, but it will be appreciated that other embodiments may differ in one or more manners from these example embodiments.

A data Hamiltonian may be implemented as a function that captures the flow and interdependence of a data domain, and may have three types of variables (e.g., state variables, flow variables, and decision or control variables). A CDI control agent may be implemented as an optimization-based engine operating in a data domain that belongs to a multi-data domain, with agent optimization functionality encoded in the agent's Hamiltonian to use a formal, distributed rule-based process for resolving time-based queries from a distributed agent-based domain in real-time. A CDI control agent of the CDD system may be implemented using Horn clause rules of up to three types, as follows: absolute rules that characterize the physics of a physical target system being controlled (or otherwise describe unchangeable rules in other types of target systems), and have truth value equal to true in any Hamiltonian realization (e.g., a value of 0 for false or 1 for true); hard rules that characterize the desired behavior and goals, and have truth value equal to true in any Hamiltonian realization (e.g., a value of 0 for false or 1 for true); and soft rules that characterize the empirical knowledge of the operation, heuristic strategies, economic dispatch, and response to anomalies and learning strategies, and have a variable, probabilistic truth value in [0,1], as well as an associated confidence value for that variable, probabilistic truth value in some embodiments. Meta-rules that are special kinds of soft rules may be used to transform sensory data and desired behavior into constraint data Hamiltonians. Soft rules can be thought of as being used to navigate queries through "gradients" (information that is neither true nor false), as a means of identifying what areas of data are pertinent to any given query. Conversion of constraints for a CDI control agent may include the following: transform truth values $\{0,1\}$ to a [0,1] interval; transform variables and parameters to continuous variables and parameters; transform absolute rules to equality constraints; transform hard rules to equality constraints; transform soft rules to inequality constraints; transform inclusion sets to functional forms; transform algorithms to differential equations; etc.

Some further aspects of implementing such techniques for modeling target systems and performing automated operations to control such target systems, including in a distributed manner using multiple agents, are included in U.S. patent application Ser. No. 14/746,738, filed Jun. 22, 2015 and entitled "Cooperative Distributed Control Of Target Systems;" in U.S. Patent Application No. 62/182,968, filed Jun. 22, 2015 and entitled "Applications Of Cooperative Distributed Control Of Target Systems;" in U.S. Patent Application No. 62/182,796, filed Jun. 22, 2015 and entitled "Gauge Systems;" and in international PCT Patent Application No. PCT/US2015/037022, filed Jun. 22, 2015 and entitled "Cooperative Distributed Control Of Target Systems," each of which is hereby incorporated by reference in its entirety.

Figure 2B:
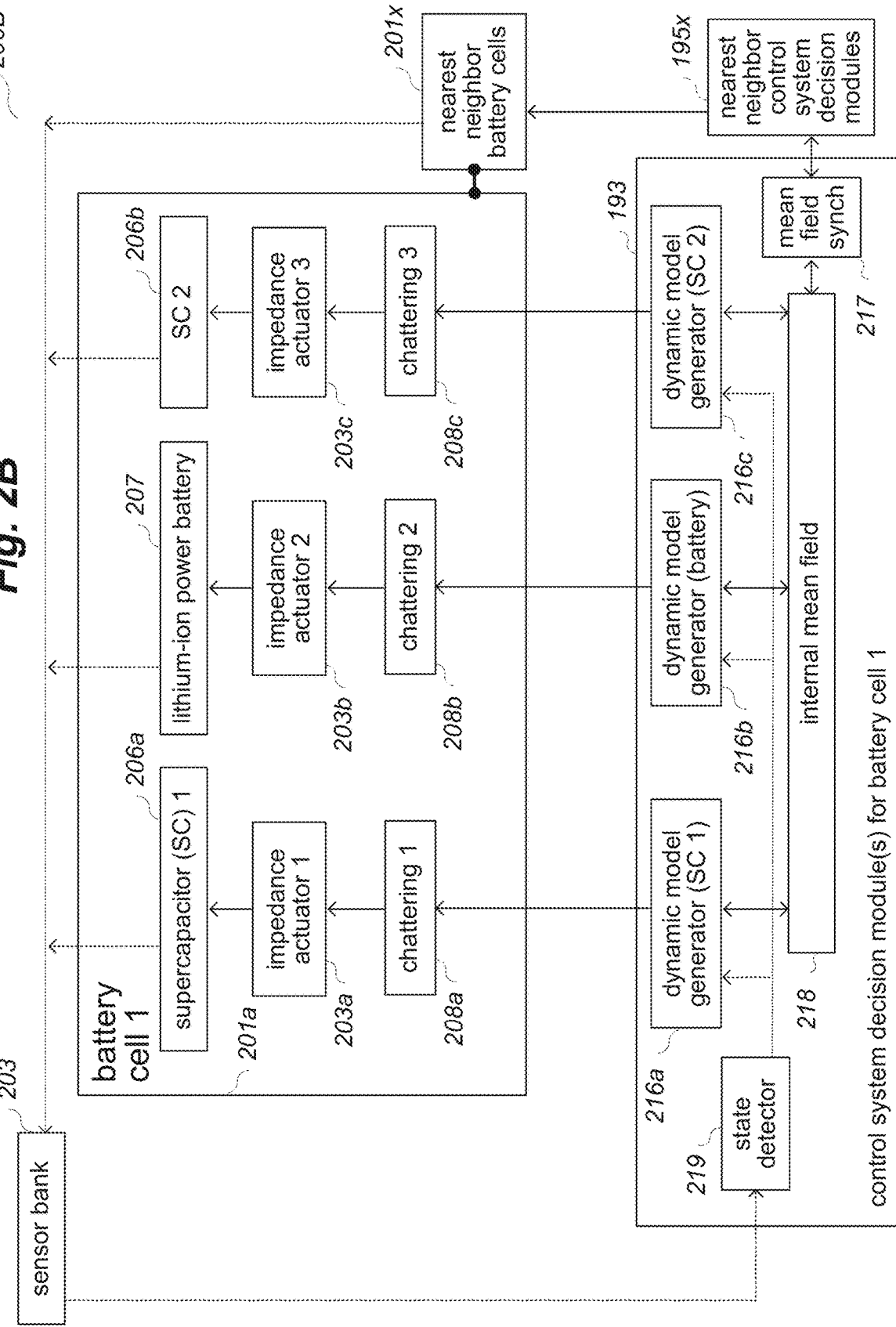

FIG. 2B continues the example of FIG. 2A, and provides additional details 200B about operations of the control system decision modules 195a-c discussed with respect to FIG. 2A (shown as a part 193 of the overall control system 195 in FIG. 2B), while not including some of the other details of FIG. 2A. In particular, FIG. 2B illustrates battery cell 1 201a, and its internal battery 207 and supercapacitor components 206a-b, and the internal impedance actuators 203a-c, as well as nearest neighbor battery cells 201x (e.g., one or more of the battery cells 201b-201n of FIG. 2A) and their respective associated control systems 195x (e.g., some of the control systems 195d-195n×3 of FIG. 2A), and sensor bank 203, but does not include SST 211 of FIG. 2A and other details of FIG. 2A. FIG. 2B further illustrates chattering 1-3 elements (respectively 208a-208c) of the battery cell 1 that set the impedance levels of respective impedance actuators 1-3 (respectively 203a-203c) based on control instructions provided by the control system decision modules 195a-c (in particular, using respective sub-models, not shown, produced by dynamic model generator elements 216a-216c of the control system decision modules 195a-c). The state detector element 219 further detects a state of each of the internal components 206a-b, 207 in the battery cell 1, using sensor data from the sensor bank 203, with the state information provided to the dynamic model generators 216a-c and reflected in the corresponding sub-models (not shown) produced for the internal components 206a-b, 207, such as for use in modifying both the criterion and propagator dynamics in chattering activities that are performed by the chattering elements 208a-208c to select frequencies of the impedance levels to use. Additional details regarding an example embodiment of chattering activities are included below with respect to FIG. 2C.

In the example of FIG. 2B, the dynamic model generators 216a-216c of the decision modules 195a-195c (not shown separately in FIG. 2B) include a separate dynamic model generator associated with each of the internal components 206a, 207 and 206b, respectively, of the battery cell 1. The dynamic model generator for each internal component generates a Hamiltonian representation model (not shown) of the corresponding internal component's dynamics, along with data tomograph functionality (not shown) for performing model updates during operation based on feedback from the sensor bank 203. In operation, the data tomograph functionality may obtain and analyze data (e.g., from sensor devices) about operations of a target system (or of particular battery cells and their internal components) in order to generate an improved model of a current state and operational characteristics of the target system and/or of the particular battery cells and their internal components, with the improved updated model(s) used as part of determining further current and/or future automated control actions to take for the corresponding elements of the target system—such improved model generation activities may include, for example, analyzing prior input data to the target system and resulting behavior of the target system to generate a function and/or other structure that models internal operations of the target system (rather than merely attempting to estimate target system output from input without understanding the internal structure and operations of the target system), and that in at least some cases completes or repairs or otherwise addresses conflicts in state information for one or more parts of the target system (such as from lack of sufficient internal state structure information or other information), and to enable learning of or other improvements to a function or other model of the target system's internal state and operational characteristics). Additional details regarding such Hamiltonian representation models and operations of such data tomograph functionality are included in U.S. patent application Ser. No. 15/410,647, filed Jan. 19, 2017 and entitled "Using Sensor Data To Assist In Controlling A Target System By Modeling The Functionality Of The Target System," which claims the priority benefit of U.S. Provisional Patent Application No. 62/336,418, filed May 13, 2016 and entitled "Using Sensor Data To Assist In Controlling A Target System By Modeling The Functionality Of The Target System;" each of which is incorporated herein by reference in its entirety.

The decision modules 195a-c containing the dynamic model generators 216a-216c of FIG. 2B also implement mean field synchronization/coordination techniques to generate an internal mean field 218 that coordinates, at the battery cell level, the desired power contribution of each of the internal components 206a-b, 207 at each time period, such as in a pairwise manner of interacting with an intermediate shared model (not shown) for the battery cell. The decision modules 195a-c containing the dynamic model generators 216a-216c also implement mean field techniques to generate command variations that ensure phase synchronization with nearest neighbor battery cells, such as via mean field activities 217 with other control system decision modules 195x associated with nearest neighbor battery cells 201x (e.g., in a pairwise manner of interacting with an intermediate shared model, not shown, for the AC output of those battery cells). The mean field techniques generally include coordinating decision modules' models and state information for internal components of a battery cell with the models and state information of other control system decision modules that are controlling internal components of one or more other battery cells in the target system, so as to synchronize or otherwise coordinate the collective control system functionality (e.g., according to one or more criteria, such as to reduce power dissipation)—additional details regarding such mean field techniques are included in U.S. patent application Ser. No. 16/254,554, filed Jan. 22, 2019 and entitled "Managing Coordinated Improvement Of Control Operations For Multiple Electrical Devices To Reduce Power Dissipation;" which is incorporated herein by reference in its entirety.

As previously noted, the battery cell 201a may be modeled with a Hamiltonian function that includes operational constraints (e.g., based at least partially on a combination of the Hamiltonian representation models of the battery cell internal components 206a-b, 207), and the control system decision modules 195a-c determine control actions for the impedance actuators 203a-203c in which the constraints are satisfied and sensor information from the battery cell (e.g., voltage and current) is compatible with the operational constraints. In at least some embodiments and situations, a completely optimal series of determined impedance levels may not be reached, but the control system decision modules nevertheless improve functionality by increasing desired results (e.g., battery cell life, lack of energy dissipation, etc.). Thus, rules for a control system decision module/agent may be used to define constraints for a data Hamiltonian for the decision module/agent, and converted to a constraint optimization problem that a corresponding CDD system addresses, and optionally with a further control state manager component (not shown) improving control system functionality during use without one or more defined criteria to optimize by instead repeatedly improving a distribution function over the control space and its resulting determined control actions to use in particular situations. Additional details regarding corresponding actions of such a control state manager component to repeatedly perform automated modifications to a control system's ongoing operations to improve functionality for the target system in light of one or more defined goals (e.g., to increase battery life and/or reduce power dissipation while performing other battery power use activities, such as by using parametric linear approximation to determine a control action using one of multiple enumerated impedance levels or other possible values of an available control space that best satisfy one or more defined goals at a given time in light of current state information) are included in U.S. patent application Ser. No. 16/276,545, filed Feb. 14, 2019 and entitled "Controlling Ongoing Battery System Usage Via Parametric Linear Approximation;" which is hereby incorporated by reference in its entirety.

Figures 2C, 2E:
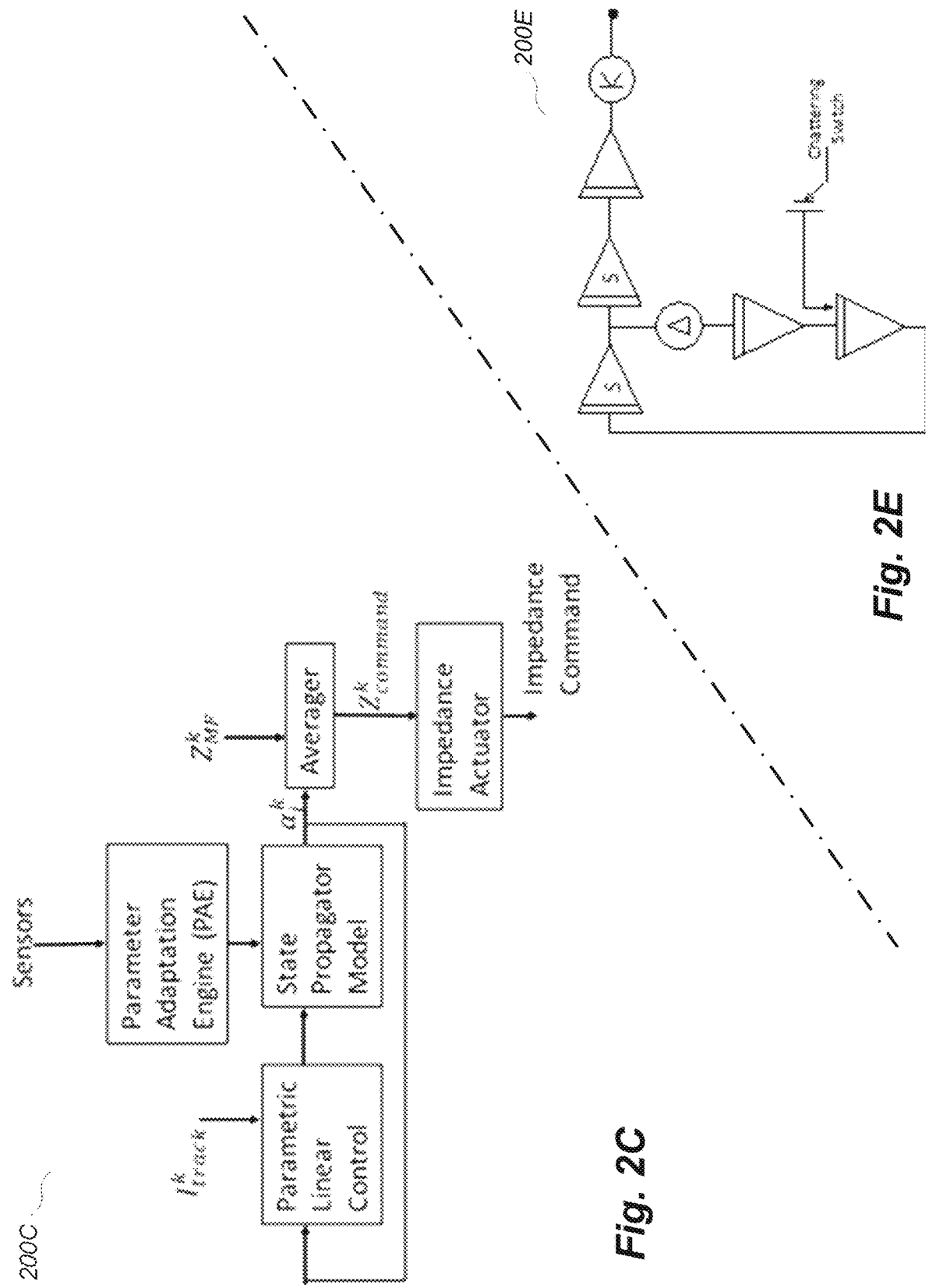

FIG. 2C continues the examples of FIGS. 2A and 2B, and illustrates further details 200C regarding an example embodiment of internal operations of a control system decision module (e.g., by a control action manager component of the control system decision module) that is determining and implementing impedance actuator levels (and optionally associated commands) for an internal component of a battery cell at a particular time period or other time. In particular, in some embodiments, the dynamics of a target system are represented by a vector differential equation in which the control variables are continuous signals as follows:

$$\dot{x}(t) = f(x(t), u(t)) \tag{1}$$

where x(t) is a vector on $R^n$ for every time t and the initial condition x(0) is known, $u(t) \subseteq U \subseteq R^m$ is a vector, n>m for every t measurable almost everywhere, n represents the number of different internal dynamics/state variables (or variable values), m represents the number of possible control actions (also referred to as $s_n$ below in a particular example for a particular $n^{th}$ time interval), $R^m$ is the collection of all m-dimensional tuples of real numbers, U represents the possible control vectors that are valid for every time (which will be a subset of $R^m$ unless all control vectors are possible at that time), and f(•) is a bounded and continuous function of x(t) and u(t). The vector x(t), which is a n-dimensional vector in R^n, represents the internal dynamics of the device under control. Vector u(t), which is a m-dimensional vector in $R^m$, is the control signal vector. Each entry of the vector u(t) represents the particular action that can be done to affect the system behavior. Not all the possible vectors in $R^m$ are valid at each time t, only the elements of $R^m$ that are also members of U are valid at each time t (i.e. U is a subset of $R^m$).

A process is implemented to design a distribution function $\alpha_u(t)$, $0 \le \alpha_u(t) \le 1$, that measures the distribution of the values of the control vector u(t) at time t, and u(t)⊆U. The distribution $\alpha_u(t)$ is chosen to optimize a given criterion of the form $$\min_{u(t)} \int_0^T L(x(t), u(t)) dt$$

which can be expressed in terms of the distribution α(t) as follows $$\min_{\alpha_u(t)} \int_0^T \int_U L(x(t), u) d\alpha_u(t) dt \quad (1)$$

$$\text{s.t.} \int_U d\alpha_u(t) = 1 \text{ for all } t$$

In terms of $\alpha_u(t)$, the dynamics can be written as $$X(t + \Delta) = x(t) + \int_t^{t+\Delta} \int_U f(x(\tau), u) d\alpha_u(\tau) d\tau \quad (2)$$

where Δ is a sample time.

The optimization problem over the distribution $\alpha_u(t)$ can be approximated by an algorithm for solving the optimization that takes into account of inner integrals of both (1) and (2) being Lebesgue integrals. The approximation process is constructed by the following steps:
(1) For each t, approximate the continuous values of u(τ) for τ between [t, t+Δ] with discrete sequence $u_0{}' < u_1{}' < u_2{}' < \ldots < u_s{}'$, $u_i{}' \subseteq U \subseteq R^m$.
(2) Choose Δ to be sufficiently small so that both integrals (1) and (2) can be approximated by summations in which the variable x remains constant over each interval [t, t+Δ]

$$\min_{\substack{\{\alpha_i^{(n)}\} \\ i=1,2,\ldots,s_n \\ n=0,1,\ldots,N}} \sum_{n=0}^{N-1} \sum_{i=1}^{s_n} L(x(n\Delta), u_i^{(n)}) * \alpha_i^{(n)} * \Delta \quad (3)$$

$$\text{s.t.} \sum_{i=1}^{s_n} \alpha_i^{(n)} = 1 \text{ for all } n = 0, 1, \ldots, N-1 \text{ and}$$

-continued $$x((n+1)\Delta) = x(n\Delta) + \sum_{i=1}^{s_n} f(x(n\Delta), u_i^{(n)}) * \alpha_i^{(n)} * \Delta \quad (4)$$

for all $n = 0, 1, \ldots, N-1$ where N*Δ is the horizon of the optimization, n*Δ is the lower boundary of the $n^{th}$ time interval, and $s_n$ is the number of control levels in the $n^{th}$ time interval.
(3) The approximations (3) and (4) have accuracy of the order of ($\Delta^2$*error), where error is the maximum of error due to control sampling.
(4) Two tolerance thresholds are defined: E for the error in the state, and ϕ for the optimization error.

An example implementation of the process uses a parametric linear approximation that operates as follows:
Step 1. Set iteration number l=0; for n=0,1, ..., N-1, and for each i=1, 2, ..., $s_n$, assume that $\alpha_i^{(n,i)}$ is a uniform distribution.
Step 2. Propagate the following equation to obtain $\hat{x}^{(l)}(n\Delta)$ for n=1, ..., N, $$\hat{x}^{(l)}((n+1)\Delta) = \hat{x}^{(l)}(n\Delta) + \sum_{i=1}^{s_n} f(\hat{x}^{(l)}(n\Delta), u_i^{(n)}) * \alpha_i^{(n,l)} * \Delta$$

with $\hat{x}^{(l)}(0) = x_0$
Step 3. Solve the following linear program for improved $\alpha_i^{(n,l+1)}$ $$\min_{\substack{\{\alpha_i^{(n)}\} \\ i=1,2,\ldots,s_n \\ n=0,1,\ldots,N}} \sum_{n=0}^{N-1} \sum_{i=1}^{s_n} L(\hat{x}^{(l)}(n\Delta), u_i^{(n)}) * \alpha_i^{(n,l+1)} * \Delta$$

$$\text{s.t.} \sum_{i=1}^{s_n} \alpha_i^{(n,l+1)} = 1 \text{ for all } n = 0, 1, \ldots, N-1$$

Step 4. Propagate the following equation to obtain $\hat{x}^{(l+1)}(n\Delta)$ for n=1, ..., N, $$\hat{x}^{(l+1)}((n+1)\Delta) = \hat{x}^{(l+1)}(n\Delta) + \sum_{i=1}^{s_n} f(\hat{x}^{(l+1)}(n\Delta), u_i^{(n)}) * \alpha_i^{(n,l+1)} * \Delta$$

with $\hat{x}^{(l+1)}(0) = x_0$
Step 5. Compute tolerances:

$$\text{state\_tolerance} = \sum_{n=1}^{N} \|\hat{x}^{(l+1)}(n\Delta) - \hat{x}^{(l)}(n\Delta)\| / N$$

$$\text{optimization\_tolerance} = \left| \sum_{n=0}^{N-1} \sum_{i=1}^{s_n} L(\hat{x}^{(l+1)}(n\Delta), u_i^{(n)}) * \alpha_i^{(n,l+1)} * \Delta - \sum_{n=0}^{N-1} \sum_{i=1}^{s_n} L(\hat{x}^{(l)}(n\Delta), u_i^{(n)}) * \alpha_i^{(n,l)} * \Delta \right|$$

Step 6. If state_tolerance<∈ and optimization_tolerance<ϕ, stop; otherwise, set l←l+1, and go back to Step 3.

The parametric linear programming above converges if, for the given tolerances, L and f are Leqesque integrable, U is compact, and the levels are well ordered for each time interval. Some further aspects of implementing such techniques for a chattering algorithm are included in U.S. patent application Ser. No. 16/276,545, filed Feb. 14, 2019 and entitled "Controlling Ongoing Battery System Usage Via Parametric Linear Approximation;" which is hereby incorporated by reference in its entirety.

Figure 2D:
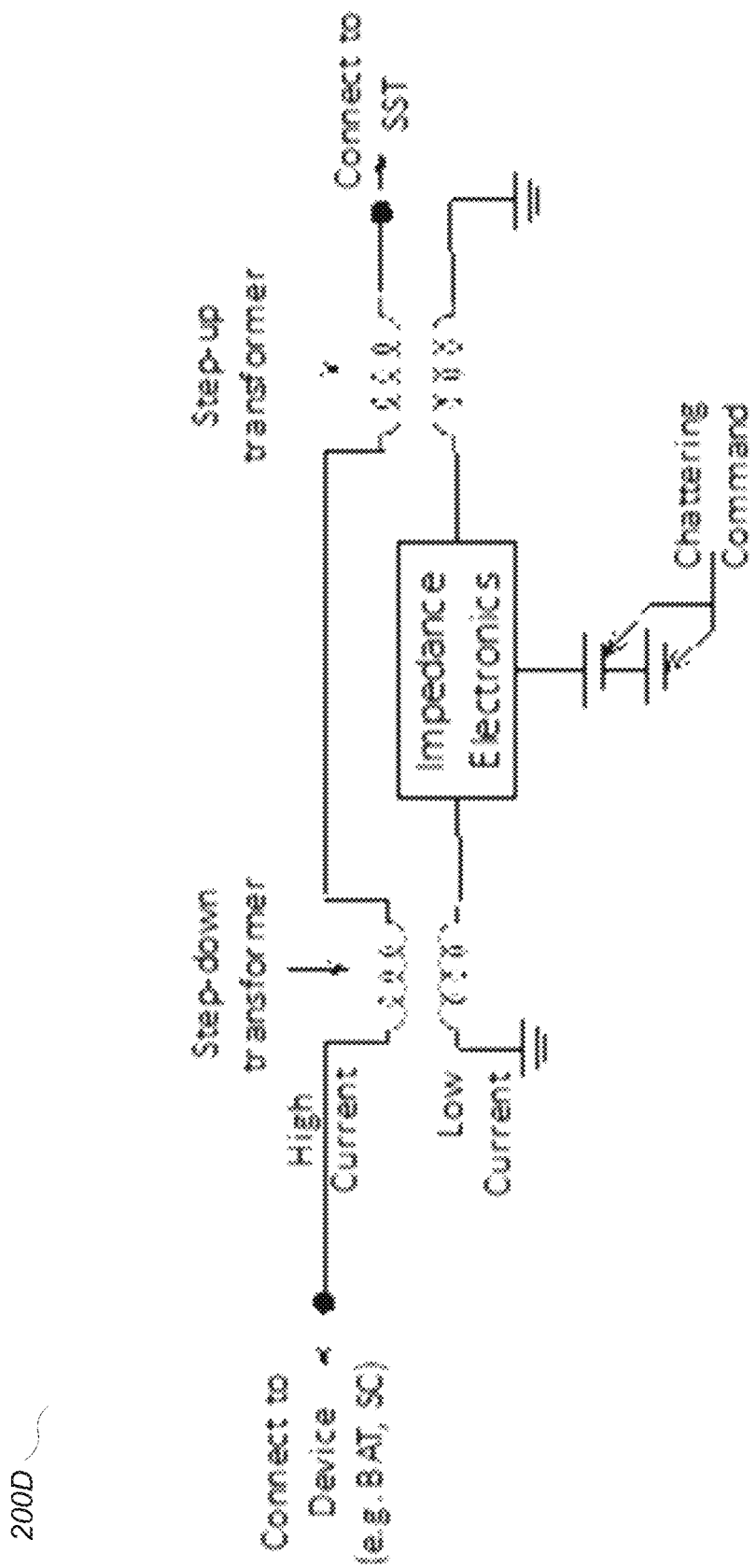

FIGS. 2D and 2E continue the examples of FIGS. 2A-2C, and illustrate further details 200D and 200E, respectively, regarding an example embodiment of an impedance actuator as discussed herein. In particular, FIG. 2D shows an example embodiment of an electrical circuit for one of the impedance actuators 203a-c of FIGS. 2A-2C. The circuit includes an impedance electronics system, and two electrical current transformers. The transformers' function is to separate a high frequency and high magnitude of current in the DC side of a battery cell 201 from a high frequency and low magnitude of current that feeds the impedance electronic system. Each impedance actuator implements an inductive capacitive low dissipation well with variable frequency. The frequency is controlled by a respective one of the chattering elements 208a-c, which also controls which impedance level is used of the multiple possible impedance levels, based on control actions specified by a corresponding control system decision module. In some embodiments, each impedance well is implemented with an operational circuit as shown in FIG. 2E.

Figure 2F:
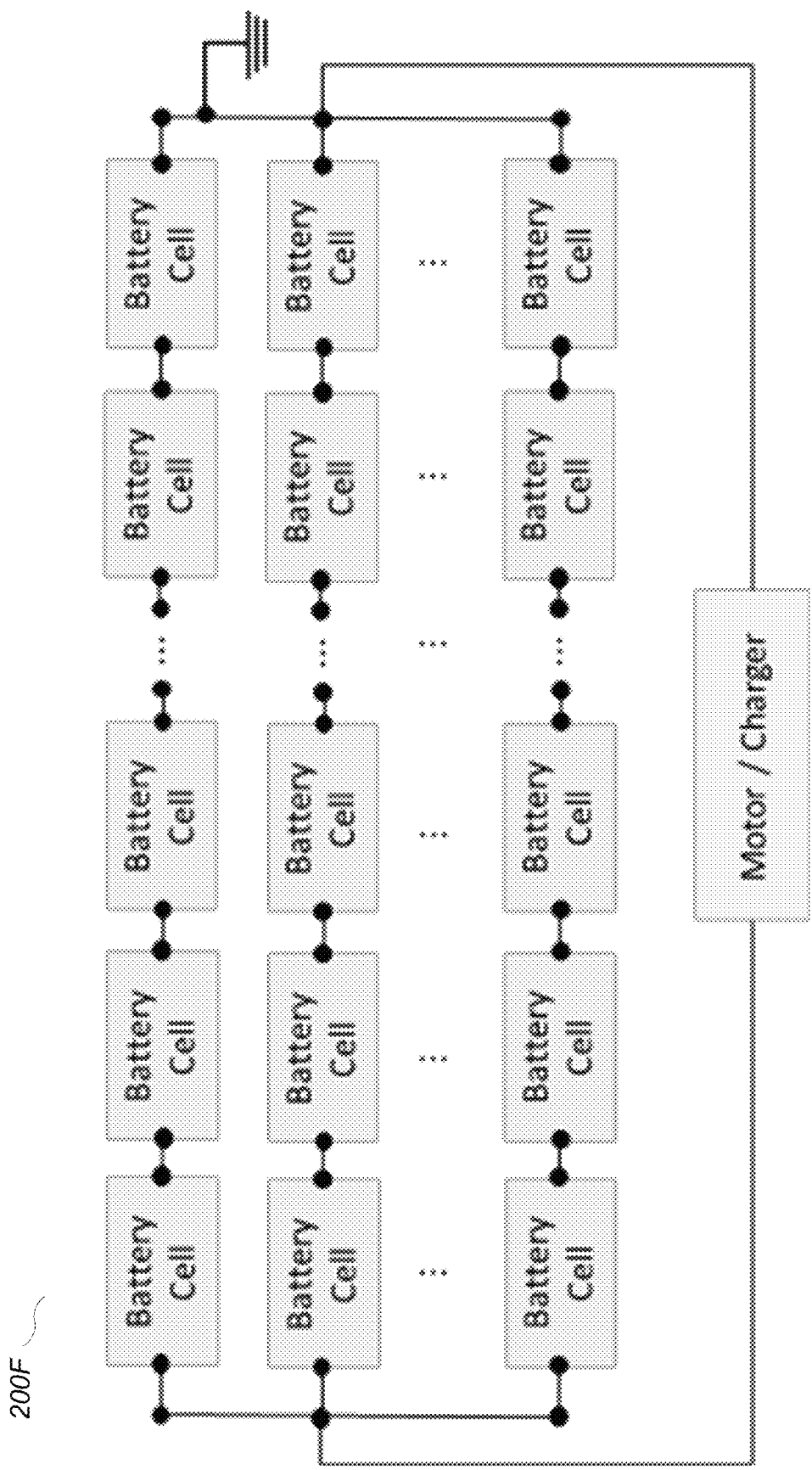

FIG. 2F continues the examples of FIGS. 2A-2E, and illustrates further details 200F regarding an example embodiment of a target system with numerous interconnected battery cells 201 as discussed herein. In this example, the battery cells are interconnected in both series (within each row) and in parallel (across multiple rows). In the example of FIG. 2F, an electrical motor/charger is further connected to the interconnected battery cells 201, such as to provide an electrical load (e.g., if the motor is drawing electrical power from the battery cells to operate) and/or an electrical source (e.g., if the charger is providing electrical power to the battery cells for storage). In at least some embodiments, the motor/charger may be part of an electric vehicle, as discussed further with respect to FIGS. 2G-2I.

Figure 2G:
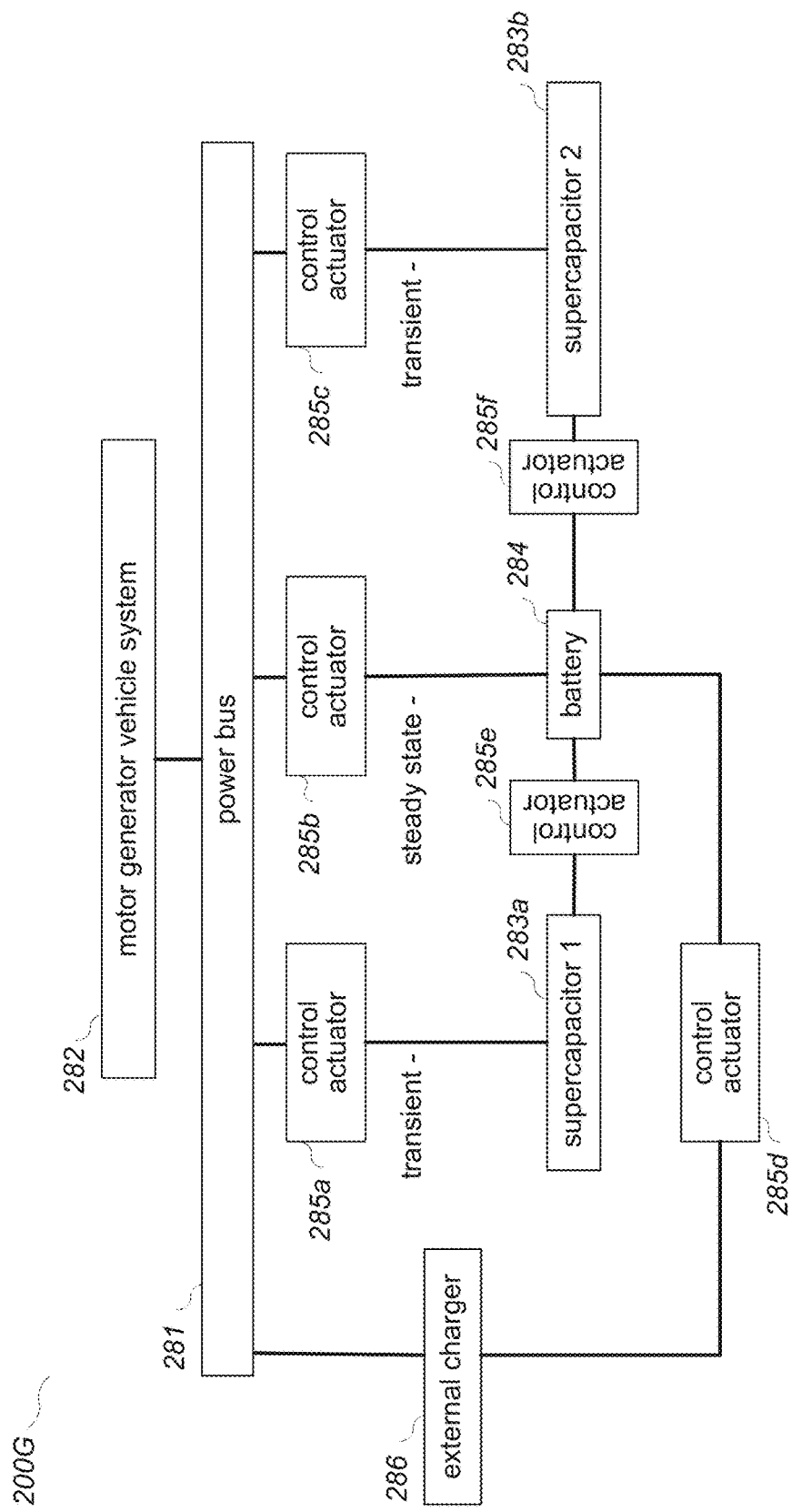
Figure 2H:
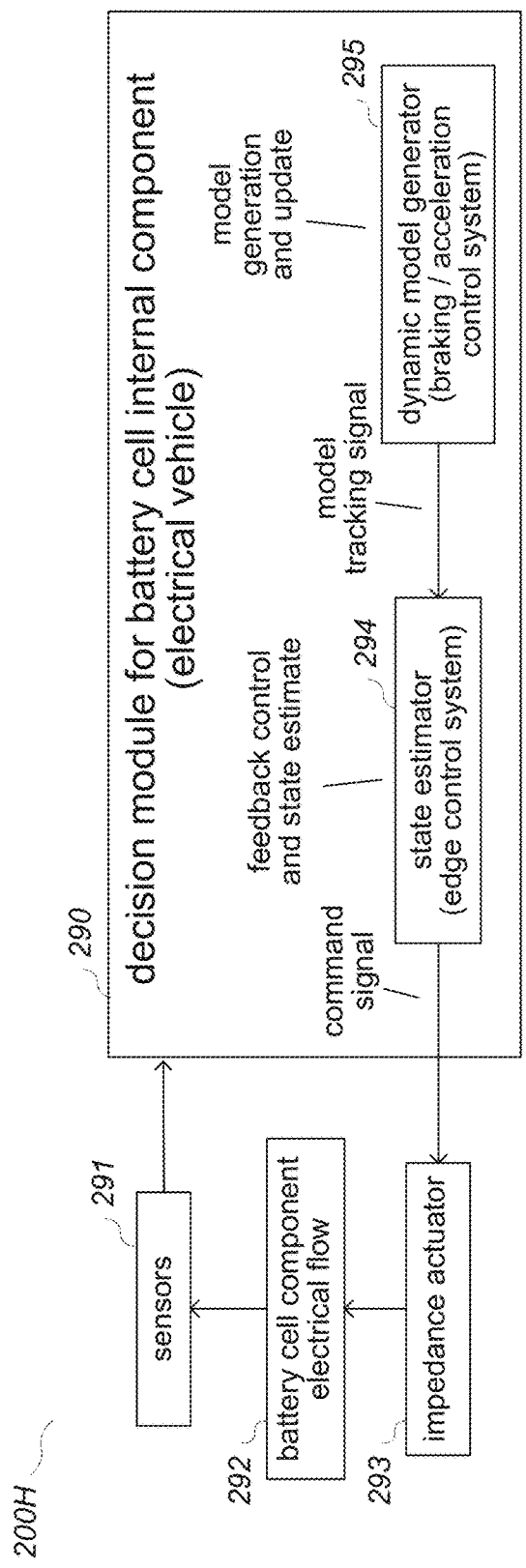
Figure 2I:
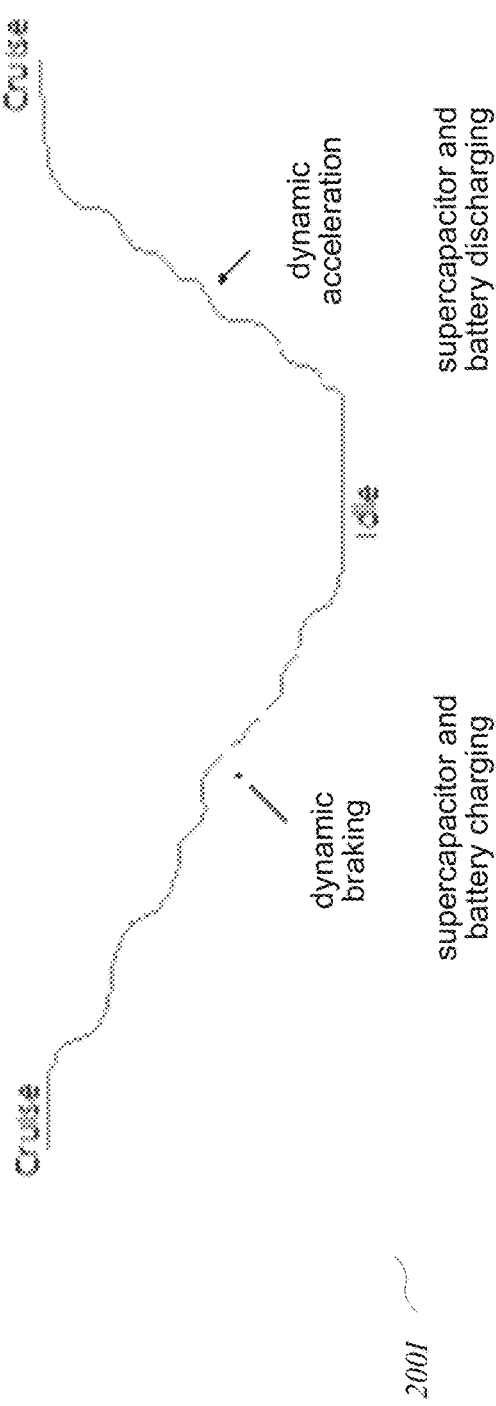

FIGS. 2G-2I continue the examples of FIGS. 2A-2F, and illustrate further details 200G, 200H and 200I, respectively, regarding an example embodiment of a target system including an electric vehicle using one or more battery cells as discussed herein. In particular, FIG. 2G illustrates information 200G regarding a target system that includes or is part of an electric vehicle, with a corresponding motor generator vehicle system 282 being illustrated, and with the control system for the battery cell(s) providing advanced control for variable dynamic braking and acceleration events for electric vehicle operation in this example. In general, electric vehicles are driven by induction motors, in which the motor is driven by an electrical power source during acceleration and during constant speed on flat surfaces (also referred to herein as "cruising"), and in which the motor can be operated as a generator driven by the wheels during braking. The control system and associated battery cell(s) provide a feedback-driven battery-supercapacitor combination to deliver transient energy during acceleration and to recover transient energy during braking, as illustrated in information 200I of FIG. 2I. While only a single battery cell is represented in FIG. 2G (which includes the internal supercapacitor components 283a-b and internal battery component 284), and the associated control system decision modules for the internal components are not illustrated, it will be appreciated that numerous battery cells may be interconnected and used together in at least some embodiments, with multiple corresponding control system decision modules providing distributed coordinated control of the electric vehicle's electrical operations.

In the illustrated examples of FIGS. 2G-2I, control actions are implemented as high-frequency on-off signals that feed impedance actuators for internal battery and supercapacitor components of battery cells, with those impedance actuators acting as electronic command transferring systems that each force input or output of a corresponding internal battery or supercapacitor component under control to experience a port impedance that has a finite number of impedance values. The control system decision module for an internal component of a battery cell selects one of the impedance levels during a variable time interval, with the impedance experienced by an internal battery or supercapacitor component under control being equal to an average impedance determined by control over each time interval of control. The techniques for controlled frequency and level duration at finite impedance levels is referred to at times herein as 'chattering' techniques, using a time division multiplexing system to generate an optimal or near-optimal distribution of impedance levels for the impedance control of the corresponding internal battery or supercapacitor component under control, with respect to an estimate of power being supplied to and/or from elements of the electrical vehicle of the target system.

The elements of FIG. 2G illustrate the power configuration in this example, with each possible power flow to and from the motor system being controlled by a variable impedance actuator 285. FIG. 2H further illustrates example sub-components of a decision module of the control system to perform various of the described techniques for a corresponding one of the internal battery and supercapacitor components, including a state estimator 294 (also referred to as an 'edge control system' in this example) to estimate state and provide feedback control, and a dynamic model generator 295 (also referred to as a 'braking/acceleration control system' in this example) to generate and update models of the corresponding internal battery or supercapacitor component—the illustrated elements determine the value of the impedance level for the corresponding impedance actuator 293 to use to control the electrical flow 292 from the internal component being controlled, as reflected by the sensors 291 that provide feedback to the control system decision module 290, with the control for the corresponding internal battery or supercapacitor component being modeled to control the power contribution of the component. For example, during dynamic braking or acceleration, the supercapacitor component(s) provide or acquire most of energy flow to or from the motor, with the battery component being charged or discharged through the supercapacitor component(s), while the battery component provides power during cruise intervals.

The described techniques provide a variety of important and unique aspects and advantages, with non-exclusive examples including the following:
  the battery cell(s) are operated mostly during cruise intervals, which increases longevity and quality operation.
  the battery cell(s) are charged through the supercapacitor(s) to provide a steady state power flow.
  the supercapacitor(s) respond to high transient loads or generations.
  the impedance actuators may be implemented by controlled solid state transformers using switched MOSFET impedance component.

the solid state transformers implementing the impedance actuators are bi-directional.

the distributed control activities optimize the power flow for the supercapacitors, battery, and vehicle.

the operation of the combination of battery and supercapacitor components within battery cells in the described manner may deliver optimal minimum dissipation behavior while protecting the longevity of the battery.

It will also be appreciated that the examples of FIGS. 2A-2I are provided for illustrative purposes and are simplified for the sake of brevity, and the inventive techniques may be used in a wide variety of other situations, including in other environments and with other types of automated control action determination techniques (e.g., target systems that do not include battery cells, or in which any battery cells are not the elements being controlled by the control system), some of which are discussed below. As one non-exclusive example, the control system may include one or more supercapacitor electrical devices and the control system may control when and/or how and/or how much power is supplied to and/or from the supercapacitor(s) (whether or not to supplement other battery components in use), such as with such supercapacitor electrical devices (in some embodiments combined with battery components in battery cells) being used to power trains or subways or automobiles or bicycles or airplanes or drones or other vehicles, by using dynamic braking to store power and by reducing the power load on the battery cells at time of vehicle acceleration or other times of high power demand, etc.)—if so, a control system manager component may minimize or otherwise reduce power dissipation and/or excess use of the battery cells beyond a defined threshold, such as by selecting from multiple enumerated control values for a control system actuator that regulates the input to and/or output of the super-capacitor(s).

FIG. 3 is a block diagram illustrating example computing systems suitable for performing techniques for implementing automated control systems to control or otherwise manipulate at least some operations of specified physical systems or other target systems that include battery cells each having one or more internal supercapacitor components in parallel with one or more internal battery components. In particular, FIG. 3 illustrates one or more server computing systems 300 suitable for providing at least some functionality of a CDD system 340 that provides control systems for managing operations of battery cells having one or more internal supercapacitor components in parallel with one or more internal battery components and that has various components 342-349, various client computer systems 350 that may be used by customers or other users of the CDD system 340, and one or more target systems to be controlled (in this example, target system 1 360 and target system 2 370, which are accessible to the CDD system 340 and its components 342-349 over one or more computer networks 390, although in other embodiments the one or more CDD components and/or a resulting control system may execute local to a target system that they are controlling)—in at least some embodiments, target systems 1 and/or 2 may be an electric vehicle, and have a plurality of battery cells 363 and 373, respectively, that are controlled by a plurality of control systems (e.g., part of other elements 365 and 375, respectively), as discussed in greater detail elsewhere herein. In other embodiments, multiple computing systems may be used for the execution of a CDD system and/or a resulting control system provided by one or more instantiated and configured components of the CDD system (e.g., to have one or more computing systems executing a CDD Decision Module Construction component for initial configuration and setup before run-time control occurs, and one or more other computing systems performing run-time control by executing one or more control systems that each have configured copies of the CDD Control Action Manager component 344 and/or the CDD Coordinated Control Management component 346; to have different computing systems executing different control systems; etc.).

In the illustrated embodiment, the Control Action Manager component 344 and Coordinated Control Management component 346 are in memory 330 as part of the executing CDD system 340, and in some embodiments the components (or a control system that includes configured copies of one or both components) include various software instructions that when executed program one or more of the hardware CPU processors 305 to provide an embodiment of a control system as described elsewhere herein. During operation, in at least some embodiments, a control system (or a decision module of such a control system) may obtain various input data (not shown) regarding an associated target system (e.g., from one or more sensors), and use the input data to generate and/or modify one or more target system state models (e.g., models 323 stored on storage 320) that are in use to control the target system, such as by determining adjustments to control system actuator information 322 used by one or more control system actuators regulating battery cells or other elements of the target system, as well as exchange various information with other executing components—as discussed in greater detail elsewhere herein, a separate model may be dynamically generated in at least some embodiments for each internal supercapacitor and/or battery component of a battery cell.

The server computing system 300 has components in the illustrated embodiment that include one or more hardware CPU ("central processing unit") computer processors 305, various I/O ("input/output") hardware components 310, storage 320, and memory 330. The illustrated I/O components include a display 311, a network connection 312, a computer-readable media drive 313, and other I/O devices 315 (e.g., a keyboard, a mouse, speakers, etc.). In addition, the illustrated client computer systems 350 may each have components similar to those of server computing system 300, including one or more hardware CPUs 351, I/O components 352, storage 354, and memory 357, although some details are not illustrated for the computing systems 350 for the sake of brevity. The target systems 360 and 370 may also each include one or more computing systems (not shown) having components that are similar to some or all of the components illustrated with respect to server computing system 300, including to optionally locally execute one or more CDD components and/or resulting control systems, but such computing systems and components are also not illustrated in this example for the sake of brevity.

The CDD system 340 is executing in memory 330 and includes components 342-349, and in some embodiments the system and/or components each includes various software instructions that when executed program one or more of the CPU processors 305 to provide an embodiment of a CDD system as described elsewhere herein. The CDD system 340 may interact with computing systems 350 over the network 390 (e.g., via the Internet and/or the World Wide Web, via a private cellular network, etc.), as well as the target systems 360 and 370 in this example. In this example embodiment, the CDD system includes functionality related to generating and deploying control systems having configured decision modules for customers or other users, as discussed in greater detail elsewhere herein, as well as generating and deploying control state manager components (not shown) at runtime as part of control systems to improve functionality of those control systems in controlling corresponding target systems. The other computing systems 350 may also be executing various software as part of interactions with the CDD system 340 and/or its components. For example, client computing systems 350 may be executing software 358 in memory 357 to interact with CDD system 340 (e.g., as part of a Web browser, a specialized client-side application program, etc.), such as to interact with one or more interfaces (not shown) of the CDD system 340 to configure and deploy automated control systems (e.g., stored automated control systems 325 that were previously created by the CDD system 340 for use in controlling one or more physical target systems) or other decision modules 329, as well as to perform various other types of actions, as discussed in greater detail elsewhere. Various other information related to the functionality of the CDD system 340 may also be stored in storage 320, such as information 321 related to users of the CDD system (e.g., account information), and information 323 related to one or more target systems (e.g., systems that have battery cells to be controlled), including models that have been generated of particular target systems (e.g., target systems 1 and 2) and/or of components within such target systems (e.g., internal supercapacitor and battery components within particular battery cells) and are optionally in use by an associated CDD control system.

It will be appreciated that computing systems 300 and 350 and target systems 360 and 370 are merely illustrative and are not intended to limit the scope of the present invention. The computing systems may instead each include multiple interacting computing systems or devices, and the computing systems/nodes may be connected to other devices that are not illustrated, including through one or more networks such as the Internet, via the Web, or via private networks (e.g., mobile communication networks, etc.). More generally, a computing node or other computing system or device may comprise any combination of hardware that may interact and perform the described types of functionality, including without limitation desktop or other computers, database servers, network storage devices and other network devices, PDAs, cell phones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated CDD system 340 and its components may in some embodiments be distributed in additional components. Similarly, in some embodiments some of the functionality of the CDD system 340 and/or CDD components 342-349 may not be provided and/or other additional functionality may be available.

As part of implementing an automated control system for a particular target system, an embodiment of a Collaborative Distributed Decision (CDD) system may use the described techniques to perform various automated activities involved in constructing and implementing the automated control system, including generating one or more CDI agents (also referred to as a CDD decision module or system, or a portion of such module or system) for use as some or all of an automated control system in controlling particular target systems. In particular, such an automated control system for a specified target system may, during operation, modify or otherwise manipulate inputs or other control elements of the target system that affect its operation (e.g., affect one or more outputs of the target system). An automated control system for such a target system may in some situations have a distributed architecture that provides cooperative distributed control of the target system, such as with multiple decision modules that each control a portion of the target system and that operate in a partially decoupled manner with respect to each other. If so, the various decision modules' operations for the automated control system may be at least partially synchronized, such as by each reaching a consensus with one or more other decision modules at one or more times, even if a fully synchronized convergence of all decision modules at all times is not guaranteed or achieved.

The CDD system may in some embodiments implement a Decision Module Construction component that interacts with one or more users to obtain a description of a target system, including restrictions related to the various elements of the target system, and one or more goals to be achieved during control of the target system—the Decision Module Construction component then performs various automated actions to generate, test and deploy one or more executable decision modules (also referred to at times as "decision elements" and/or "agents") to use in performing the control of the target system. When the one or more executable decision modules are deployed and executed (e.g., as part of an automated control system), the CDD system may further provide various components within or external to the decision modules being executed to manage their control of the target system, such as a Control Action Manager component of each decision module as part of a control system to optimize or otherwise enhance the control actions that the decision module determines and implements, one or more Coordinated Control Management components to coordinate the control actions of multiple decision modules that are collectively performing the control of the target system, and/or one or more other components. The Decision Module Construction component may thus operate as part of a configuration or setup phase that occurs before a later run-time phase in which the generated decision modules are executed to perform control of the target system, although in some embodiments and situations the Decision Module Construction component may be further used after an initial deployment to improve or extend or otherwise modify an automated control system that has one or more decision modules (e.g., while the automated control system continues to be used to control the target system), such as to implement functionality to improve and update a model of a target system being controlled, or to add, remove or modify decision modules for the automated control system.

In some embodiments, some or all automated control systems that are generated and deployed may further provide various components within them for execution during the runtime operation of the automated control system, such as by including such components within decision modules in some embodiments and situations. Such components may include, for example, a Control Action Manager component of each decision module (or of some decision modules) to optimize or otherwise determine and improve the control actions that the decision module determines and implements (e.g., to determine impedance levels to use for impedance actuators associated with internal battery and supercapacitor components of a battery cell). For example, such a Control Action Manager component in a decision module may in some embodiments attempt to automatically determine the decision module's control actions for a particular time to reflect a near-optimal solution with respect to or one more goals and in light of a model of the decision module for the target system that has multiple inter-related constraints and based on current state information that is modeled for the target system, including to use parametric linear approximation techniques to do so as discussed elsewhere herein—if so, such a near-optimal solution may be based at least in part on a partially optimized solution that is within a threshold amount of a fully optimized solution. Such determination of one or more control actions to perform may occur for a particular time and for each of one or more decision modules, as well as be repeated over multiple times for ongoing control by at least some decision modules in some situations. In some embodiments, the model for a decision module is implemented as a Hamiltonian function that reflects a set of coupled differential equations based in part on constraints representing at least part of the target system, such as to allow the model and its Hamiltonian function implementation to be updated over multiple time periods by adding additional expressions within the evolving Hamiltonian function, as discussed in greater detail elsewhere herein.

In some embodiments, the components included within a generated and deployed automated control system for execution during the automated control system's runtime operation may further include one or more Coordinated Control Management components to coordinate the control actions of multiple decision modules that are collectively performing the control of a target system for the automated control system (or of multiple control systems that are each controlling a part of a target system, such as each controlling a battery cell for a target system having multiple interconnected battery cells, so as to provide a larger coordinated overall control system for the target system). For example, some or all decision modules may each include such a Coordinated Control Management component in some embodiments to attempt to synchronize that decision module's local solutions and proposed control actions with those of one or more other decision modules in the automated control system, such as by determining a consensus shared model with those other decision modules that simultaneously provides solutions from the decision module's local model and the models of the one or more other decision modules. Such inter-module synchronizations may occur repeatedly to determine one or more control actions for each decision module at a particular time, as well as to be repeated over multiple times for ongoing control. In addition, each decision module's model is implemented in some embodiments as a Hamiltonian function that reflects a set of coupled differential equations based in part on constraints representing at least part of the target system, such as to allow each decision module's model and its Hamiltonian function implementation to be combined with the models of one or more other decision modules by adding additional expressions for those other decision modules' models within the initial Hamiltonian function for the local model of the decision module, as discussed in greater detail elsewhere herein.

It will also be appreciated that, while various items are illustrated as being stored in memory or on storage while being used, these items or portions of them may be transferred between memory and other storage devices for purposes of memory management and data integrity. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the CDD components 342-349, or more generally by the CDD system 340) and/or data structures, such as by execution of software instructions of the one or more software programs and/or by storage of such software instructions and/or data structures. Furthermore, in some embodiments, some or all of the systems and/or components may be implemented or provided in other manners, such as by using means that are implemented at least partially or completely in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, components and data structures may also in some embodiments be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
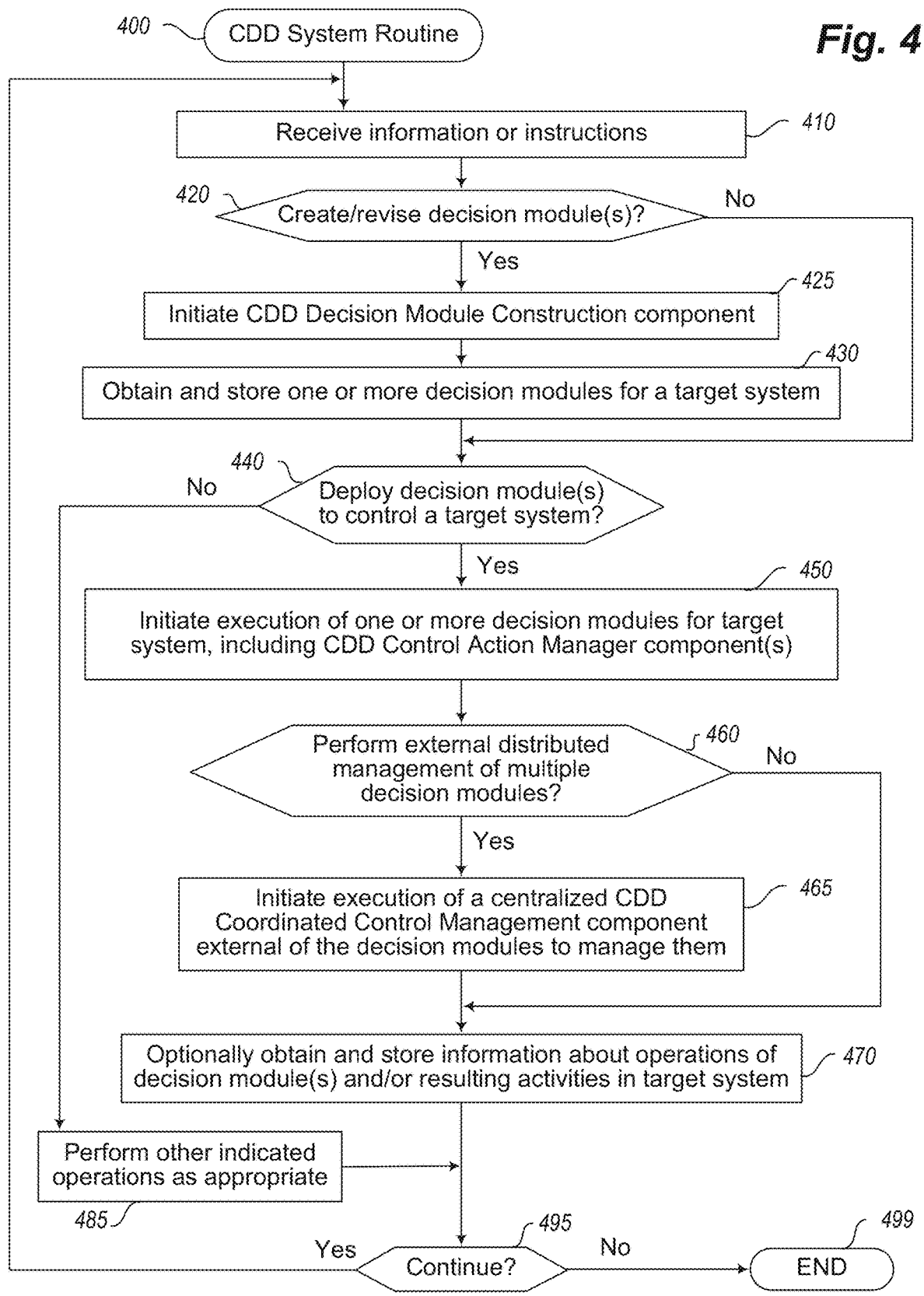
FIG. 4 illustrates a flow diagram of an example embodiment of a Collaborative Distributed Decision (CDD) System routine.

FIG. 4 is a flow diagram of an example embodiment of a Collaborative Distributed Decision (CDD) system routine 400. The routine may, for example, be provided by execution of the CDD system 340 of FIG. 3 and/or the CDD system 140 of FIG. 1B, such as to provide functionality to construct and implement automated control systems for specified target systems.

The illustrated embodiment of the routine begins at block 410, where information or instructions are received. If it is determined in block 420 that the information or instructions of block 410 include an indication to create or revise one or more decision modules for use as part of an automated control system for a particular target system, the routine continues to block 425 to initiate execution of a Decision Module Construction component, and in block 430 obtains and stores one or more resulting decision modules for the target system that are created in block 425. One example of a routine for such a Decision Module Construction component is discussed in greater detail with respect to FIGS. 5A-5B.

After block 430, or if it is instead determined in block 420 that the information or instructions received in block 410 are not to create or revise one or more decision modules, the routine continues to block 440 to determine whether the information or instructions received in block 410 indicate to deploy one or more created decision modules to control a specified target system, such as for one or more decision modules that are some or all of an automated control system for that target system. The one or more decision modules to deploy may have been created immediately prior with respect to block 425, such that the deployment occurs in a manner that is substantially simultaneous with the creation, or in other situations may include one or more decision modules that were created at a previous time and stored for later use. If it is determined to deploy one or more such decision modules for such a target system, the routine continues to block 450 to initiate the execution of those one or more decision modules for that target system, such as on one or more computing systems local to an environment of the target system, or instead on one or more remote computing systems that communicate with the target system over one or more intermediary computer networks (e.g., one or more computing systems under control of a provider of the CDD system). One example of a routine for such execution of a decision module is discussed in greater detail with respect to FIGS. 6A-6B. The execution of some or all such decision modules may further include executing an associated control action manager component to improve functionality of the decision modules and their control system during operation, with FIG. 7 providing an example of a routine for execution of a control action manager component.

After block 450, the routine continues to block 460 to determine whether to perform distributed management of multiple decision modules being deployed in a manner external to those decision modules, such as via one or more centralized Coordinated Control Management components. If so, the routine continues to block 465 to initiate execution of one or more such centralized CDD Coordinated Control Management components for use with those decision modules. One example of a routine for such a centralized CDD Coordinated Control Management component is discussed in greater detail with respect to FIGS. 8A-8B. After block 465, or if it is instead determined in block 460 to not perform such distributed management in an external manner (e.g., if only one decision module is executed, if multiple decision modules are executed but coordinate their operations in a distributed peer-to-peer manner via local CDD Coordinated Control Management components, etc.), the routine continues to block 470 to optionally obtain and store information about the operations of the one or more decision modules and/or resulting activities that occur in the target system, such as for later analysis and/or reporting.

If it is instead determined in block 440 that the information or instructions received in block 410 are not to deploy one or more decision modules, the routine continues instead to block 485 to perform one or more other indicated operations if appropriate. For example, such other authorized operations may include obtaining results information about the operation of a target system in other manners (e.g., by monitoring outputs or other state information for the target system), analyzing results of operations of decision modules and/or activities of corresponding target systems, generating reports or otherwise providing information to users regarding such operations and/or activities, etc. In addition, in some embodiments the analysis of activities of a particular target system over time may allow patterns to be identified in operation of the target system, such as to allow a model of that target system to be modified accordingly (whether manually or in an automated learning manner) to reflect those patterns and to respond based on them. In addition, as discussed in greater detail elsewhere, distributed operation of multiple decision modules for an automated control system in a partially decoupled manner allows various changes to be made while the automated control system is in operation, such as to add one or more new decision modules, to remove one or more existing decision modules, to modify the operation of a particular decision module (e.g., by changing rules or other information describing the target system that is part of a model for the decision module), etc. In addition, the partially decoupled nature of multiple such decision modules in an automated control system allows one or more such decision modules to operate individually at times, such as if network communication issues or other problems prevent communication between multiple decision modules that would otherwise allow their individualized control actions to be coordinated—in such situations, some or all such decision modules may continue to operate in an individualized manner, such as to provide useful ongoing control operations for a target system even if optimal or near-optimal solutions cannot be identified from coordination and synchronization between a group of multiple decision modules that collectively provide the automated control system for the target system.

After blocks 470 or 485, the routine continues to block 495 to determine whether to continue, such as until an explicit indication to terminate is received. If it is determined to continue, the routine returns to block 410, and otherwise continues to block 499 and ends.

Figure 5A:
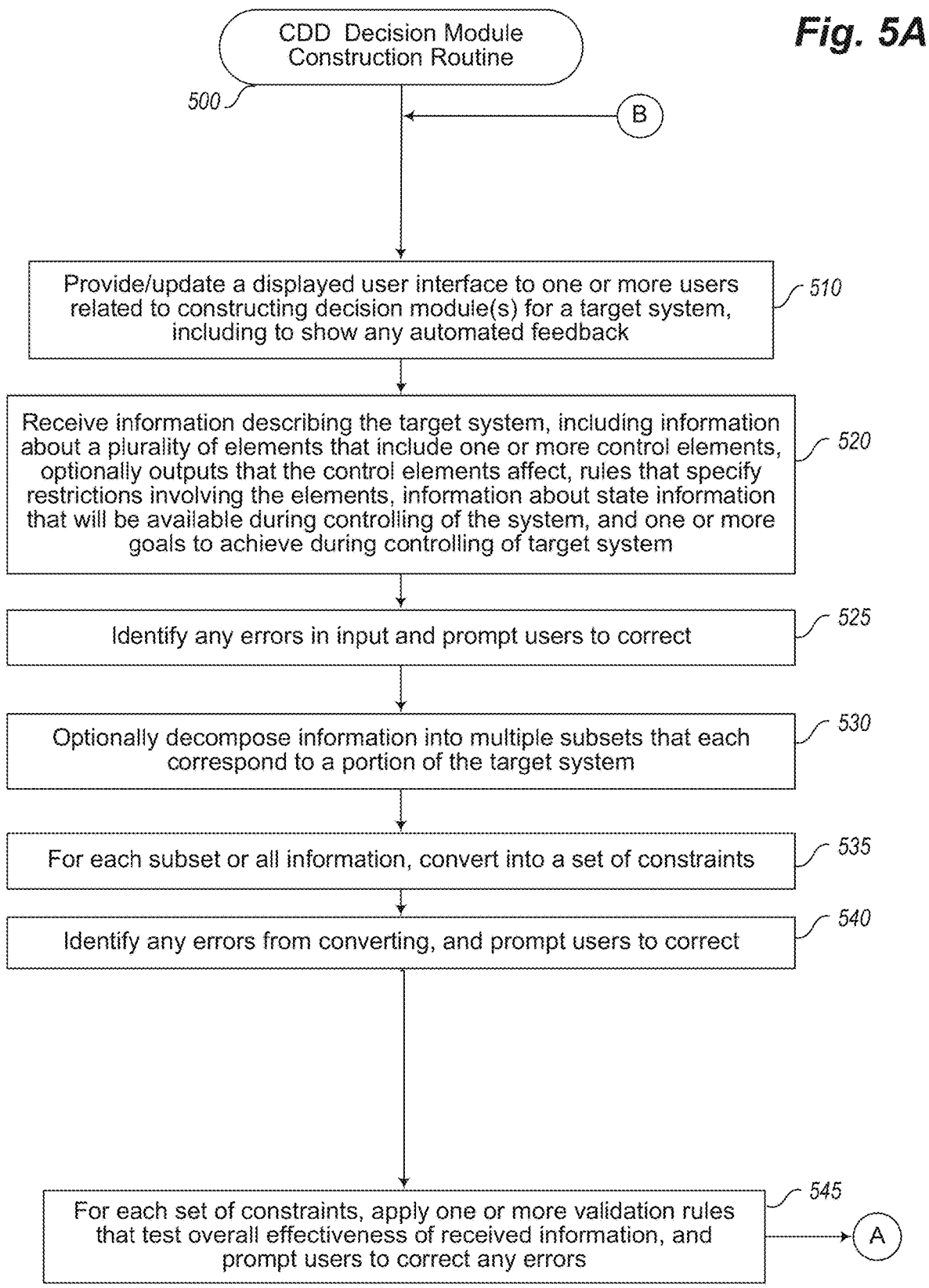
FIGS. 5A-5B illustrate a flow diagram of an example embodiment of a CDD Decision Module Construction routine.
Figure 5B:
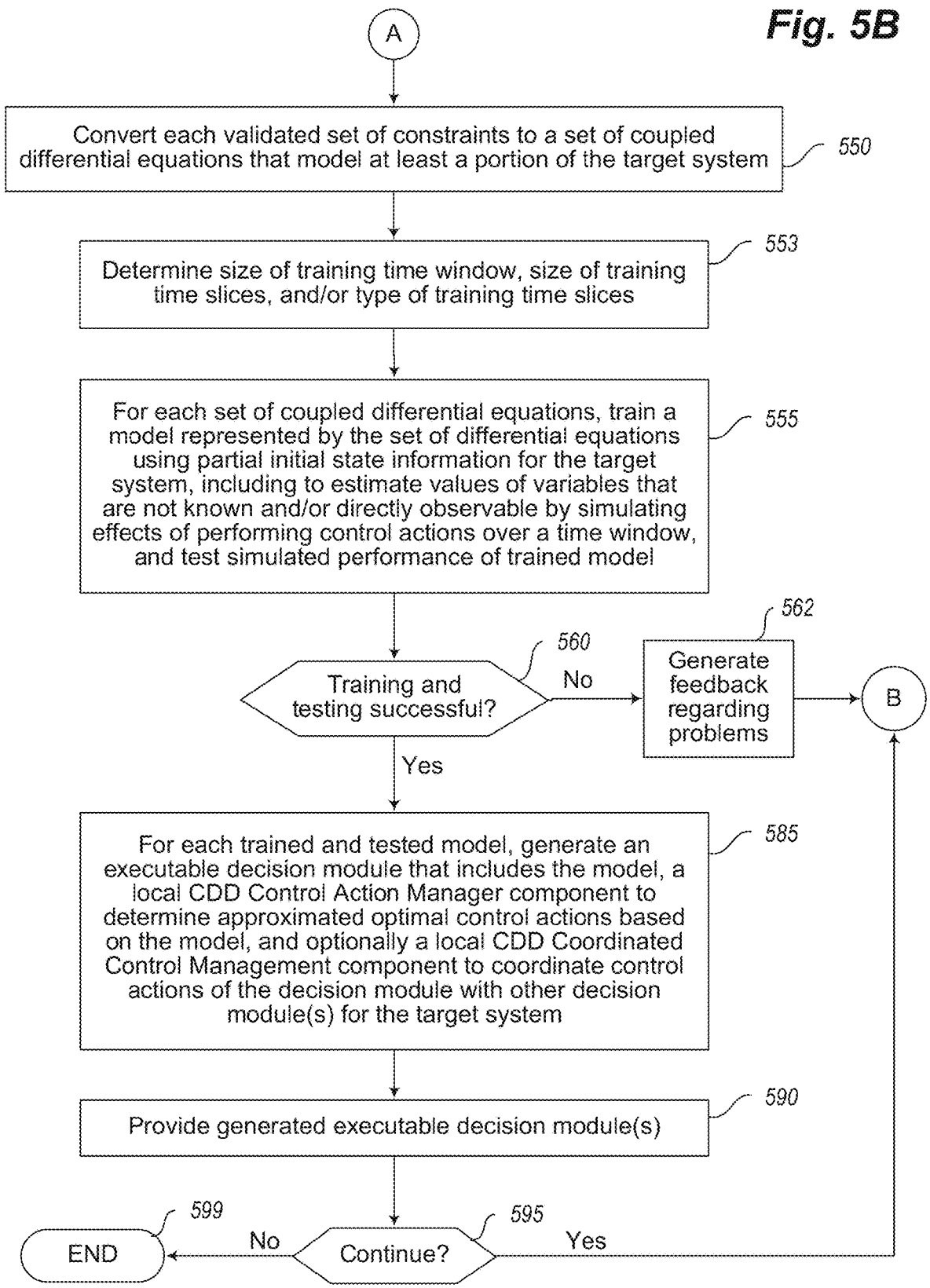

FIGS. 5A-5B illustrate a flow diagram of an example embodiment of a CDD Decision Module Construction routine 500. The routine may, for example, be provided by execution of the component 342 of FIG. 3 and/or the component 142 of FIG. 1B, such as to provide functionality to allow users to provide information describing a target system of interest, and to perform corresponding automated operations to construct one or more decision modules to use to control the target system in specified manners. While the illustrated embodiment of the routine interacts with users in particular manners, such as via a displayed GUI (graphical user interface), it will be appreciated that other embodiments of the routine may interact with users in other manners, such as via a defined API (application programming interface) that an executing program invokes on behalf of a user. In some embodiments, the routine may further be implemented as part of an integrated development environment or other software tool that is available for one or more users to use (such as by implementing an online interface that is available to a variety of remote users over a public network such as the Internet), while in other embodiments a copy of the CDD system and/or particular CDD components may be used to support a single organization or other group of one or more users (such as by being executed on computing systems under the control of the organization or group). In addition, the CDD Decision Module Construction component may in some embodiments and situations be separated into multiple sub-components, such as a rules editor component that users interact with to specify rules and other description information for a target system, and a rules compiler engine that processes the user-specified rules and other information to create one or more corresponding decision modules.

The illustrated embodiment of the routine 500 begins at block 510, where the routine provides or updates a displayed user interface to one or more users, such as via a request received at an online version of component that is implementing the routine, or instead based on the routine being executed by one or more such users on computing systems that they control. While various operations are shown in the illustrated embodiment of the routine as occurring in a serial manner for the purpose of illustration, it will be appreciated that user interactions with such a user interface may occur in an iterative manner and/or over multiple periods of time and/or user sessions, including to update a user interface previously displayed to a user in various manners (e.g., to reflect a user action, to reflect user feedback generated by operation of the routine or from another component, etc.), as discussed further below.

After block 510, the routine continues to block 520 to receive information from one or more such users describing a target system to be controlled, including information about a plurality of elements of the target system that include one or more manipulatable control elements and optionally one or more outputs that the control elements affect, information about rules that specify restrictions involving the elements, information about state information that will be available during controlling of the system (e.g., values of particular elements or other state variables, such as from passive sensors), and one or more goals to achieve during the controlling of the target system. It will be appreciated that such information may be obtained over a period of time from one or more users, including in some embodiments for a first group of one or more users to supply some information related to a target system and for one or more other second groups of users to independently provide other information about the target system, such as to reflect different areas of expertise of the different users and/or different parts of the target system.

After block 520, the routine continues to block 525 to identify any errors that have been received in the user input, and to prompt the user(s) to correct those errors, such as by updating the display in a corresponding manner as discussed with respect to block 510. While the identification of such errors is illustrated as occurring after the receiving of the information in block 520, it will be appreciated that some or all such errors may instead be identified as the users are inputting information into the user interface, such as to identify syntax errors in rules or other information that the users specify. After block 525, the illustrated embodiment of the routine continues to block 530 to optionally decompose the information about the target system into multiple subsets that each correspond to a portion of the target system, such as with each subset having one or more different control elements that are manipulatable by the automated control system being created by the routine, and optionally have overlapping or completely distinct goals and/or sets of rules and other information describing the respective portions of the target system. As discussed in greater detail elsewhere, such decomposition, if performed, may in some situations be performed manually by the users indicating different subgroups of information that they enter, and/or in an automated manner by the routine based on an analysis of the information that has been specified (e.g., based on the size of rules and other descriptive information supplied for a target system, based on inter-relationships between different rules or goals or other information, etc.). In other embodiments, no such decomposition may be performed.

After block 530, the routine continues to block 535 to, for each subset of target system description information (or for all the received information if no such subsets are identified), convert that subset (or all the information) into a set of constraints that encapsulate the restrictions, goals, and other specified information for that subset (or for all the information). In block 540, the routine then identifies any errors that occur from the converting process, and if any are identified, may prompt the user to correct those errors, such as in a manner similar to that described with respect to blocks 525 and 510. While not illustrated in this example, the routine may in some situations in blocks 525 and/or 540 return to block 510 when such errors are identified, to display corresponding feedback to the user(s) and to allow the user(s) to make corrections and re-perform following operations such as those of blocks 520-540. Errors identified in the converting process in block 540 may include, for example, errors related to inconsistent restrictions, such as if the restrictions as a group are impossible to satisfy.

After block 540, the routine continues to block 545 to, for each set of constraints (or a single constraint set if no subsets were identified in block 530), apply one or more validation rules to the set of constraints to test overall effectiveness of the corresponding information that the constraints represent, and to prompt the one or more users to correct any errors that are identified in a manner similar to that with respect to blocks 525, 540 and 510. Such validation rules may test one or more of controllability, observability, stability, and goal completeness, as well as any user-added validation rules, as discussed in greater detail elsewhere. In block 550, the routine then converts each validated set of constraints to a set of coupled differential equations that model at least a portion of the target system to which the underlying information corresponds.

After block 550, the routine continues to block 553 to perform activities related to training a model for each set of coupled differential equations, including to determine one or more of a size of a training time window to use, size of multiple training time slices within the time window, and/or a type of training time slice within the time window. In some embodiments and situations, the determination of one or more such sizes or types of information is performed by using default or pre-specified information, while in other embodiments and situations the users may specify such information, or an automated determination of such information may be performed in one or more manners (e.g., by testing different sizes and evaluating results to find sizes with the best performance). Different types of time slices may include, for example, successions of time slices that overlap or do not overlap, such that the training for a second time slice may be dependent only on results of a first time slice (if they do not overlap) or instead may be based at least in part on updating information already determined for at least some of the first time slice (if they do overlap in part or in whole). After block 553, the routine continues to block 555 to, for each set of coupled differential equations representing a model, train the model for that set of coupled differential equations using partial initial state information determined externally for the target system (e.g., from passive sensors), including to estimate values of variable that are not known and/or directly observable for the target system by simulating effects of performing control actions over the time window, such as for successive time slices throughout the time window, and to test the simulated performance of the trained model. Additional details related to training and testing are included elsewhere herein.

After block 555, the routine continues to block 560 to determine whether the training and testing was successful, and if not continues to block 562 to generate feedback regarding the problems, and then returns to block 510 to display the feedback information to the users to allow them to correct errors that caused the lack of success. If it is instead determined in block 560 that the testing and training were successful, however, the routine continues instead to block 585 to generate an executable decision module for each trained and tested model that includes that model, as well as a local CDD Control Action Manager component that the decision module will use when executed to determine optimal or near-optimal control actions to perform for the target system based on the information included in the model and in light of the one or more goals for that decision module. The generated executable decision module may in some embodiments and situations further include a local CDD Coordinated Control Management component to coordinate control actions of multiple decision modules that collectively will provide an automated control system for the target system, such as by synchronizing respective models of the various decision modules over time. After block 585, the routine continues to block 590 to provide the generated executable decision modules for use, including to optionally store them for later execution and/or deployment.

After block 590, the routine continues to block 595 to determine whether to continue, such as until an explicit indication to terminate or suspend operations is received. If it is determined to continue, the routine returns to block 510, and otherwise continues to block 599 and ends.

Figure 6A:
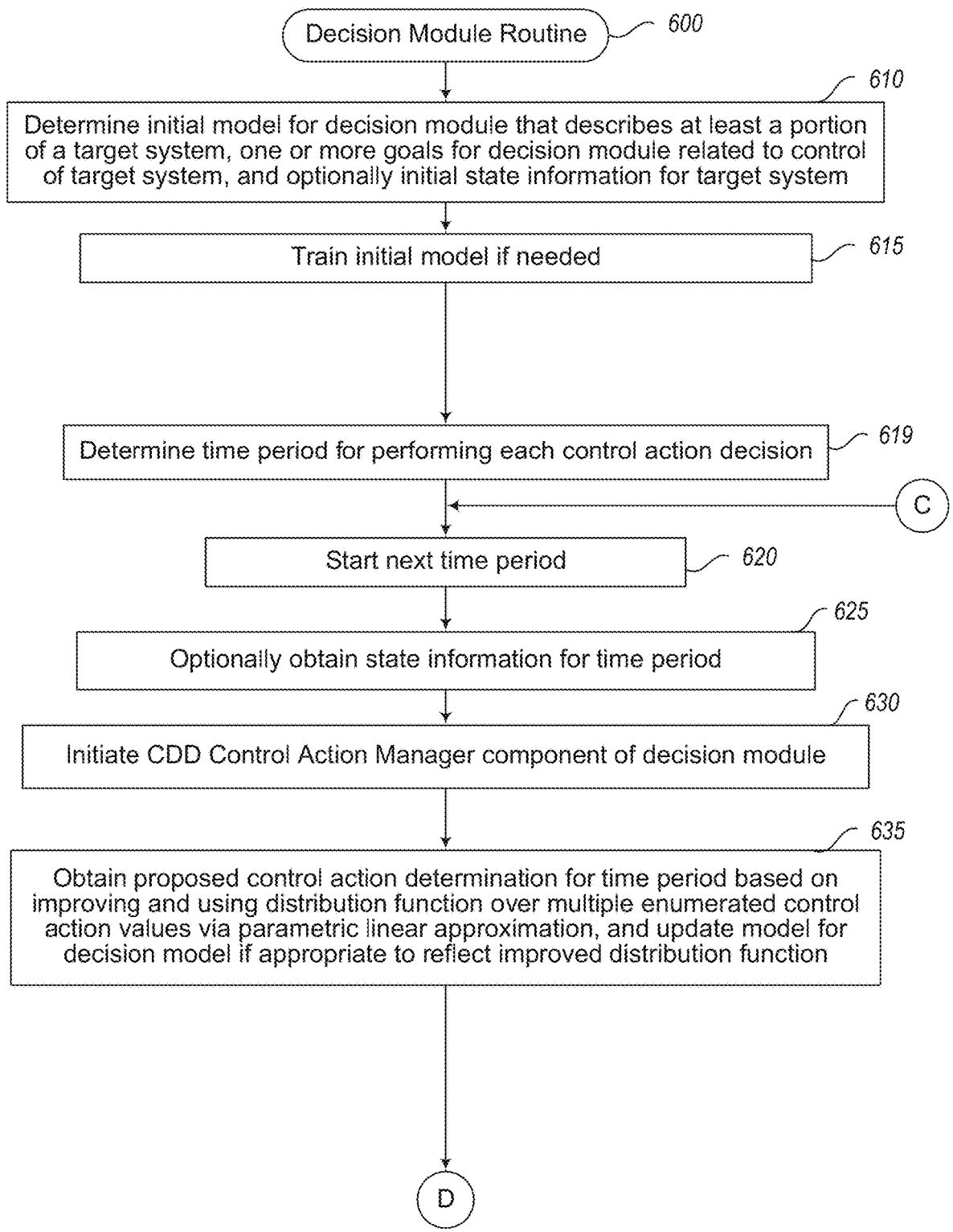

FIGS. 6A-6B illustrate a flow diagram of an example embodiment of a routine 600 corresponding to a generic representation of a decision module that is being executed. The routine may, for example, be provided by execution of a decision module 329 or as part of an automated control system 325 of FIG. 3, the automated control system 195 of FIG. 1A, the automated control system 195a of FIGS. 2A-2I, and/or a decision module 124 or 128 of FIG. 1B or 1C, such as to provide functionality for controlling at least a portion of a target system in a manner specific to information and a model encoded for the decision module, including to reflect one or more goals to be achieved by the decision module during its controlling activities. As discussed in greater detail elsewhere, in some embodiments and situations, multiple decision modules may collectively and cooperatively act to control a particular target system, such as with each decision module controlling one or more distinct control elements for the target system or otherwise representing or interacting with a portion of the target system, while in other embodiments and situations a single decision module may act alone to control a target system. The routine 600 further reflects actions performed by a particular example decision module when it is deployed in controlling a portion of a target system, although execution of at least portions of a decision module may occur at other times, such as initially to train a model for the decision module before the decision module is deployed, as discussed in greater detail with respect to the CDD Decision Module Construction routine 500 of FIGS. 5A-5B.

The illustrated embodiment of the routine 600 begins at block 610, where an initial model for the decision module is determined that describes at least a portion of a target system to be controlled, one or more goals for the decision module to attempt to achieve related to control of the target system, and optionally initial state information for the target system. The routine continues to block 615 to perform one or more actions to train the initial model if needed, as discussed in greater detail with respect to blocks 553 and 555 of FIGS. 5A-5B—in some embodiments and situations, such training for block 615 is performed only if initial training is not done by the routine 500 of FIGS. 5A-5B, while in other embodiments and situations the training of block 615 is performed to capture information about a current state of the target system at a time that the decision module begins to execute (e.g., if not immediately deployed after initial creation and training) and/or to re-train the model at times as discussed in greater detail with respect to routine 700 of FIG. 7 as initiated by block 630.

After block 615, the routine continues to block 619 to determine a time period to use for performing each control action decision for the decision module, such as to reflect a rate at which control element modifications in the target system are needed and/or to reflect a rate at which new incoming state information is received that may alter future manipulations of the control elements. The routine then continues to block 620 to start the next time period, beginning with a first time period moving forward from the startup of the execution of the decision module. Blocks 620-680 are then performed in a control loop for each such time period going forward until execution of the decision module is suspended or terminated, although in other embodiments a particular decision module may operate for only a single time period each time that it is executed.

In block 625, the routine optionally obtains state information for the time period, such as current state information that has been received from the target system (e.g., via one or more passive sensors) or one or more related external sources since the last time period began, and/or by actively retrieving current values of one or more elements of the target system or corresponding variables as needed. In block 630, the routine then initiates execution of a local CDD Control Action Manager component of the decision module, with one example of such a routine discussed in greater detail with respect to routine 700 of FIG. 7. In block 635, the results of the execution of the component in block 630 are received, including to obtain one or more proposed control action determinations that the decision module may perform for the current time period, and to optionally receive information about an improved distribution function used to determine the proposed control action(s) that may be used to update the model for the decision module (e.g., in embodiments in which the model stores information about the distribution function in use).

After block 635, the routine continues to block 644 to determine if other decision modules are collectively controlling portions of the current target system, such as part of the same automated control system as the local decision module, and if so continues to block 645. Otherwise, the routine continues to block 670 to select the local proposed control actions of the decision module as a final determined control action to perform, and then continues to block 675 to implement those control actions for the current time period.

If there are other operating decision modules, the routine in block 645 determines if the local decision module includes a local copy of a CDD Coordinated Control Management (CCM) component for use in synchronizing the proposed control action determinations for the decision module's local solutions with activities of other decision modules that are collectively controlling the same target system, such as via use of an internal mean field. If so, the routine continues to block 647 to provide the one or more proposed control action determinations of the decision module and the corresponding current local model for the decision module to the local CDD CCM component, and otherwise continues to block 649 to provide the one or more proposed control action determinations for the decision module and the corresponding local model of the decision module to one or more centralized CDD CCM components.

After blocks 647 or 649, the routine continues to block 655 to obtain results of the actions of the CDD CCM component(s) in blocks 647 or 649, including to either obtain one or more final control action determinations to perform for the time period for the current decision module that result from synchronization of the local model for the current decision module with information from one or more other decision modules, such as from a further updated consensus shared model resulting from the synchronization, or an indication that no such synchronization was completed in the allowed time. The routine continues to block 660 to determine whether the synchronization was completed, and if so continues to block 665 to store information about a further updated model from the synchronization if appropriate (e.g., to include information about an updated improved distribution function for a composite control space for all of the decision modules that is generated during the synchronization), and otherwise continues to block 670 to use the prior proposed control action determinations locally to the decision module as the final control action determinations for the time period.

After blocks 665 or 670, the routine continues to block 675 to implement the one or more final determined control actions for the decision module in the target system, such as by interacting with one or more effectuators or other actuators in the target system that regulate one or more control elements of the target system (e.g., modify input and/or output values of, or otherwise manipulate them), or by otherwise providing input to the target system to cause such modifications or other manipulations to occur. In block 680, the routine optionally obtains information about the results in the target system of the control actions performed, and stores and/or provides information to the CDD system about such obtained results and/or about the activities of the decision module for the current time period. After block 680, the routine continues to block 695 to determine whether to continue, such as until an explicit indication to terminate or suspend operations is received (e.g., to reflect an end to current operation of the target system or an end of use of the decision module to control at least a portion of the target system). If it is determined to continue, the routine returns to block 620 to start the next time period, and otherwise continues to block 699 and ends.

FIG. 7 is a flow diagram of an example embodiment of a CDD Control Action Manager routine 700. The routine may, for example, be provided by execution of component 344 of FIG. 3 and/or components 144a-n or 184 of FIG. 1C and/or part of the control systems 195 of FIGS. 2A-2I and/or other components executed as part of control systems or decision modules as described herein, such as to determine control actions for a decision module to propose and/or implement for a target system during a particular time period, such as by using parametric linear approximation to determine a control action using one of multiple enumerated possible values of an available control space that best satisfies one or more defined goals at a given time in light of current state information (e.g., to determine one of multiple possible impedance levels to implement for an impedance actuator associated with an internal supercapacitor or battery component of a battery cell). While the illustrated embodiment of the routine is performed in a manner local to a particular decision module, such that some or all decision modules may each implement a local version of such a routine, in other embodiments the routine may be implemented in a centralized manner by one or more components with which one or more decision modules interact over one or more networks, such as with a particular decision module indicated to be used at a particular time rather than acting on behalf of the local decision module.

The illustrated embodiment of the routine 700 begins at block 703, where information or a request is received. The routine continues to block 705 to determine a type of the information or request, and to proceed accordingly. In particular, if a request is received in block 703 to determine a control action using a determined one of multiple enumerated possible control values for a current time period given a current model of the local decision module, the routine continues to block 710 to begin to perform such activities, as discussed in greater detail with respect to block 710-785. Otherwise, the routine continues instead to block 790 to perform one or more other indicated operations as appropriate, and to then proceed to block 799. Such other indicated operations may include, for example, receiving information about current models and/or control actions proposed or performed by one or more other decision modules that are collectively controlling a target system with the local decision module (such as for use in synchronizing the model of the local decision module with such other decision modules by generating a consensus or converged shared model, as discussed in greater detail with respect to routine 800 of FIGS. 8A-8B), to receive updates to a model or underlying information for the model for use in ongoing operation of the routine 700 (e.g., from a CDD Decision Module Construction component, etc.), to receive current state information for the target system, such as for use as discussed in routine 600 of FIGS. 6A-6B, etc.

If it determined in block 705 that a request for a determined control action to implement was received in block 703 for a current time period and based on a current model used by the local decision module, the routine continues to block 710 to receive a current set of coupled differential equations that represent the current model for the local decision module of at least a portion of the target system, optionally along with additional state information for the target system for the current time. While not illustrated here, in some embodiments the routine may be part of or include functionality of a dynamic model generator, and if so may instead dynamically construct the model of the portion of the target system being controlled (e.g., an impedance actuator associated with an internal supercapacitor or battery component of a particular battery cell), such as for each time period or if one or more criteria are satisfied (e.g., if a charge level of a battery component of a particular battery cell has changed more than a defined amount or percentage)—if so, the routine may use model construction techniques similar to those described with respect to block 555 of routine 500. The routine then continues to block 715 to determine or otherwise obtain an indication of an interval time window size over which to determine the control action to implement, and then performs a loop of blocks 720-750 during that time window to improve a distribution function for the control space that will be used to determine the control action. In particular, the routine in block 720 solves a parametric linear approximation of the non-linear control space to determine an improved distribution function over multiple enumerated possible control values with respect to the one or more defined goals, and in block 730 then propagates the improved distribution function over later time window periods to determine corresponding results (e.g., by using a current model of a battery component of a battery cell to predict future effects of particular further control actions). In block 740, one or more error values are then determined (e.g., for the propagated state information and/or for a degree of optimization from the propagating), and a determination is made in block 750 if the error value(s) are above one or more defined error tolerance thresholds and if time remains in the time window for an additional iteration of blocks 720-740. If so, the routine returns to block 720 to begin the next such iteration, and otherwise continues to block 760 use the improved distribution function from block 720 in the last iteration to determine the control action to implement for the target system for the time period (e.g., the 'best' control action that produces results according to the improved distribution function that satisfy the defined goals better than other possible control action). The routine further provides an indication of the corresponding proposed control action to implement in block 760, and after blocks 760 or 780, continues to block 799 and ends (e.g., to return to block 630 of routine 600 if the current execution of routine 700 was initiated there). It will be appreciated that if the routine 700 was instead implemented as a centralized routine that supports one or more decision modules remote from the executing component for the routine, the routine 700 may instead return to block 703 to await further information or requests.

Figure 8A:
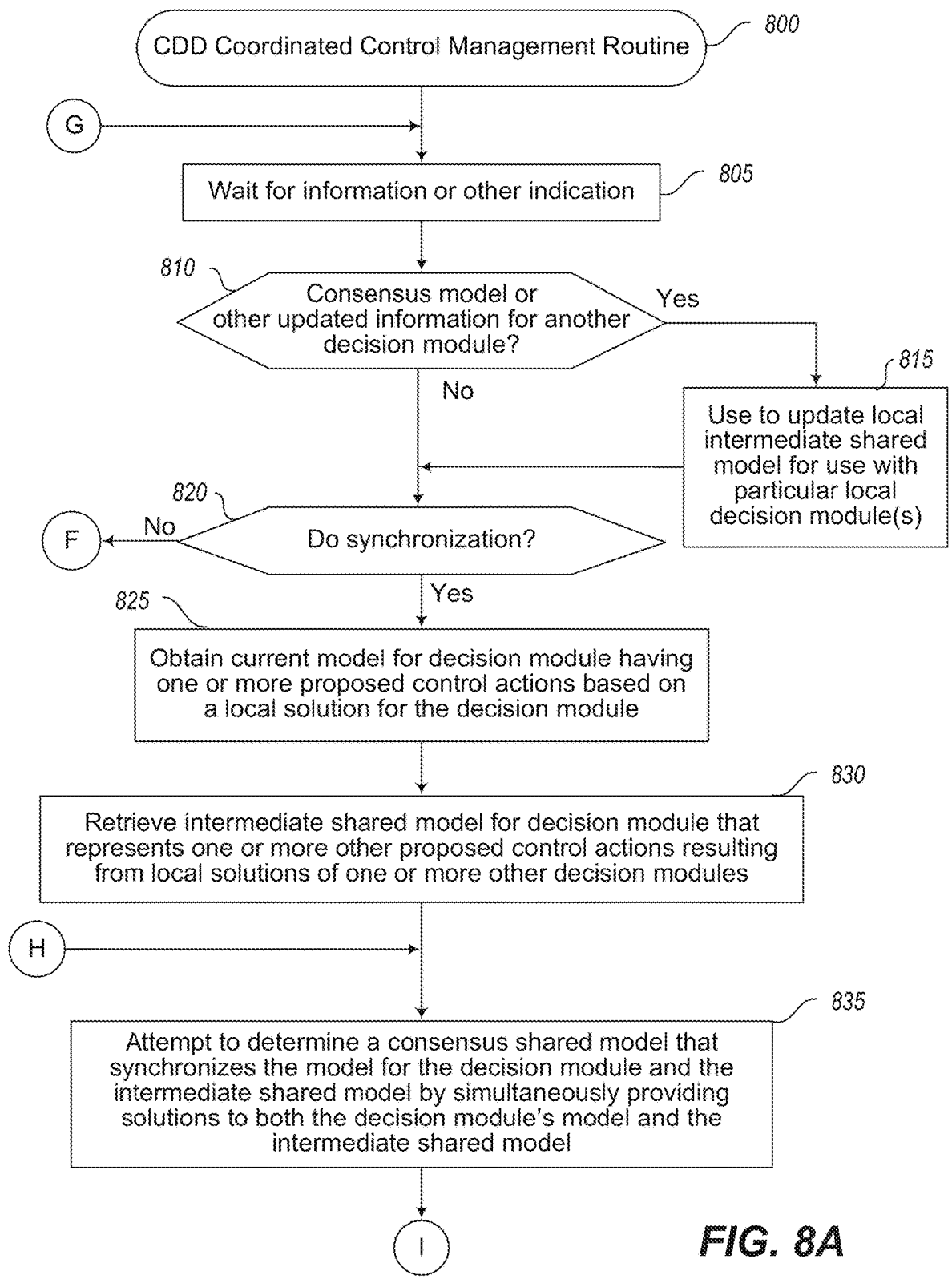
FIGS. 8A-8B illustrate a flow diagram of an example embodiment of a CDD Coordinated Control Management routine.
Figure 8B:
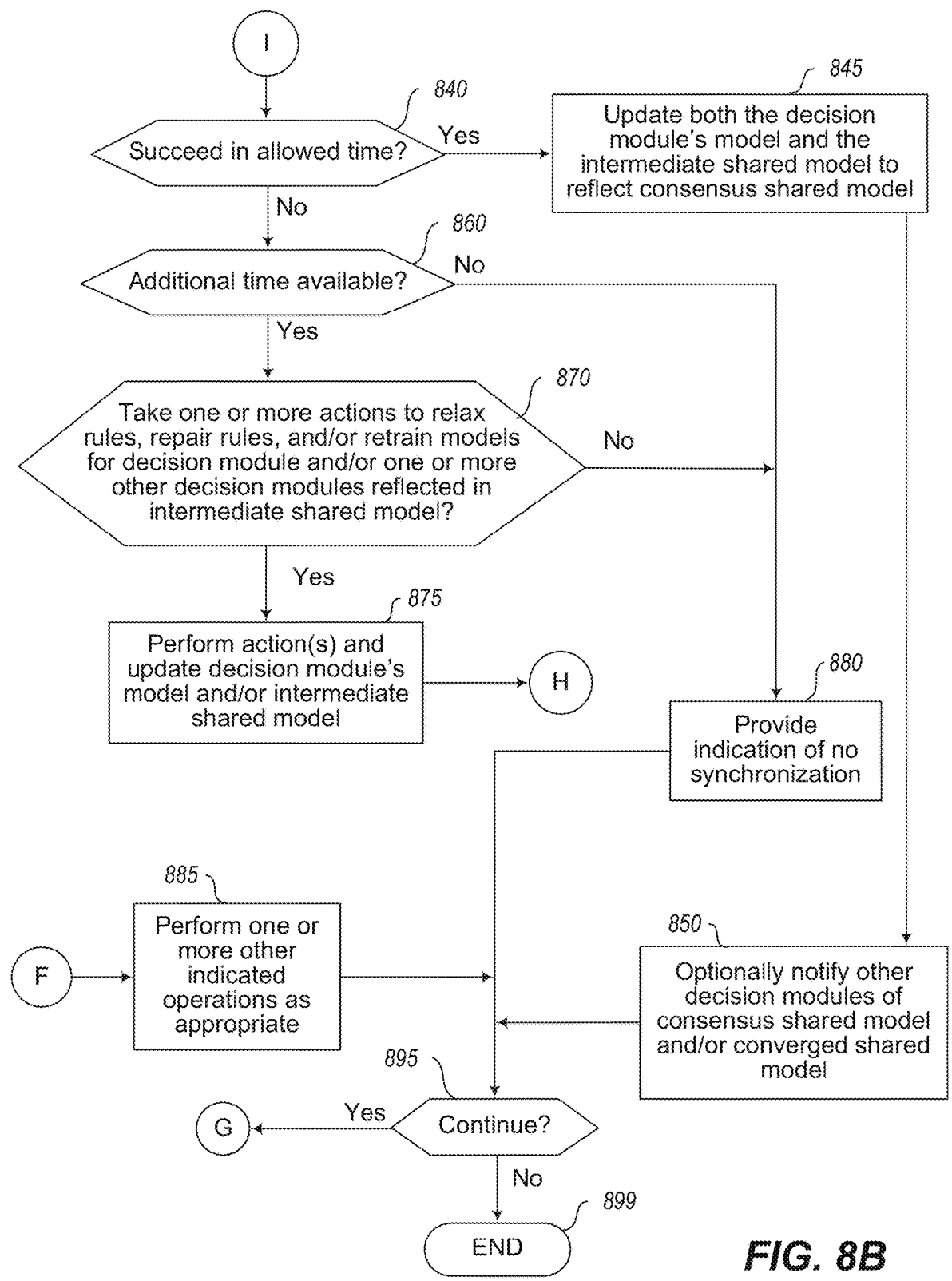

FIGS. 8A-8B are a flow diagram of an example embodiment of a CDD Coordinated Control Management routine 800. The routine may, for example, be provided by execution of the component 346 of FIG. 3 and/or the components 146a-n of FIG. 1C, such as to attempt to synchronize current models and their proposed control actions from current distribution functions of those models between multiple decision modules that are collectively controlling a target system, such as by using mean field coordination techniques. In particular, in the illustrated embodiment of the routine, the mean field synchronization is performed in a pairwise manner between a particular local decision module's local current model and an intermediate shared model for that decision module that is based on information about the current state of one or more other decision modules, by using a Pareto game technique to determine a Pareto equilibrium if possible that is represented in a consensus shared model (e.g., having a consensus shared distribution function), although in other embodiments other types of synchronization methods may be used. In addition, in the illustrated embodiment, the routine 800 is performed in a local manner for a particular local decision module, such as by being included within that local decision module, although in other embodiments the routine 800 may be implemented in a centralized manner to support one or more decision modules that are remote from a computing system implementing the component for the routine and that communicate with those decision modules over one or more computer networks, such as with a particular decision module indicated to be used at a particular time rather than acting on behalf of the local decision module.

The illustrated embodiment of the routine 800 begins at block 805, where it waits to receive information or another indication. The routine continues to block 810 to determine if a consensus model or other updated information for another decision module has been received, such as from a copy of the routine 800 executing for that other decision module, and if so continues to block 815 to use the received information to update local intermediate shared model information for use with the local decision module on whose behalf the current copy of the routine 800 is executing, as discussed in greater detail with respect to block 830. If it is instead determined in block 810 that the information or request received in block 805 is not information related to one or more other decision modules, or after block 815, the routine continues to block 820 to determine whether to currently perform a synchronization for the current local model of the local decision module by using information about an intermediate shared model of the local decision module that includes information for one or more other decision modules, such as to do such synchronization each time that an update to the local decision module's model is received (e.g., based on operation of the routine 700 for a copy of the CDD Control Action Manager component local to that decision module) in block 805 and/or each time that information to update the local decision module's intermediate shared model is received in block 805 and used in block 815, or instead as explicitly indicated in block 805—if the synchronization is to currently be performed, the routine continues to block 825 and begins to perform blocks 825-880 related to such synchronization activities. Otherwise, the routine continues to block 885 to perform one or more other indicated operations as appropriate, such as to receive requests from the CDD system or other requestor for current information about operation of the routine 800 and/or to provide corresponding information to one or more entities (e.g., to reflect prior requests), etc.

If it is determined in block 820 that synchronization is to be currently performed, such as based on updated model-related information that is received in block 805, the routine continues to block 825 to obtain a current local model for the local decision module to use in the synchronizing, with the model including one or more proposed control actions to perform for a current time period based on a local distribution function for the local decision module. The routine then continues to block 830 to retrieve information for an intermediate shared model of the local decision module that represents information for one or more other decision modules (e.g., all other decision modules) that are collectively participating in controlling the target system, with that intermediate shared model similarly representing one or more other proposed control actions resulting from local distribution functions of those one or more other decision modules, optionally after partial or complete synchronization has been performed for those one or more other decision modules between themselves.

The routine then continues to block 835 to attempt to determine a consensus shared model (e.g., with a consensus shared distribution function) that synchronizes the current model of the local decision module and the intermediate shared model by simultaneously providing solutions to both the local decision module's current model and the intermediate shared model (e.g., via a consensus shared distribution function that incorporates the respective distribution functions of the local decision module's current model and the intermediate shared model). As discussed in greater detail elsewhere, in some embodiments, the local current model and intermediate shared model may each be represented by a Hamiltonian function to enable a straightforward creation of such a combined model in an additive manner for the respective Hamiltonian functions, with the operations of routines 600 and/or 700 of FIGS. 6A-6B and 7, respectively, similarly representing the models that they update and otherwise manipulate using such Hamiltonian functions. In situations involving different control systems making impedance actuator decisions for different internal supercapacitor and battery components of a battery cell, a consensus shared model for those impedance actuator decisions to satisfy one or more overall constraints or goals for the battery cell (e.g., a total amount of power to output from the battery cell or receive as input to the battery cell) while also maintaining the battery component in a desired range of operational characteristics, and the individual models for the internal supercapacitor and battery components of the battery cell may be updated accordingly.

After block 835, the routine continues to block 840 to determine whether the operations of block 835 succeeded in an allowed amount of time, such as a fraction or other portion of the current time period for which the synchronization is attempted to be performed, and if so the routine continues to block 845 to update both the local model and the intermediate shared model of the local decision module to reflect the consensus shared model. As earlier noted, if sufficient time is allowed for each decision module to repeatedly determine a consensus shared model with changing intermediate shared models representing one or more other decision modules of a collective group, the decision modules of the collective group may eventually converge on a single converged shared model, although in other embodiments and situations there may not be sufficient time for such convergence to occur, or other issues may prevent such convergence. After block 845, the routine continues to block 850 to optionally notify other decision modules of the consensus shared model determined for the local decision module (and/or of a converged shared model, if the operations of 835 were a last step in creating such a converged shared model), such as if each of the notified decision modules is implementing its own local version of the routine 800 and the provided information will be used as part of an intermediate shared model of those other decision modules that includes information from the current local decision module's newly constructed consensus shared model.

If it is instead determined in block 840 that a synchronization did not occur in the allowed time, the routine continues to perform blocks 860-875 to re-attempt the synchronization with one or more modifications, sometimes repeatedly if sufficient time is available. In the illustrated example, the routine determines in block 860 if additional time is available for one or more such re-attempts at synchronization, and if not the routine continues to block 880 to provide an indication that no synchronization was performed within the allowed time. Otherwise, the routine continues to block 870 to determine whether to take one or more actions to perform one or more of relaxing rules or other restrictions, repairing rules or other restrictions, and/or re-training a model, with respect to one or both of the current model of the local decision module and/or one or more other decision modules whose information is represented in the intermediate shared model of the local decision module. If it is determined in block 870 to proceed in this manner, the routine continues to block 875 to perform corresponding actions, sometimes one at a time, including to cause resulting updates to the current model of the local decision module and/or to the local intermediate shared model of the local decision module, after which the routine returns to block 835 to re-attempt to synchronize the local model and the intermediate shared model of the local decision module.

If it is instead determined in block 870 that no further actions are to be performed with respect to relaxation, repair and/or re-training, the routine continues instead to block 880. After blocks 850, 880 or 885, the routine continues to block 895 to determine whether to continue, such as until an explicit indication to terminate or suspend operation of the routine 800 is received, such as to reflect an end to operation of the target system and/or an end to use of the local decision module and/or a collective group of multiple decision modules to control the target system. If it is determined to continue, the routine returns to block 805, and otherwise continues to block 899 and ends.

Figure 9:
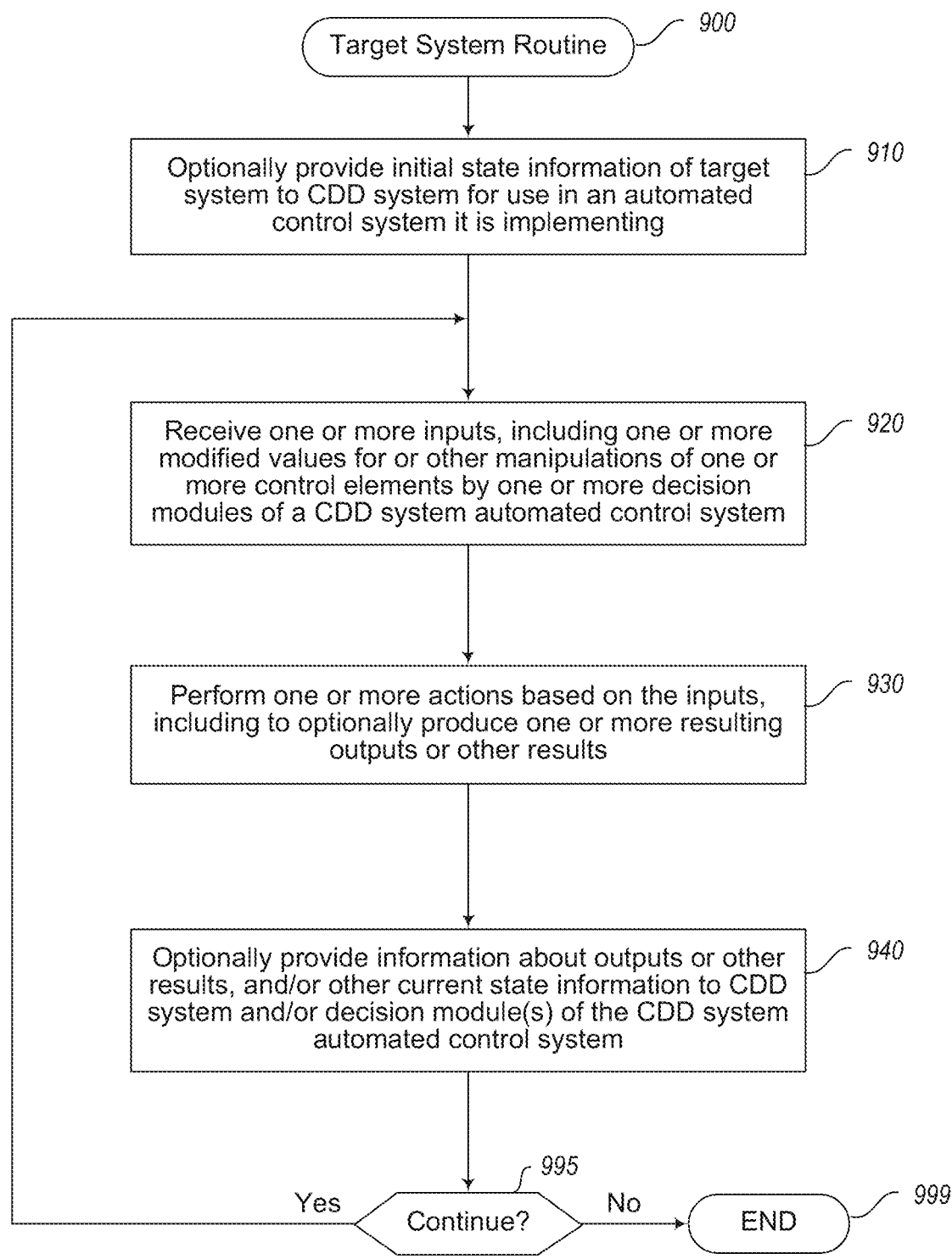
FIG. 9 illustrates a flow diagram of an example embodiment of a routine for a target system being controlled.

FIG. 9 illustrates a flow diagram of an example embodiment of a routine 900 performed for a representative generic target system, with respect to interactions between the target system and one or more decision modules that are controlling at least a portion of the target system. The routine may, for example, be provided by execution of a target system 360 and/or 370 of FIG. 3, a battery cell 201 of FIG. 1A, a battery cell 201a discussed with respect to FIGS. 2A-2I, and/or a target system 160 and/or 170 of FIGS. 1B and 1C, such as to implement operations specific to the target system. It will be appreciated that the illustrated embodiment of the routine focuses on interactions of the target system with the one or more decision modules, and that many or all such target systems will perform many other operations in a manner specific to those target systems that are not illustrated here for the purpose of brevity.

The routine begins at block 910, where it optionally provides initial state information for the target system to a CDD system for use in an automated control system of the CDD system for the target system, such as in response to a request from the CDD system or its automated control system for the target system, or instead based on configuration specific to the target system (e.g., to be performed upon startup of the target system). After block 910, the routine continues to perform a loop of blocks 920-940 to control ongoing operations of the target system. As discussed in greater detail elsewhere, the blocks 920, 930, 940 may be repeatedly performed for each of multiple time periods, which may vary greatly in time depending on the target system (e.g., a microsecond, a millisecond, a hundredth of a second, a tenth of a second, a second, 2 seconds, 5 seconds, 10 seconds, 15 seconds, 30 seconds, a minute, 5 minutes, 10 minutes, 15 minutes, 30 minutes, an hour, etc.).

In particular, the routine in block 920 receives one or more inputs from a collective group of one or more decision modules that implement the automated control system for the target system, including one or more modified values for or other manipulations of one or more control elements of a plurality of elements of the target system that are performed by one or more such decision modules of the automated control system. After block 920, the routine continues to block 930 to perform one or more actions in the target system based on the inputs received, including to optionally produce one or more resulting outputs or other results within the target system based on the manipulations of the control elements. In block 940, the routine then optionally provides information about the outputs or other results within the target system and/or provides other current state information for the target system to the automated control system of the CDD system and/or to particular decision modules of the automated control system, such as to be obtained and measured or otherwise analyzed via passive sensors and/or active sensors.

The routine then continues to block 995 to determine whether to continue, such as until an explicit indication to terminate or suspend operation of the target system is received. If it is determined to continue, the routine returns to block 920 to begin a next set of control actions for a next time period, and otherwise continues to block 999 and ends. As discussed in greater detail elsewhere, state information that is provided to a particular decision module may include requests from external systems to the target system, which the automated control system and its decision modules may determine how to respond to in one or more manners. In addition, while the control action manager component in the illustrated embodiment makes modifications directly to control system actuators within the target system (rather than providing modification information to the target system for it to use to attempt to make such modifications, in a manner analogous to blocks 920 and 930), in other embodiments the routine 900 may receive and act on such control system actuator modification requests.

It will be appreciated that the functionality provided by the routines discussed above may be provided in alternative ways in some embodiments, such as being split among more routines or consolidated into fewer routines. Similarly, illustrated routines may in some embodiments provide more or less functionality than is described, such as when other illustrated routines instead lack or include such functionality respectively, or when the amount of functionality provided is altered. Also, while various operations may be illustrated as being performed in a particular manner (e.g., in serial or parallel, synchronously or asynchronously, etc.) and/or in a particular order, those skilled in the art will appreciate that the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described for purposes of illustration, modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form (e.g., while some aspects of the invention may not be recited as being embodied in a computer-readable medium or as part of a system, other aspects may likewise be so embodied), and with any combination of claim elements in different claims that are not logically inconsistent.

What is claimed is:

1. A computer-implemented method comprising:
generating, by one or more computing systems, a plurality of models for use in controlling electrical operations of a group of multiple battery cells that together provide electrical power to a target system, wherein each battery cell has multiple internal components that include an internal supercapacitor component in parallel with an internal battery component, and wherein each of the multiple internal components of each of the multiple battery cells is associated with a separate model from the plurality of models that represents a current state of the associated internal component and describes operational characteristics of the associated internal component and is based at least in part on a goal to maximize battery life while satisfying electrical power demand; and
controlling, by the one or more computing systems, the electrical operations of the group of multiple battery cells by, for each of the multiple battery cells:
determining, by the one or more computing systems, and using the model associated with the internal supercapacitor component of the battery cell, a first control action to perform for a first impedance actuator that is in series with the internal supercapacitor component of the battery cell, wherein the first control action includes using a first impedance level selected from a plurality of impedance levels that control respective electrical power output levels of the internal supercapacitor component, and wherein the determining of the first control action includes determining that the first impedance level provides higher satisfaction of the goal than other impedance levels in light of the current state of the internal supercapacitor component of the battery cell;
determining, by the one or more computing systems, and using the model associated with the internal battery component of the battery cell, a second control action to perform for a second impedance actuator that is in series with the internal battery component of the battery cell, wherein the second control action includes using a second impedance level that is selected from the plurality of impedance levels and that controls an electrical power output level of the internal battery component, and wherein the determining of the second control action is performed independently of the determining of the first control action and includes determining that the second impedance level provides higher satisfaction of the goal than other impedance levels in light of the current state of the internal battery component of the battery cell;
synchronizing, by the one or more computing systems, the determined first control action for the first impedance actuator and the determined second control action for the second impedance actuator to improve electrical operation of the battery cell in light of the goal while providing a determined amount of electrical power, including determining a modified set of impedance levels in which at least one of the first impedance level for the determined first control action or the second impedance level for the determined second control action is modified; and
controlling, by the one or more computing systems, the battery cell to provide the determined amount of electrical power, including implementing the impedance levels of the modified set on the first and second impedance actuators.

2. The computer-implemented method of claim 1 wherein the controlling of the electrical operations of the group of multiple battery cells further includes, for two or more battery cells of the multiple battery cells that are in series, and after the controlling of each of the two or more battery cells to provide the determined amount of electrical power for that battery cell, synchronizing electrical power being supplied by the two or more battery cells to a load, including transforming direct current (DC) output of the internal components of each of the two or more battery cells into alternating current (AC) output of that battery cell, and synchronizing phases of the AC output of the two or more battery cells.

3. The computer-implemented method of claim 2 wherein the controlling of each of the multiple battery cells to provide a determined amount of power includes, for each of the multiple battery cells:
using a first step-down transformer to reduce amperage of DC output from the internal supercapacitor component of the battery cell from a first electrical current level to a lower second electrical current level, performing the implementing of an impedance level on the first impedance actuator for the battery cell using the lower second electrical current level to produce DC output from the first impedance actuator at a third electrical current level, and using a first step-up transformer to increase amperage from the third electrical current level to a higher fourth electrical current level, wherein DC electrical power being provided for the battery cell from the internal supercapacitor component of the battery cell is at the fourth electrical current level;
using a second step-down transformer to reduce amperage of DC output from the internal battery component of the battery cell from a fifth electrical current level to a lower sixth electrical current level, performing the implementing of an impedance level on the second impedance actuator for the battery cell using the lower sixth electrical current level to produce DC output from the second impedance actuator at a seventh electrical current level, and using a second step-up transformer to increase amperage from the seventh electrical current level to a higher eighth electrical current level, wherein DC electrical power being provided for the battery cell from the internal battery component of the battery cell is at the eighth electrical current level; and combining the DC electrical power from the internal supercapacitor component of the battery cell at the fourth electrical current level and the DC electrical power from the internal battery component of the battery cell at the eighth electrical current level to produce the determined amount of electrical power for the battery cell.

4. The computer-implemented method of claim 1 wherein the controlling of the group of multiple battery cells is performed for a first time period and further includes updating, by the one or more computing systems and after providing the determined amount of electrical power from each of the multiple battery cells for the first time period, at least some of the plurality of models to include updated state information received from sensors associated with the multiple battery cells to reflect the controlling of the multiple battery cells for the first time period, and wherein the method further comprises performing the controlling of the group of multiple battery cells for each of multiple additional time periods after the first time period using updated models from a prior time period.

5. The computer-implemented method of claim 1 wherein the target system is an electric vehicle having an electric motor, and wherein the controlling of the group of multiple battery cells is performed at a first time period during accelerating of the electric vehicle to supply electrical power to the electric motor and includes determining impedance levels for the first and second impedance actuators of the multiple battery cells to cause at least a majority of the electrical power supplied to the electric motor to come from the internal supercapacitor components of the multiple battery cells.

6. The computer-implemented method of claim 5 further comprising performing controlling of the group of multiple battery cells for a different second time period during steady speed driving of the electric vehicle to supply electrical power to the electric motor and includes determining impedance levels for the first and second impedance actuators of the multiple battery cells for the second time period to cause at least a majority of the electrical power supplied to the electric motor to come from the internal battery components of the multiple battery cells.

7. The computer-implemented method of claim 6 further comprising performing controlling of the group of multiple battery cells for a different third time period during deceleration of the electric vehicle to supply electrical power from braking to the group of multiple battery cells and includes determining impedance levels for the first and second impedance actuators of the multiple battery cells for the third time period to cause at least a majority of the electrical power supplied to the group of multiple battery cells to be directed to the internal supercapacitor components of the multiple battery cells.

8. The computer-implemented method of claim 7 further comprising, after at least the majority of the electrical power supplied to the group of multiple battery cells is directed to the internal supercapacitor components, transferring electrical power from the internal supercapacitor components of the multiple battery cells to the internal battery components of the multiple battery cells over multiple subsequent time periods to charge the internal battery components of the multiple battery cells at a slower rate than charging of the internal supercapacitor components of the multiple battery cells.

9. The computer-implemented method of claim 1 wherein the target system is an electrical grid that supplies a request for electrical power, wherein the controlling of the electrical operations of the group of multiple battery cells is performed in response to the request and includes determining impedance levels for the first and second impedance actuators of each of the multiple battery cells to cause a determined amount of electrical power to be supplied to the electrical grid from that battery cell, and wherein the determined amounts of electrical power to be supplied to the electrical grid from the multiple battery cells corresponds to the request for electrical power.

10. The computer-implemented method of claim 1 wherein the controlling of the electrical operations of the group of multiple battery cells is performed for each of a plurality of time periods, including, during one or more of the plurality of time periods, performing the determining of the first and second control actions and the synchronizing and the controlling of each of the multiple battery cells in a manner to receive and store electrical power in the internal components of the multiple battery cells, and wherein the method further comprises generating new versions of at least some of the plurality of models at multiple time periods of the plurality of time periods based at least in part on state information for the multiple battery cells at a time of the generating, and using the generated new versions of the at least some models for the controlling of the electrical operations of the multiple battery cells during the multiple time periods.

11. The computer-implemented method of claim 1 wherein the controlling of the electrical operations of the group of multiple battery cells is performed for a first time period, and wherein selecting of each of the first and second impedance levels for each of the multiple battery cells includes implementing multiple iterations that each involve (a) solving a linear approximation of a non-linear control space for electrical operations of that battery cell to improve a distribution function over multiple enumerated values of the control space with respect to the goal and (b) propagating the improved distribution function over later time periods using predictions based on at least one model of the one or more models that is associated with that battery cell, with the multiple iterations continuing until errors for state information in the at least one model and for a degree of optimization from the propagating are below defined tolerance thresholds or until an end of an iteration time window for the first time period.

12. The computer-implemented method of claim 1 wherein the plurality of models each includes a total Hamiltonian function based on historical data from previous operations of the target system and on binary rules that evaluate to true or false values and that use operating principles of an associated internal component as part of evaluating state information in that model about the associated internal component, wherein the binary rules include one or more absolute rules that specify non-modifiable restrictions that are requirements regarding the ongoing operations of the target system and further include one or more hard rules that specify restrictions regarding the ongoing operations of the target system that can be modified in specified situations, and wherein the total Hamiltonian function is further based in part on one or more soft rules that each specifies one or more additional conditions to be evaluated to reach one of multiple possible values other than true or false with an associated likelihood.

13. A non-transitory computer-readable medium having stored contents that cause one or more computing systems to perform automated operations including at least:

obtaining, by the one or more computing systems, one or models for one or more battery cells that provide electrical power to a target system, wherein each battery cell has multiple internal components that include an internal supercapacitor component in parallel with an internal battery component, and wherein each battery cell is further associated with at least one of the models that represents a current state of at least part of the battery cell and is based at least in part on a goal to maximize battery life while providing electrical power; and controlling, by the one or more computing systems, electrical operations of the one or more battery cells by, for each of the one or more battery cells:

determining, by the one or more computing systems, and using the at least one model associated with the battery cell, a first control value to implement on a first impedance actuator to control electrical power output of the internal supercapacitor component of the battery cell, and a second control value to implement on a second impedance actuator to control electrical power output of the internal battery component of the battery cell;

coordinating, by the one or more computing systems, control of the first and second impedance actuators to improve electrical operation of the battery cell in light of the goal while providing a determined amount of electrical power, including determining a modified group of control values for the first and second impedance actuators in which at least one of the determined first control value or the determined second control value is modified; and controlling, by the one or more computing systems, the first and second impedance actuators to cause the battery cell to provide the determined amount of electrical power, including implementing the control values of the modified group on the first and second impedance actuators.

14. The non-transitory computer-readable medium of claim 13 wherein the one or more battery cells include multiple interconnected battery cells, wherein the one or more models include a plurality of models that have a separate model for each internal component of each of the multiple interconnected battery cells, wherein the determining for each battery cell of the first control value to control electrical power output of the internal supercapacitor component of the battery cell and of the second control value to control electrical power output of the internal battery component of the battery cell are performed independently of each other using the separate models for the internal supercapacitor and battery components of the battery cell, and wherein the implementing of the control values of the modified group on the first and second impedance actuators for each battery cell includes implementing impedance levels of those first and second impedance actuators that are determined by the one or more computing systems.

15. The non-transitory computer-readable medium of claim 13 wherein the one or more battery cells include multiple interconnected battery cells, and wherein the controlling of the electrical operations of the one or more battery cells further includes, for two or more battery cells of the multiple battery cells that are in series, synchronizing electrical power being supplied by the two or more battery cells to a load, including transforming direct current (DC) output of the internal components of each of the two or more battery cells into alternating current (AC) output of that battery cell, and synchronizing phases of the AC output of the two or more battery cells.

16. The non-transitory computer-readable medium of claim 13 wherein the causing of each of the battery cells to provide a determined amount of power includes, for each of the battery cells:

using a first step-down transformer to reduce amperage of DC output from the internal supercapacitor component of the battery cell from a first electrical current level to a lower second electrical current level, performing the implementing of a control value on the first impedance actuator for the battery cell using the lower second electrical current level to produce DC output from the first impedance actuator at a third electrical current level, and using a first step-up transformer to increase amperage from the third electrical current level to a higher fourth electrical current level, wherein DC electrical power being provided for the battery cell from the internal supercapacitor component of the battery cell is at the fourth electrical current level;

using a second step-down transformer to reduce amperage of DC output from the internal battery component of the battery cell from a fifth electrical current level to a lower sixth electrical current level, performing the implementing of a control value on the second impedance actuator for the battery cell using the lower sixth electrical current level to produce DC output from the second impedance actuator at a seventh electrical current level, and using a second step-up transformer to increase amperage from the seventh electrical current level to a higher eighth electrical current level, wherein DC electrical power being provided for the battery cell from the internal battery component of the battery cell is at the eighth electrical current level; and combining the DC electrical power from the internal supercapacitor component of the battery cell at the fourth electrical current level and the DC electrical power from the internal battery component of the battery cell at the eighth electrical current level to produce the determined amount of electrical power for the battery cell.

17. The non-transitory computer-readable medium of claim 13 wherein the controlling of the electrical operations of the one or more battery cells is performed for a first time period and further includes updating, by the one or more computing systems and after providing the determined amount of electrical power from each of the one or more battery cells for the first time period, the one or more models to include updated state information received from sensors that measure characteristics of the one or more battery cells to reflect the controlling of the electrical operations for the first time period, and wherein the stored contents include software instructions that, when executed, further perform the controlling of the electrical operations for each of multiple additional time periods after the first time period using one or more updated models from a prior time period.

18. The non-transitory computer-readable medium of claim 13 wherein the target system is an electric vehicle having an electric motor, and wherein the controlling of the electrical operations of the one or more battery cells is performed at a first time period during accelerating of the electric vehicle to supply an indicated amount of electrical power to the electric motor and includes determining impedance levels for the first and second impedance actuators of the one or more battery cells to cause at least a majority of the indicated amount of electrical power to be supplied to the electric motor from the internal supercapacitor components of the one or more battery cells.

19. The non-transitory computer-readable medium of claim 18 wherein the one or more battery cells include multiple interconnected battery cells, and wherein the stored contents include software instructions that, when executed, further performing controlling of the electrical operations of the one or more battery cells for a different second time period during steady speed driving of the electric vehicle to supply electrical power to the electric motor from the multiple battery cells and includes determining impedance levels for the first and second impedance actuators of the multiple battery cells for the second time period to cause at least a majority of the electrical power supplied to the electric motor to come from the internal battery components of the multiple battery cells.

20. The non-transitory computer-readable medium of claim 18 wherein the one or more battery cells include multiple interconnected battery cells, and wherein the stored contents include software instructions that, when executed, further performing controlling of the electrical operations of the one or more battery cells for a different second time period during deceleration of the electric vehicle to supply electrical power from braking to the multiple battery cells and includes determining impedance levels for the first and second impedance actuators of the multiple battery cells for the second time period to cause at least a majority of the electrical power supplied to the multiple battery cells to be directed to the internal supercapacitor components of the multiple battery cells.

21. The non-transitory computer-readable medium of claim 20 wherein the stored contents include software instructions that, when executed, further include transferring, after at least the majority of the electrical power supplied to the multiple battery cells is directed to the internal supercapacitor components, electrical power from the internal supercapacitor components of the multiple battery cells to the internal battery components of the multiple battery cells over multiple subsequent time periods to charge the internal battery components of the multiple battery cells at a slower rate than charging of the internal supercapacitor components of the multiple battery cells.

22. The non-transitory computer-readable medium of claim 13 wherein the target system is an electrical grid that supplies a request for electrical power, and wherein the controlling of the electrical operations of the one or more battery cells is performed in response to the request and includes determining impedance levels for the first and second impedance actuators of the one or more battery cells to cause a requested amount of electrical power to be supplied to the electrical grid from the one or more battery cells.

23. The non-transitory computer-readable medium of claim 13 wherein the controlling of the electrical operations of the one or more battery cells is performed for each of a plurality of time periods, including performing the determining of the first and second control values and the coordinating and the controlling of the first and second impedance actuators during one or more of the plurality of time periods to receive and store electrical power in the internal components of the one or more battery cells, and wherein the stored contents include software instructions that, when executed, further perform generating of new versions of the one or more models at multiple time periods of the plurality of time periods based at least in part on state information for the one or more battery cells at a time of the generating, and using the generated new versions of the one or more models for the controlling of the electrical operations of the one or more battery cells during the multiple time periods.

24. The non-transitory computer-readable medium of claim 13 wherein the controlling of the electrical operations of the one or more battery cells is performed for a first time period, wherein the determining of the first control value for a battery cell includes selecting a first impedance level from a plurality of impedance levels supported by the first impedance actuator for the internal supercapacitor component of the battery cell, wherein the determining of the second control value for a battery cell includes selecting a second impedance level from a plurality of impedance levels supported by the second impedance actuator for the internal battery component of the battery cell, and wherein the selecting of each of the first and second impedance levels for a battery cell includes implementing multiple iterations that each involve (a) solving a linear approximation of a non-linear control space for electrical operations of the battery cell to improve a distribution function over multiple enumerated values of the control space with respect to the goal and (b) propagating the improved distribution function over later time periods using predictions based on at least one model of the one or more models that is associated with the battery cell, with the multiple iterations continuing until errors for state information in the at least one model and for a degree of optimization from the propagating are below defined tolerance thresholds or until an end of an iteration time window for the first time period.

25. The non-transitory computer-readable medium of claim 13 wherein the one or more models are each associated with at least one internal component of a battery cell and include binary rules that evaluate to true or false values and that use operating principles of the at least one internal component as part of evaluating state information in the model about the at least one internal component.

26. The non-transitory computer-readable medium of claim 25 wherein the one or more models each includes a total Hamiltonian function that is based on the binary rules for the model and on historical data from previous operations of the target system, wherein the binary rules include one or more absolute rules that specify non-modifiable restrictions that are requirements regarding the ongoing operations of the target system and further include one or more hard rules that specify restrictions regarding the ongoing operations of the target system that can be modified in specified situations, and wherein the total Hamiltonian function is further based in part on one or more soft rules that each specifies one or more additional conditions to be evaluated to reach one of multiple possible values other than true or false with an associated likelihood.

* * * * *